INVENTOR.
T. A. Wetzel

INVENTOR.
T. A. Wetzel
BY Cyril M. Hajewski
ATTORNEY

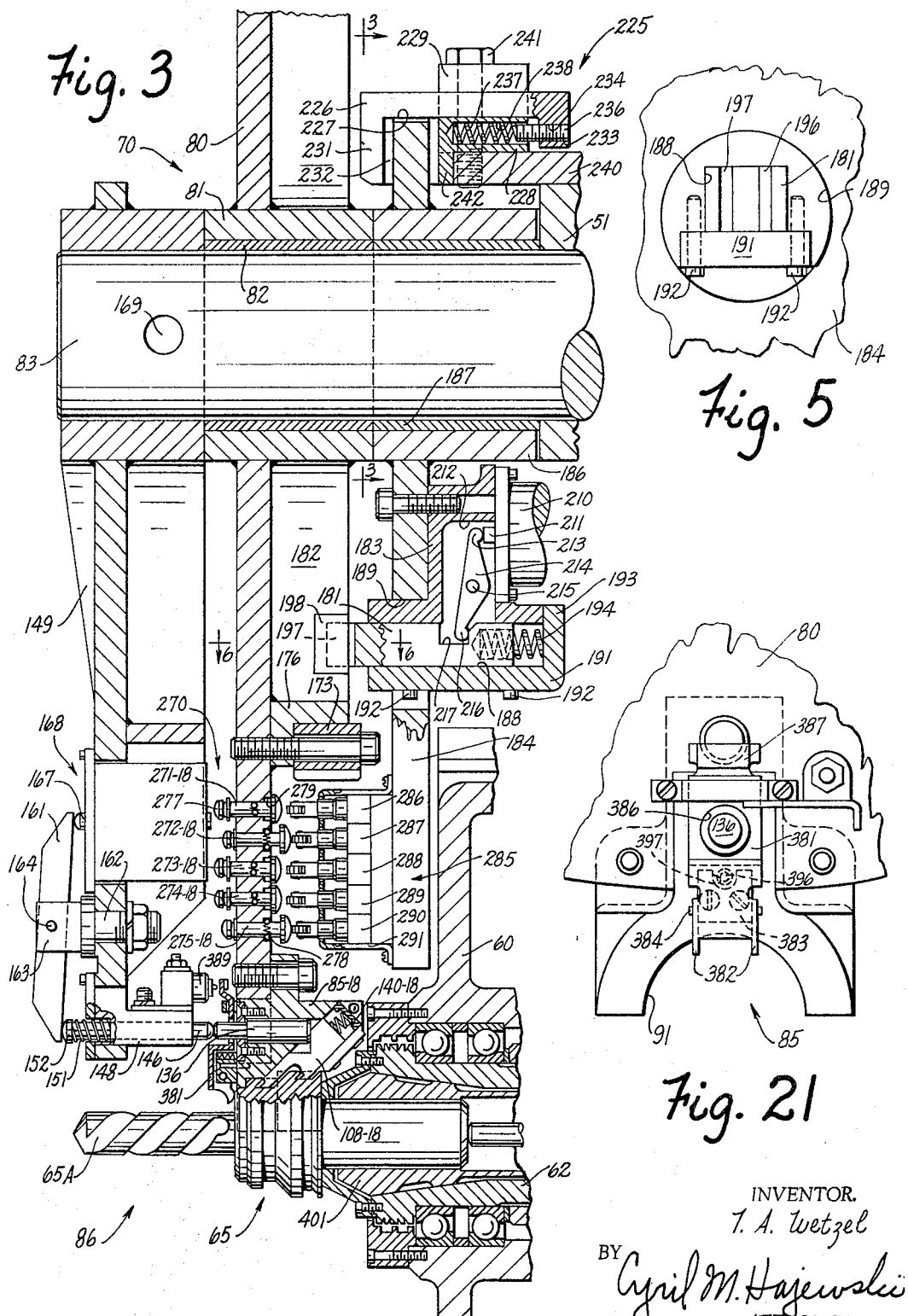

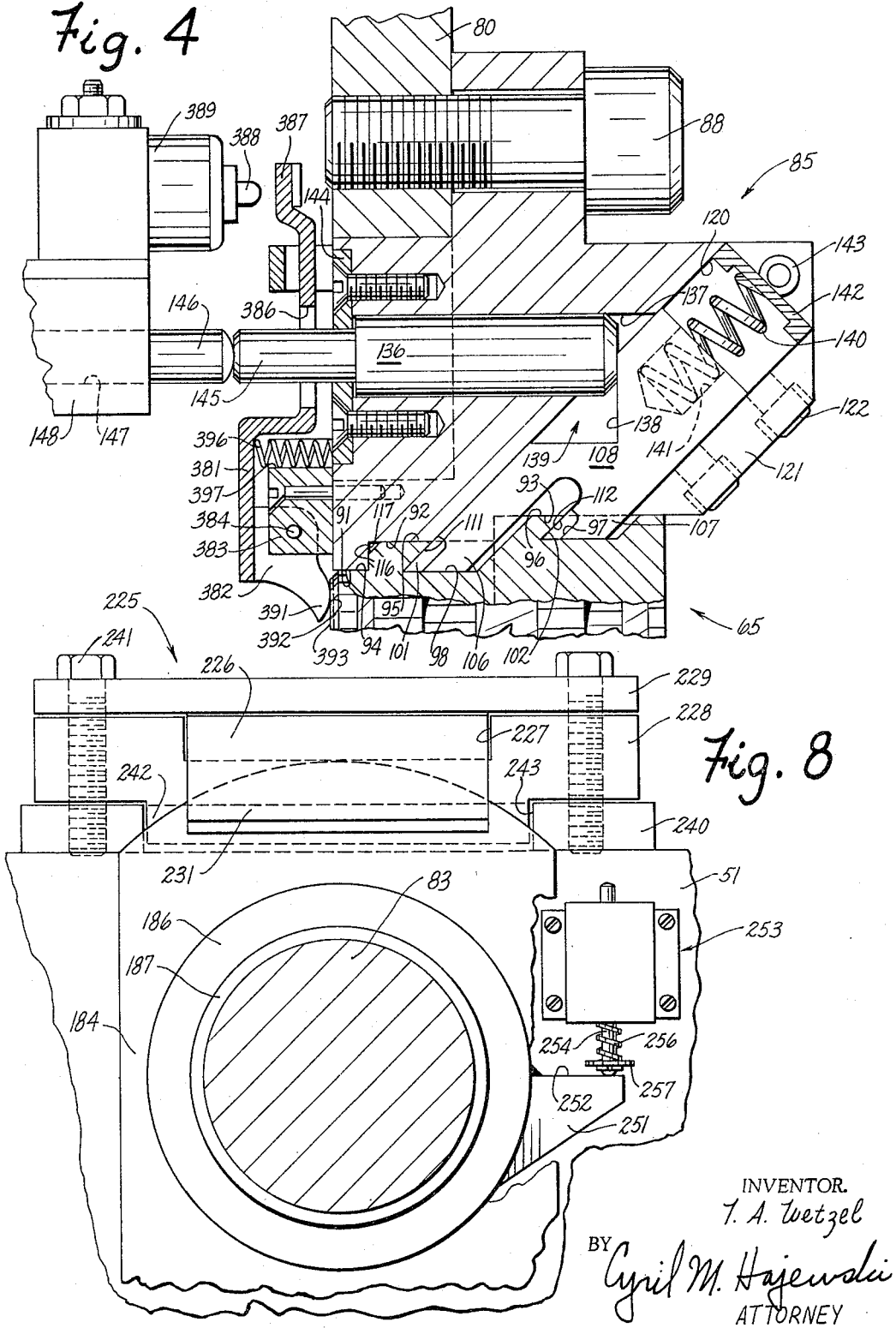

Oct. 11, 1966 T. A. WETZEL 3,277,568
MACHINE TOOL WITH TOOL STORAGE AND CHANGING APPARATUS
Filed May 4, 1964 15 Sheets-Sheet 6

INVENTOR.
T. A. Wetzel
BY Cyril M. Hajewski
ATTORNEY

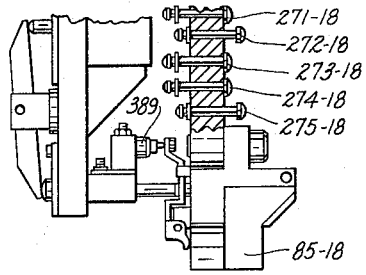
Fig. 13
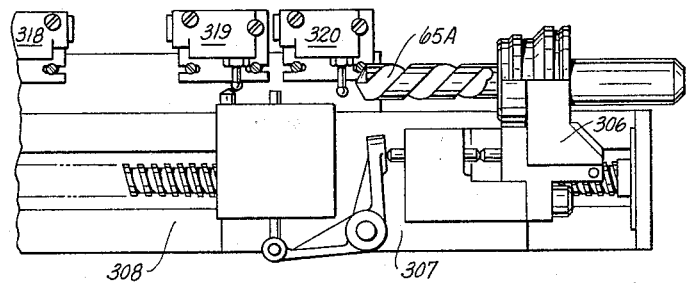
Fig. 14
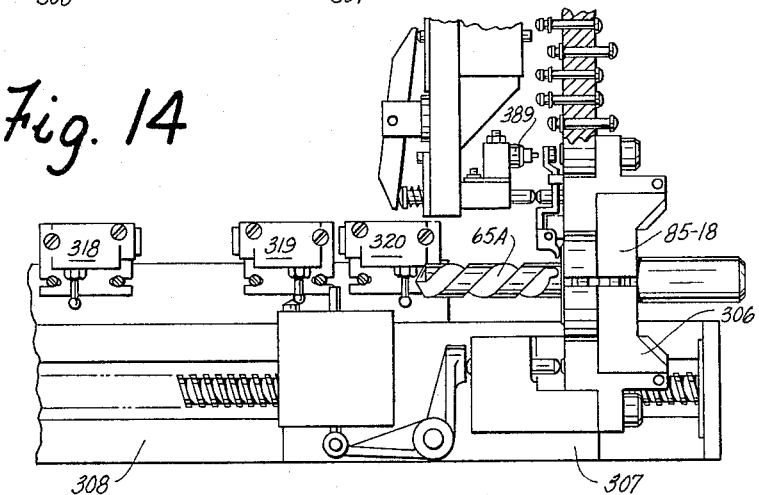
Fig. 15
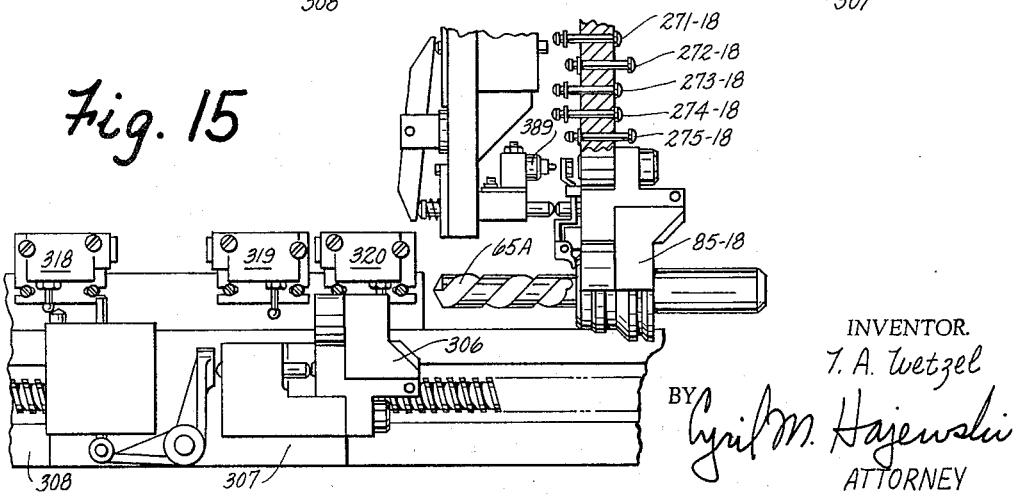

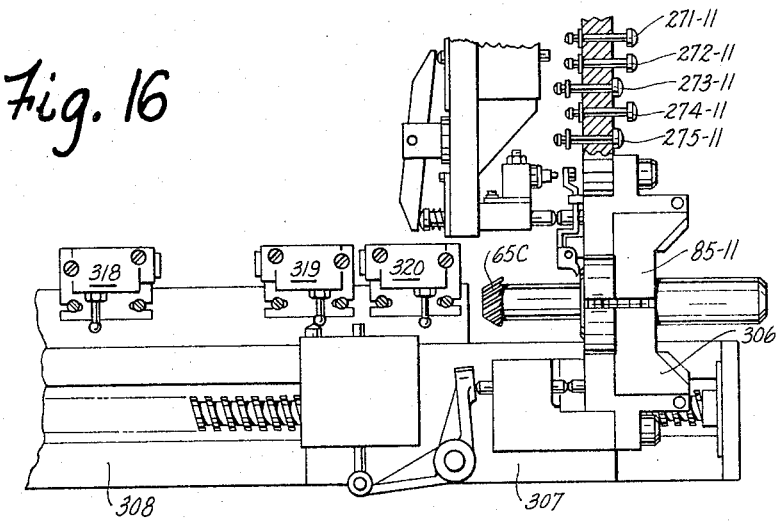
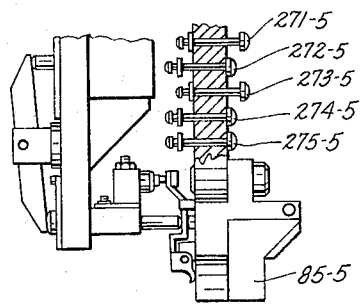
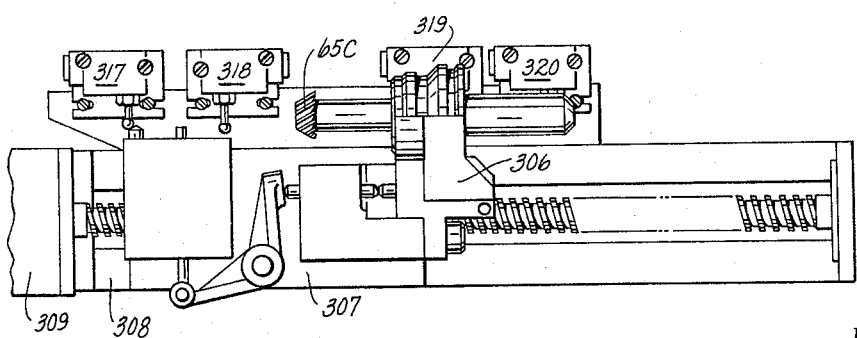

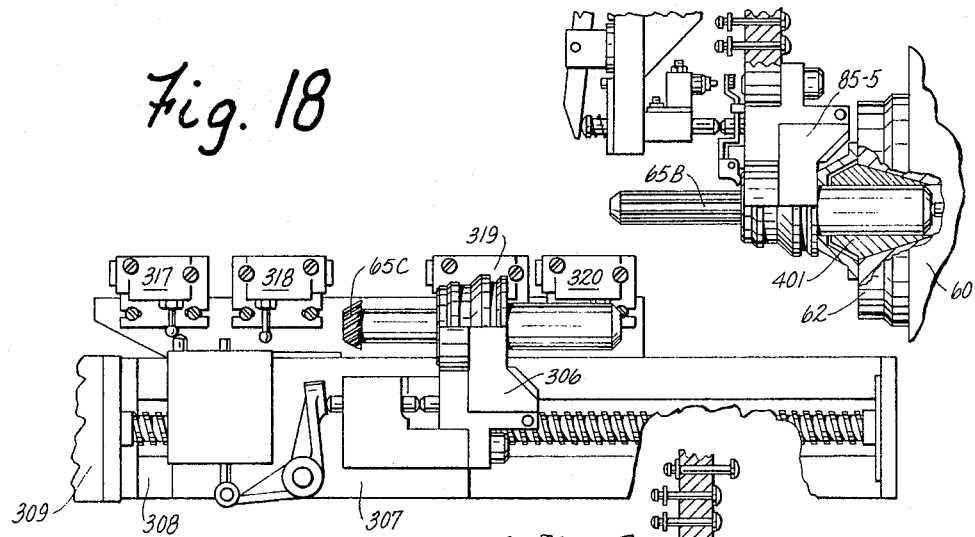
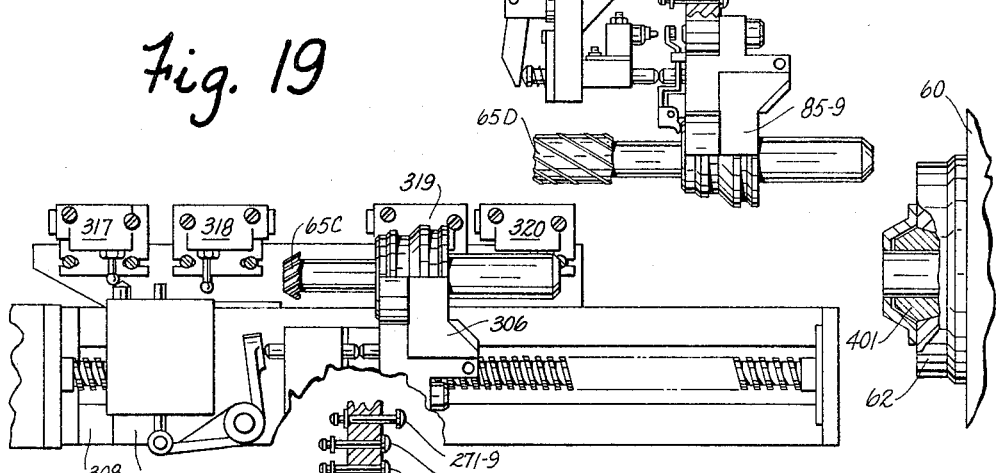
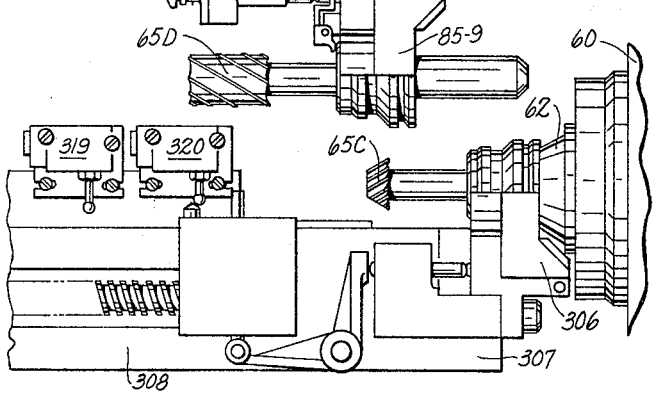

INVENTOR.
T. A. Wetzel
BY Cyril M. Hajewski
ATTORNEY

Oct. 11, 1966  T. A. WETZEL  3,277,568
MACHINE TOOL WITH TOOL STORAGE AND CHANGING APPARATUS
Filed May 4, 1964  15 Sheets-Sheet 15

INVENTOR.
T. A. Wetzel
BY
Cyril M. Hajewski
ATTORNEY

United States Patent Office 3,277,568
Patented Oct. 11, 1966

3,277,568
MACHINE TOOL WITH TOOL STORAGE AND
CHANGING APPARATUS
Theodore A. Wetzel, Brookfield, Wis., assignor to Kearney
& Trecker Corporation, West Allis, Wis., a corporation
of Wisconsin
Filed May 4, 1964, Ser. No. 364,494
15 Claims. (Cl. 29—568)

The present invention relates generally to machine tools and more particularly to an improved machine tool provided with a plurality of different types of rotary cutting tools which may automatically be made individually operative for performing a variety of cutting operations on a workpiece.

It is a general object of the present invention to provide a machine tool with an improved tool storage and changing apparatus that utilizes the movements of the machine tool components in effecting a tool change.

Another object of this invention is to provide a machine tool having an improved tool storage member provided with storage position identification means, as well as selection means, for selecting a particular tool storage position for location at a ready station.

A further object of this invention is to provide a machine tool with tool storage facilities and a tool transfer member and having an improved electrical control system for automatically controlling the operation of the machine.

Another object is to provide a tool storage apparatus that incorporates a unique arrangement for identifying the different tools carried therein.

Yet another object of this invention is to provide a machine tool equipped with a tool storage magazine and a tool change mechanism that are simple in construction, reliable in operation, and relatively inexpensive to manufacture.

According to this invention, the improved machine tool is equipped with a rotary spindle and a plurality of cutting tools adapted to be received by the spindle for rotation therewith to perform different machining operations. The cutting tools are stored in individual carriers of a rotatable storage magazine so that they move in a circular path of travel with the magazine to locate a selected carrier at a ready station. This is accomplished while the spindle is performing a machining operation at the work station. A complete tool change cycle produces two separate tool change operations. During alternate tool change operations the spindle takes the new tool from the magazine, and during the other tool changes, a transfer clasp inserts a new tool into the spindle after the latter has been appropriately positioned.

Upon completion of a machining operation, the spindle is moved to the ready station where the transfer clasp removes the previously used tool from the spindle. After the previously used tool is removed from the spindle, the spindle is moved into operative engagement with a new tool that is presented by the magazine carrier and located in the ready station. Thereafter, with a new tool coupled to the spindle, the spindle is moved to the work station for performing another machining operation. During the machining operation, the magazine is indexed to locate the only other empty carrier of the magazine at the ready station and the transfer clasp is operated to restock the magazine carrier with the previously used tool. Upon returning the previously used tool to the magazine carrier from when it has originally been removed, the transfer clasp is moved to a position where it will not interfere with indexing movement of the magazine. The magazine is now rotated to position the tool which is required for the next machining operation at the ready station. The transfer clasp is then operated to remove this tool from the magazine and holds it in a position for insertion into the spindle to complete the next tool change operation. When the spindle has completed its machining operation, it is moved to return the old tool into the carrier of the magazine that was previously indexed to the ready station. Thereafter, the transfer clasp will insert the next tool into the spindle and the spindle will then be moved to the work station.

The magazine, as mentioned, includes a plurality of tool carriers with each carrier being stocked with a tool. The magazine is therefore rotated to locate a particular carrier at the ready station, as previously mentioned, and such movement is accomplished while the spindle is performing a machine operation. The magazine carriers are each provided with their own identifying binary coding which is read by a reading head as each carrier passes the reading head. When the coding of the carrier corresponds with the binary number impressed upon the electrical control system, the rotation of the magazine is stopped with the carrier located at the ready station presenting a tool which will be used by the spindle in the next machining operation. The tools which are to be used in a machining cycle are individually stocked in the individual carriers and the coding mechanism associated with the carriers is set at this time for identifying the tool in that carrier.

The foregoing and other objects of this invention, which will become more fully apparent from the following detailed description, may be achieved by means of the exemplifying apparatus depicted and set forth in this specification in connection with the accompanying drawings, in which:

FIG. 3 is an enlarged fragmentary view partly in side elevation and partly in vertical section taken through the tool storage magazine and showing the arrangement for coding a particular magazine carrier and also showing the reading head and magazine brake mechanism;

FIG. 4 is an enlarged fragmentary view partly in side elevation and partly in vertical section taken through a magazine tool storage carrier;

FIG. 5 is an enlarged detail elevational view showing the magazine locating fork;

FIG. 8 is an enlarged fragmentary view partly in vertical section and partly in elevation showing the brake mechanism and transducer;

Figure 22:
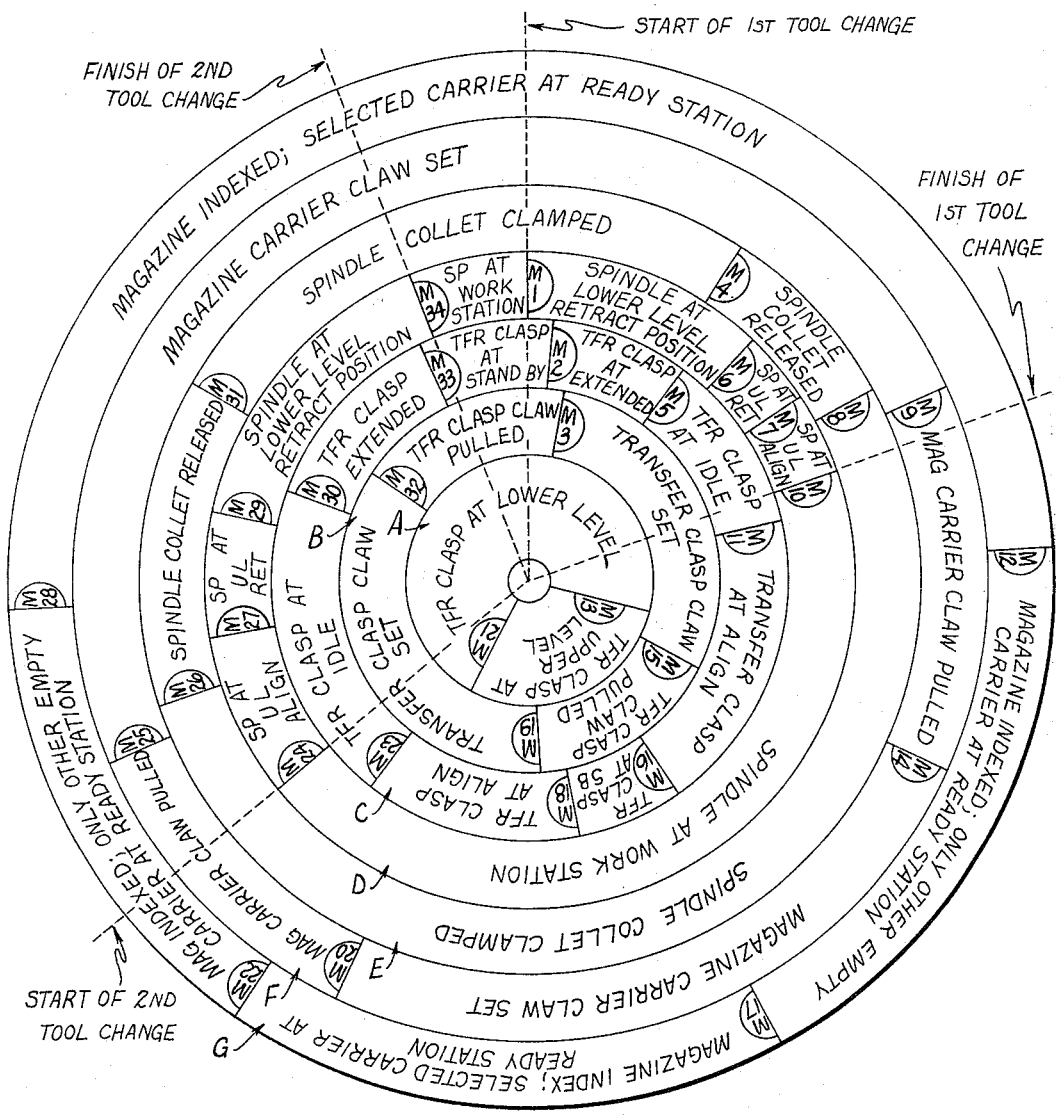
Figure 23:
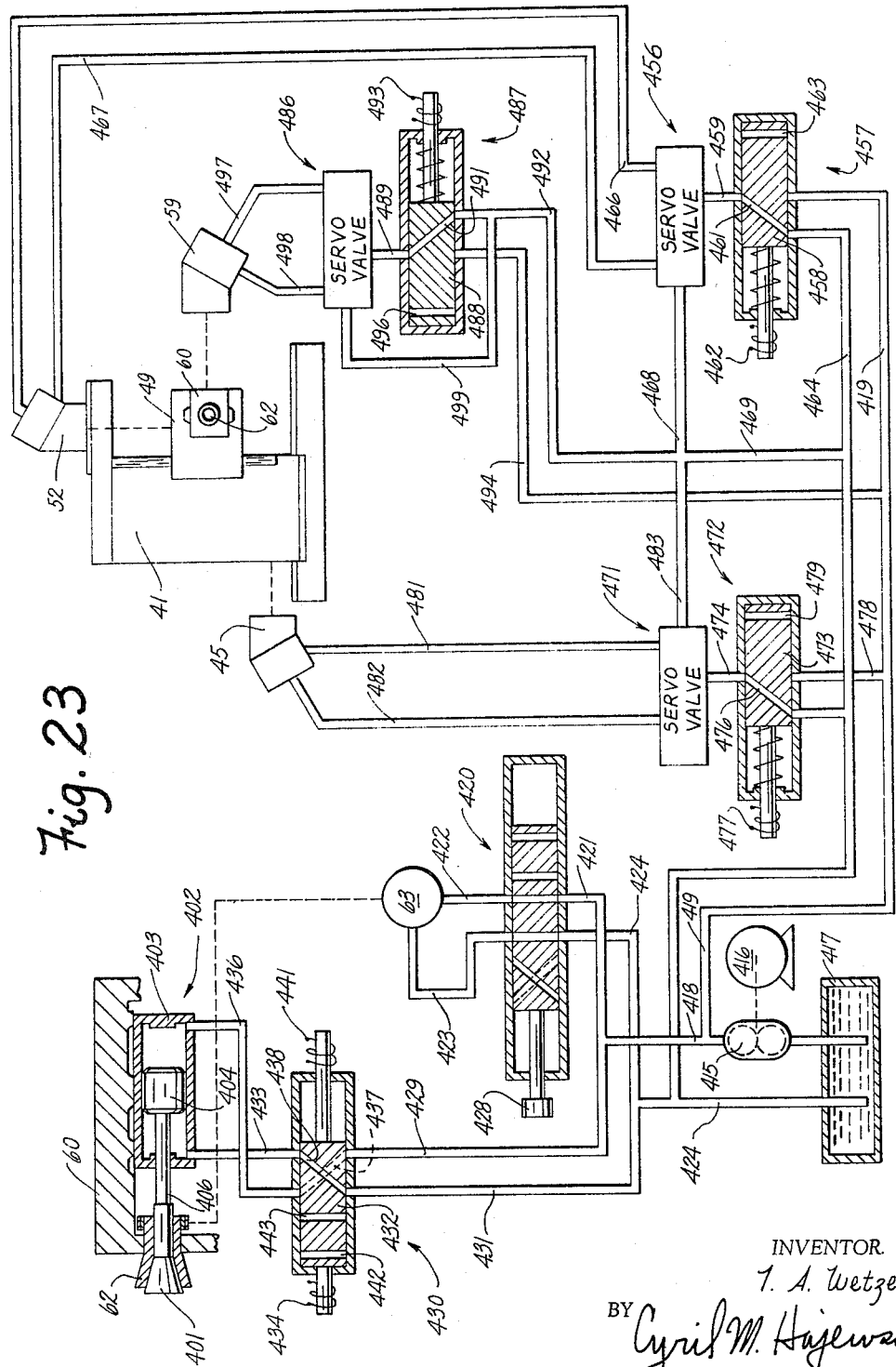
Figure 24:
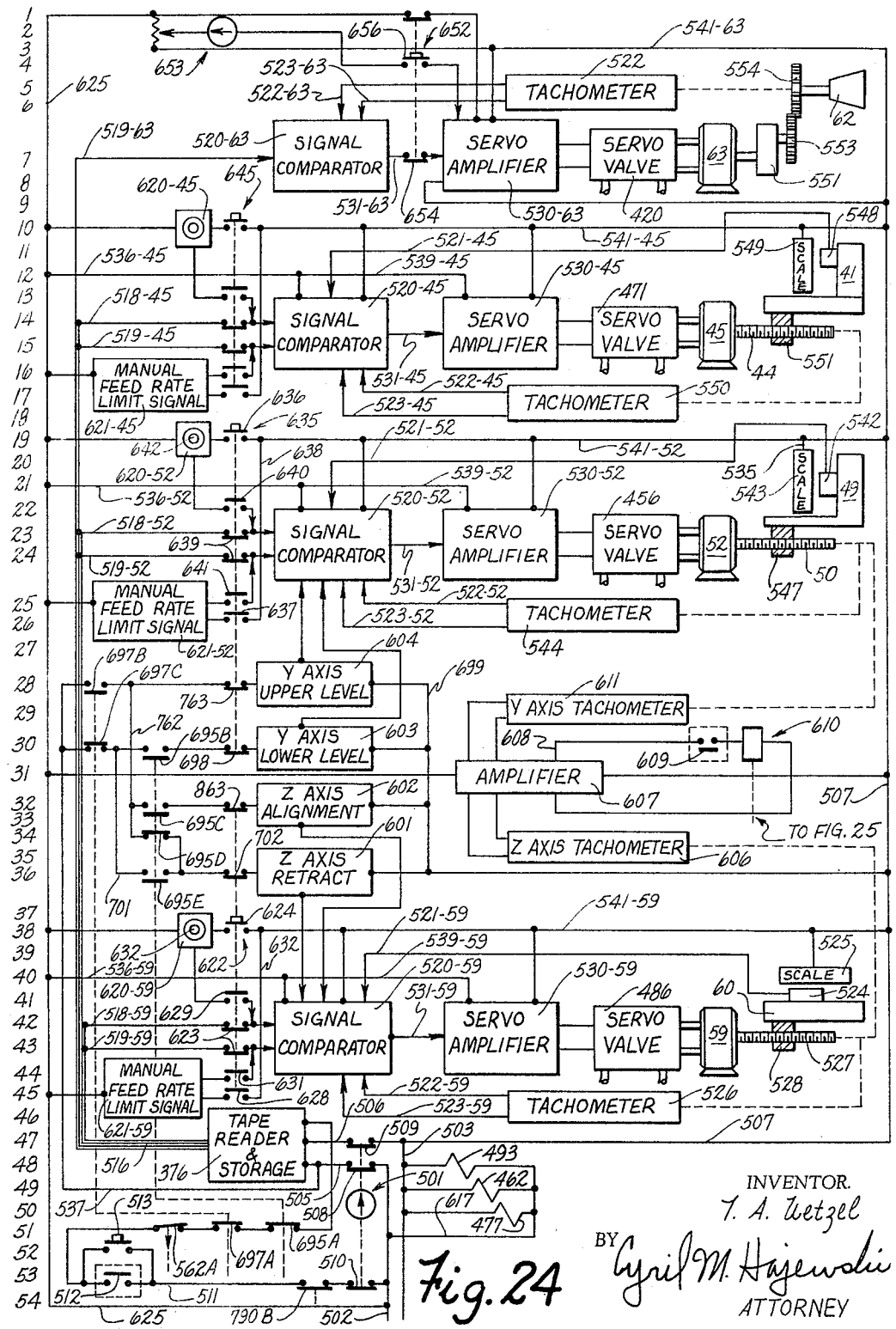
Figure 25:
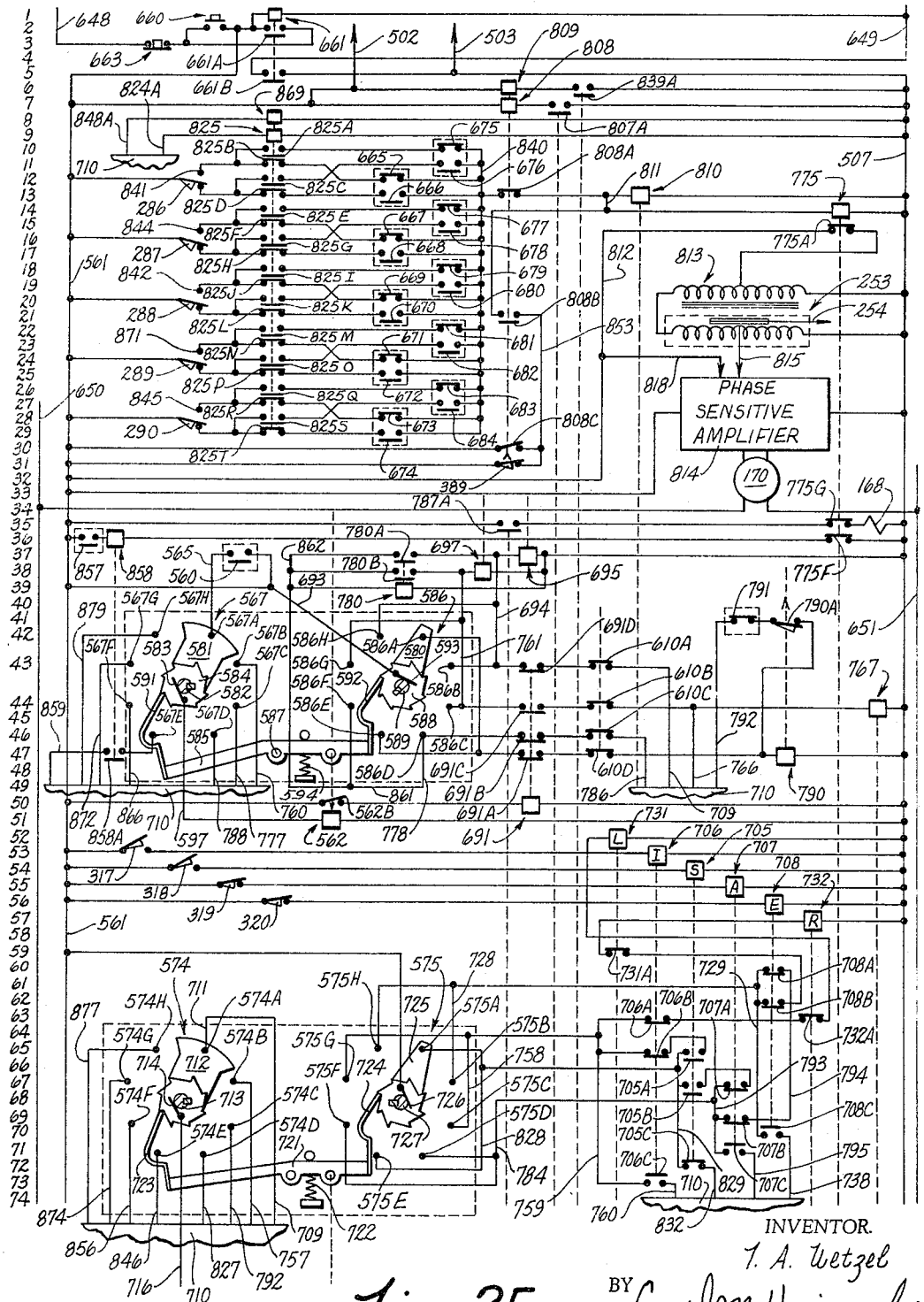
Figure 25A:
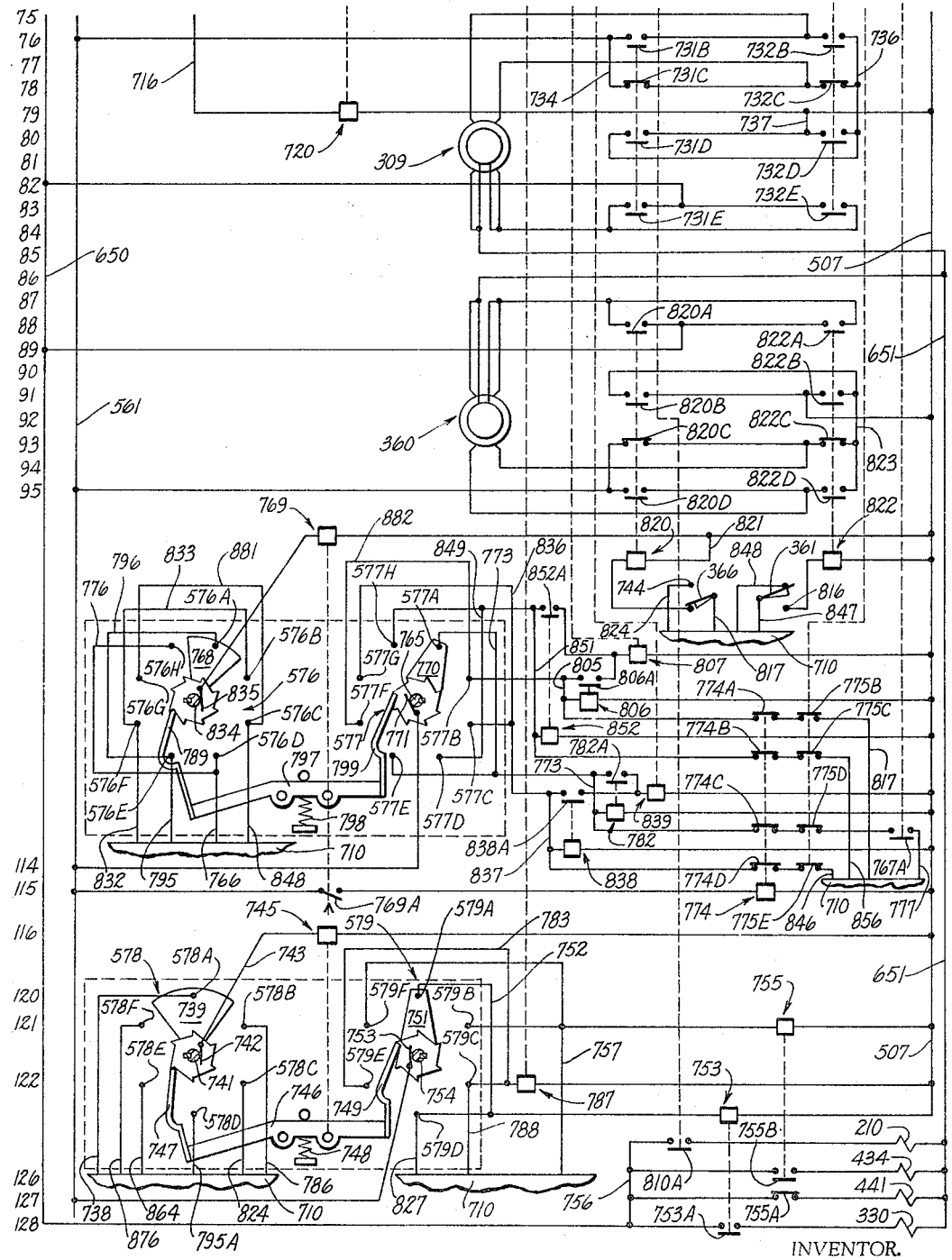

FIGS. 9 to 20, inclusive, are a series of views mostly in right side elevation illustrating the various positions of the transfer clasp, spindle and magazine in a tool change cycle of operation;

FIG. 21 is an enlarged fragmentary view in elevation showing the lever associated with a carrier for actuating the switch that locates an empty carrier at the ready station;

FIG. 22 is a circular chart listing the various steps in a tool change cycle of operation and showing the sequence in which they are performed;

FIG. 23 is a diagrammatic view of the hydraulic circuit;

FIG. 24 is a schematic block diagram illustrating the control circuit for effecting automatic selective movement of the movable machine components in response to tape input and fixed predetermined input; and FIGS. 25 and 25A are electrical wiring diagrams illustrating the electrical control system for controlling the operation of the various components in completing a tool change cycle of operation.

Figure 1:
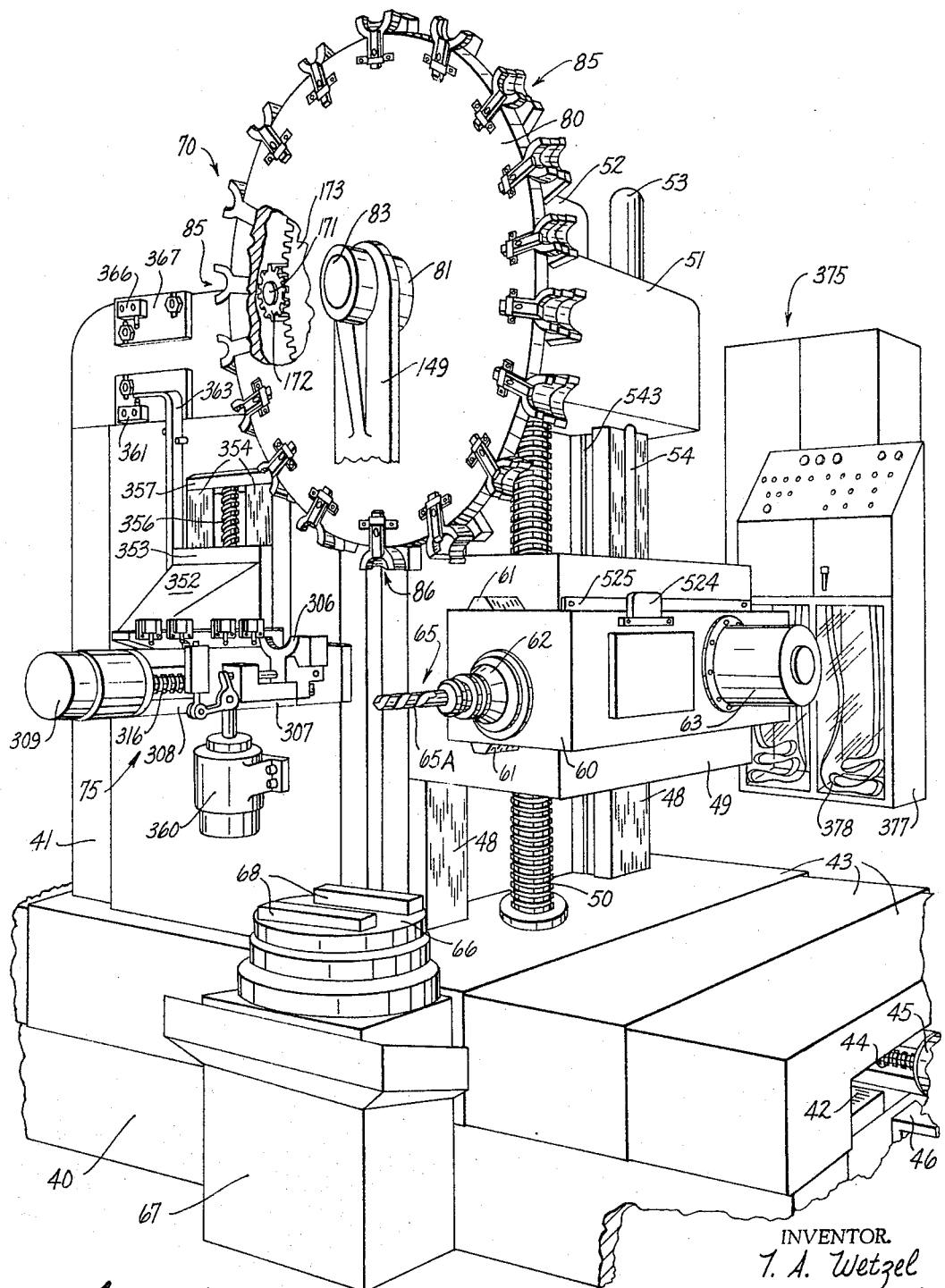
FIGURE 1 is a perspective view of a machine tool incorporating the features of the present invention, with the cutting tools being omitted from the tool storage magazine.

Reference is now made more particularly to the drawings and specifically to FIGURE 1 thereof, in which a machine tool incorporating the features of the present invention is depicted. The machine generally comprises a bed 40 which slidably supports an upstanding column 41. The bed 40 is provided with horizontal ways 42 which are engaged by complementary ways (not shown) formed at the bottom of the column 41 to support the column for sliding movement along the length of the bed 40 constituting an X axis of movement. A plurality of slidable plates 43 are attached to the bed 40 and the column 41 in telescoping arrangement so as not to interefere with the longitudinal movement of the column 41 while providing a protective covering over the ways 42 to prevent the chips, which are formed during a machining operation, from falling onto the ways 42. Longitudinal movement of the column 41 in either direction is effected by rotating a screw 44, which is in threaded engagement with a recirculating ball bearing nut (not shown), that is fixed to the underside of the column 41. The screw is rotatably supported in the base 40 in suitable bearings (not shown). A motor 45 is carried on a bracket 46 which, in turn, is mounted on the end of the base 40. The motor 45 is connected to rotate the screw 44 for actuating the column 41 by power in its path of travel along the X axis.

The column 41 is provided with vertical ways 48 for engagement by complementary ways (not shown) formed on a saddle 49 for slidably supporting the saddle in a vertical path of movement along a Y axis. Vertical movement of the saddle 49 in either direction is effected by rotating a screw 50 threadedly engaged in a recirculating ball bearing nut (not shown), that is fixed to the saddle 49. The screw 50 is rotatably supported by the column 41 being journaled at its upper end in a cap 51 that is secured to the top of the column 41 and which extends from the column beyond the way 48 for receiving the screw 50. The lower end of the screw 50 is journaled in a suitable bearing (not shown) that is attached to the base of the column 41 beneath the plate 43. The screw 50 may be rotated in either direction by a motor 52 mounted on the cap 51 and connected to rotate the screw 50 for actuating the saddle 49 by power in its path of travel along the Y axis. A pair of hydraulic piston and cylinder mechanisms 53, one of which is shown, are also mounted on the cap 51 for connection to the saddle 49 by connecting rods 54 and are arranged in a well-known manner to counterbalance the weight of the saddle 49 and its associated mechanism.

A spindle head 60 is carried by the saddle 49 and is provided with horizontal ways 61 which engage complementary ways formed within the saddle 49 for supporting the spindle head 60 for a sliding cross feed movement along a Z axis in a horizontal path transverse to the direction of travel of the column 41. Transverse horizontal movement of the spindle head is effected by means of a motor 59, shown diagrammatically in FIG. 23. The motor 59 is connected to effect power movement of the spindle head by means of a conventional screw and nut mechanism (not shown) which is operative in well-known manner to effect the movement of the spindle head in either direction. It is therefore apparent that the column 41, the saddle 49, and the spindle head 60, are supported for movement in three mutually transverse paths of travel. A spindle 62 is rotatably supported in the spindle head 60 and is adapted to carry a tool 65 for rotation with it for performing a machining operation. The spindle 62 is rotated by a suitable motor 63 which is secured to the side of the spindle head 60 and is connected in a well-known manner to drive the spindle 62 in a machining operation.

The spindle 62 supports the tool 65 in position to operate upon a workpiece (not shown) located on a rotary index table 66 which, in turn, is mounted on the top of a pedestal 67 that is secured to the front face of the bed 40. The position of the spindle, when located to operate upon a workpiece (not shown) mounted on the rotary index table 66, constitutes the work station of the machine tool. In the illustrative embodiment, the rotary table 66 is adapted to receive the workpiece attached to a pallet (not shown) that is transported to the table 66 onto a pair of rails 68 by a suitable conveyor (not shown) and clamped to the rails for complete automatic operation. However, it is to be understood that a conventional rotary index table may be provided with each individual workpiece being manually clamped thereto by the operator.

The machine tool illustrated in FIG. 1 is equipped with an automatically operable mechanical tool change mechanism comprising a tool storage magazine and a tool transfer member generally identified by the reference numerals 70 and 75 respectively. The tool transfer member 75 is carried by the column 41 for movement in two mutually transverse paths of travel for selectively performing its function of withdrawing a previously used tool from the spindle 62 and restocking it in the magazine and withdrawing a selected tool 65 from the magazine 70 and inserting it into the spindle 62 to render it operative for performing a machining operation.

Figure 2:
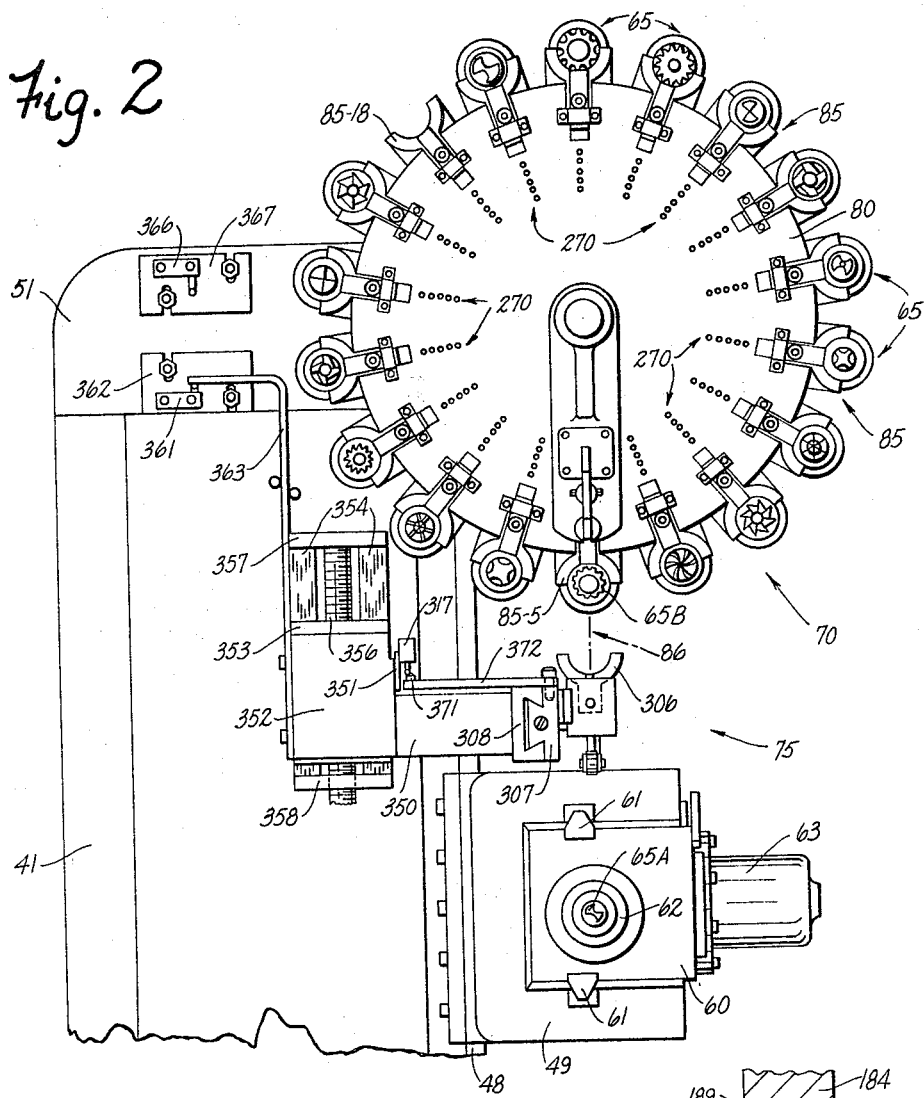
FIG. 2 is a fragmentary front elevational view of the machine shown in FIG. 1, the magazine being shown as provided with a plurality of different tools and illustrating the spindle located at the work station.

A plurality of different tools 65, for use in the spindle 62 in performing a machining operation at the work station, are stored in the magazine 70 for subsequent use and insertion by the tool transfer member 75 into the spindle 62. The magazine 70 includes a plate 80 of circular configuration, shown in FIGS. 1 and 3, provided with an axial hub 81 that is journaled on a bearing sleeve 82 carried on the outwardly extending end of a horizontal fixed shaft 83 which is carried by the machine cap 51. Fixed in the peripheral edge of the plate 80 in angular spaced relationship are a plurality of tool carries 85 of which, in this particular illustrated embodiment shown, there are 18 so that the magazine 70 is capable of storing 18 different tools. While the magazine 70, depicted in FIG. 2, is shown as having 18 tool carriers for storing 18 different tools, it will be appreciated that any number of carriers may be provided. The plate 80 is rotatable on the fixed shaft 83 so that the variety of tools 65 in storage in the carriers 85 travel with the rotation of the plate 80 for movement successively into a ready station 86 where the tools are made individually accessible to the tool transfer member 75.

The carriers 85, which are affixed to the magazine plate 80, are identical in construction and operation and therefore a description of one carrier will pertain to all of them. As shown in FIG. 4, the carriers 85 are secured by bolts 88 to the plate 80 and extend outwardly from the peripheral edge of the plate. Each carrier 85 presents a semi-circular tool receiving socket which is formed by machining a plurality of concentric semicircular recesses 91, 92 and 93 of different radii. The recesses 91, 92 and 93, formed in the carrier 85, are complementary to annular rings or flanges 94, 95 and 96 provided on the tools 65. As shown in FIG. 4, the flange 96 of a tool 65 has formed in its peripheral surface an annular recess 97 which, in cross section, has the configuration of a parallelogram. The tool flange 95 is also provided with an annular recess 98, which, in cross section, also has the configuration of a parallelogram. However, the recess 98 is formed in the tool ring 95 in a manner that the sloping surface of the recess adjacent the flange 96 extends upwardly to the periphery of the flange 96. Thus, the flanges 95 and 96 present annular leftwardly extending V-groove portions 101 and 102 respectively. The V-grooves 101 and 102 are adapted to receive the inclined extending portions of fingers 106 and 107 respectively formed on a tool engaging claw 108 that is slidably carried by the carrier 85. With this arrangement, the fingers 106 and 107 of the claw 108 will engage in the annular V-grooves 101 and 102, respectively, and the upper surfaces of the fingers will engage the sloping surfaces 111 and 112 of the V-grooves, moving the tool forwardly. As the tool moves forwardly, a face 116 of the ring 95 engages against a vertical face 117 formed by the recesses 91 and 92 in the carrier. Thus, the peripheral surface of the flanges 95 and 96 of the tool 65 are in firm engagement with the peripheral surface of the semicircular recesses 92 and 93 of the carrier, while the peripheral surface of the flange 94 is in firm engagement with the surface of the semicircular recess 91 of the carrier. It is therefore apparent that a tool will be securely retained in the carrier by the action of the claw 108 and the tool will be so orientated therein that its axis is parallel to the axis about which the magazine rotates.

As previously mentioned, the claw 108 is slidably carried by the carrier 85, being disposed within an inclined elongated guideway 120. The axis of the guideway 120 intersects the axis of the tool 65. An open side of the guideway 120 is closed by a cover plate 121 thereby retaining the claw 108 in operative position in the guideway.

To release a tool from the carrier 85, the claw 108 may be moved inwardly into the guideway 120 to retract the fingers 106 and 107 from engagement with the tool. Withdrawal or retraction of the claw 108 is accomplished by a plunger 136 which is carried for axial movement within a horizontal bore 137 formed in the body of the carrier 85. The inner end of the plunger 136 is adapted to engage a vertical side surface 138 formed by providing a notch 139 in the body portion of the claw 108. Inward or rightward movement of the plunger 136, as viewed in FIG. 4, will engage the rightward end of the plunger 136 against the surface 138 of the notch 139 and force the claw 108 upwardly within the guideway 120, compressing a spring 140. The spring 140 normally urges the claw 108 outwardly into securing or set engagement with a tool located in the carrier. As shown, one end of the spring 140 is located within a blind bore 141 formed in the end of the claw 108, while the opposite end of the spring abuts a washer 142 that is disposed with the guideway 120 and retained therein by a pin 143. When a force which has been assumed to have been applied to the left end of the plunger 136 is removed, the spring 140 will operate to move the claw 108 downwardly within the guideway 120 forcing the plunger 136 to move leftwardly. Leftward movement of the plunger 136 is restricted by a retainer plate 144 which is secured within a counterbore formed in the outwardly facing surface of the carrier. A reduced portion 145 of the plunger 136 extends outwardly through a suitable opening provided in the retainer plate 144 in position to be engaged by the end of an actuating plunger 146. The plunger 146 is slidably supported within a bore 147 formed in a plunger bracket 148 which is securely attached to the depending end of an arm 149, shown in FIG. 3. A spring 151 is mounted around the left end of the plunger 146 and has one end disposed in a counterbore formed in the arm 149, while the opposite end of the spring abuts an enlarged head 152 formed on the left end of the plunger 146. Thus, the spring 151 normally urges the plunger 146 in a leftward direction so that it does not apply a force to the end of the plunger 136.

To apply a rightwardly acting force to the plunger 136 for retracting the claw 108 out of tool engagement, there is provided a lever 161 which is supported for pivotal movement on a stud 162 that is secured in the arm 149. The stud 162 extends outwardly from the arm 149 and presents a bifurcated portion 163 that receives the lever 161. A pin 164 which extends through the bifurcated portion 163 of the stud 162 and through the lever 161 serves as a pivot axis for the lever and retains it in operating position. The lower end of the lever 161 is disposed in engagement with the head 152 of the actuating plunger 146, while the upper end of the lever 161 is disposed to engage the end of a plunger 167 of a solenoid 168 that is mounted in a suitable opening provided in the arm 149. Energization of the solenoid 168 will effect leftward movement of the associated actuating plunger 167, as viewed in FIG. 3, into engagement with the upper end of the lever 161 thereby effecting the pivotal movement of the lever 161 about the pin 164 in a counterclockwise direction. This serves to move the lower end of the lever 161 to actuate the plunger 146. The force applied to the left end of the plunger 146 causes the plunger to move axially rightwardly compressing the spring 151 and applying a rightwardly acting force to the plunger 136. The force is transmitted by the plunger 136 to the claw 108 forcing the claw to move axially upwardly within the guideway 120, withdrawing the fingers 106 and 107 out of the V-grooves 101 and 102, respectively, for releasing the tool from the carrier.

The arm 149 is carried on the outer end of the fixed shaft 83 and is secured thereon by a pin 169. The arm 149 is orientated so that the actuating plunger 146 is positioned at the ready station 86 in position to engage the outward extending end of the claw actuating plunger 136 of the carrier 85. It is to be understood that this description pertains to all carriers mounted on the magazine and each carrier will have its own tool securing claw 108, as well as its own actuating plunger 136. Thus, a particular carrier located in the ready station 86 will be so positioned that its associated actuating plunger 136 will be engageable by the single force applying plunger 146 carried by the arm 149.

Rotation of the plate 80 in the magazine 70 is accomplished by means of a motor 170, shown schematically in FIG. 25, which is carried in the machine cap 51 in a suitable recess (not shown), provided for this purpose. The motor 170 is connected to drive a power shaft 171, FIG. 1, which is likewise journaled in the machine cap 51 and extends outwardly thereof having secured to its outer end a pinion 172. The pinion 172 is in meshing engagement with a bull gear 173, FIG. 3, that is secured in a suitable annular notch formed in a carrier ring 176, secured to the side of the magazine plate 80 in concentric relationship therewith. When it is desired to locate a particular carrier 85 at the ready station 86, the motor 170 is energized to effect rotation of the pinion 172 thereby driving the bull gear 173 which, in turn, drives the magazine plate 80 in a rotational movement.

When a particular carrier 85 has been selected for positioning at the ready station 86, operation of the motor 170 is discontinued and simultaneously therewith, a locating fork 181, shown in FIG. 3, is actuated to effect positive positioning of the selected carrier at the ready station 86. To this end, a plurality of radial webs 182 are provided which extend between the inner peripheral surface of the bull gear carrying ring 176 and the hub 81 of the magazine and which are angularly spaced to correspond to the angular spacing of the carriers that are mounted on the peripheral surface of the magazine plate 80. The fork 181 is carried for axial sliding movement in a frame 183 which is secured to a depending arm 184. The arm 184 is provided with a hub 186 and is disposed on the stationary shaft 83 being journaled thereon through a bearing 187 for limited pivotal movement.

Figure 6:
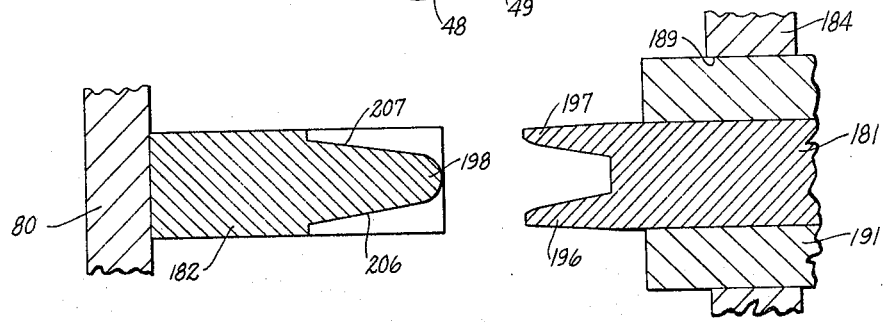
FIG. 6 is an enlarged fragmentary detail view in horizontal section taken along the plane represented by the line 6—6 in FIG. 3, showing the locating fork and a magazine web.

The locating fork 181 is carried for horizontal sliding movement in a rectangular guideway 188 formed in the housing 183 and which is adapted to extend through an opening 189 formed in the arm 184, shown in FIGS. 3 and 5. The fork 181 is retained in the guideway 188 by a supporting bottom plate 191, which, in cross section, presents an L-shaped configuration that is secured to the bottom of the housing 183 by a plurality of bolts 192. A vertical short leg 193 of the supporting plate 191 serves as a closure for the rightward or rear end of the guideway 188, shown in FIG. 3. The locating fork 181 is normally urged leftwardly or outwardly of the housing by a compression spring 194 having one end located in an axial counterbore formed in the right end of the locating fork 181 and its opposite end abutting the inner surface of the short leg 193 of the plate 191. When the locating fork 181 is in its fully extended outward position, which is accomplished by the operation of the spring 194, fingers 196 and 197 of the bifurcated outer end of the fork 181 are adapted to engage both sides of a machined portion 198 of the web 182. The portion 198 of each web 182, shown in FIG. 6, have their sides 206 and 207 machined so as to present a tapered accurate locating abutment which is adapted to receive the complementary recess presented by the bifurcated end of the locating fork 181. Thus, with a particular carrier 85 selected for location at the ready station 86, the particular web 182 that is associated with the selected carrier 85 will be engaged by the fork 181 thereby locating the selected carrier in precise alignment with the arm 184.

The retraction of the locating fork 181 for releasing the magazine 70 is accomplished by a solenoid 210 that is mounted on a suitable surface provided on the rear face of the housing 183. An actuating plunger 211, which is axially movable leftwardly upon energization of the solenoid 210, extends into a compartment 212 of the housing 183 and engages an end 213 of a lever 214. The lever 214 is supported for pivotal movement about a pin 215 that is secured in the opposite side walls of the housing 183 and extends across the compartment 212. A notch 217 formed in the locating fork 181 is adapted to receive the end 216 of the lever 214. When the solenoid 210 is deenergized, the spring 194 will operate to effect axial leftward movement of the locating fork 181 into engagement with a web 182 associated with a selected carrier 85. The leftwardly moving locating fork 181 effects pivotal movement of the lever 214 in a clockwise direction, as viewed in FIG. 3, so that the upper end 213 of the lever will force the actuating plunger 211 inwardly. On the other hand, energization of the solenoid 210 causes the actuating plunger 211 to move axially leftwardly engaging the end 213 of the lever 214 with a force sufficient to effect its pivotal movement in a counterclockwise direction about the pin 215. The lower end 216 of the lever will engage the vertical rear surface of the notch 217 forcing the locating fork 181 axially rightwardly against the force of the spring 194 to retract the fingers 196 and 197 out of engagement with the web 182 and thereby release the magazine.

As previously mentioned, the arm 184 is supported on the shaft 83 for pivotal movement. Therefore, when the locating fork 181 is moved into engagement with a web associated with a particular carrier 85 for precisely aligning that carrier with the arm 184, the momentum of the magazine plate 80 will be carried to the arm 184 causing the arm to pivot about the shaft 83. In this manner, the arm 184 and the locating fork 181 and its associated mechanism yield in the direction that the plate 80 is rotating. With this arrangement, the momentum of the rotating magazine plate 80 will not damage the arm locating fork 181, nor its associated arm 184.

As the magazine 70 is rotated to move the carriers 85 past the ready station 86, it is necessary that the arm 184 be maintained in its vertical position at the ready station 86. This is accomplished by means of a friction brake mechanism 225 that is operative to maintain the arm 184 in its vertical position relative to the shaft 83 while the magazine plate 80 is rotating. As shown in FIGS. 3 and 8, the brake mechanism 225 comprises a brake member 226 of substantial width which is slidably supported in a guideway 227 formed in a base 228. The brake member 226 is retained within the guideway 227 by means of a retaining plate 229 fastened to the base 228. A forward depending plate portion 231 integrally formed with the brake member 226 is provided with a brake shoe 232 which may be of any suitable friction material. The brake shoe 232 is adapted to engage the outwardly facing surface of the arm 184 above the hub 186, shown in FIGS. 3 and 8. The brake member 226 extends through the base 228 with the extending rearward end thereof being provided with a depending leg member 233. The leg 233 is provided with a plurality of threaded openings 234 each of which receives a screw 236, one of which is shown in FIG. 3. The leftward extending ends of the screws 236 are disposed to engage associated springs 237 which are individually located within suitable openings 238 formed in the base 228. The entire brake assembly is secured to a mounting plate 240 which is suitably secured to the machine cap 51 and extends outwardly thereof to carry the brake assembly so that the brake member may engage the outer surface of the arm 184, shown in FIG. 3. The brake assembly is secured to the mounting plate by a plurality of bolts 241 which serve both to secure the retaining plate 229 on the base 228 as well as secure the base 228 to the mounting plate 240. The base 228 is provided with a depending lug or key 242 which is adapted to engage a notch or keyway 243, shown in FIG. 8, formed in the forward extending end or edge of the mounting plate 240. Thus, the base 228 is keyed to the mounting plate 240 and firmly secured in an operative position. It is therefore apparent that the brake member 226 is movable horizontally relative to its stationary fixed base 228. Such movement of the brake member 226 in a rightward direction is effected by the springs 237 acting upon the screws 236. This spring force is transmitted to the depending leg 233 of the brake member 226 thereby forcing the brake member in a rightwardly direction to move the brake shoe 232 into frictional engagement with the surface of the arm 184. By adjusting the screws 236, the force which the springs 237 exert on the brake member can be regulated. In normal operation, the brake member 226 will operate to maintain the arm 184 in a fixed desired vertical position. However, when the locating fork 181 engages the web 182 of an associated selected carrier 85 and thereby locks the arm 184 to the magazine plate 80, the momentum of the magazine tends to pivot the arm 184 from its normal vertical position. This is true, because springs 237 are adjusted in a manner that the brake member will not exert enough force upon the arm to prevent its rotation under this particular condition but will allow the arm 184 to pivot with the movement of the mgazine so that no damage to the arm or associated mechanism can occur.

Since the arm 184, in moving with the magazine plate 80 will be out of the desired vertical position, the carrier 85 that is selected for location at the ready station 86 will also be out of the desired position and both must be moved back into the ready station 86. To this end a bracket 251, shown in FIG. 8, is secured to the peripheral surface of the hub 186 to which the arm 184 is secured. The bracket 251 is disposed on the hub 186 in a manner that when the arm 184 is disposed or located in the desired vertical position, an upper machined surface 252 of the bracket is positioned in a horizontal plane which passes through the axis of the stationary shaft 83. However, should the arm 184 be displaced to either side of a vertical plane which passes through the axis of the stationary shaft 83, the horizontal surface 252 of the bracket 251 will be located either below or above the horizontal plane which passes through the axis of the shaft 83. To indicate in an electrical control system the exact position of the arm 184, a transducer 253 is provided and it is operable to produce a signal when its associated actuating plunger 254 is displaced in either direction from a central neutral position. The transducer 253 is secured to the side surface of the machine cap 51 in position so that its actuating plunger 254 engages the machined surface 252 of the bracket 251. The arrangement is such that when the arm 184 is positioned in the vertical position, the machined surface 252 will be in the horizontal plane which passes through the axis of the stationary shaft 83. With this condition existing, the plunger 254 will be in its neutral position in which the transducer 253 produces a null signal. A spring 256 urges the actuating plunger 254 outwardly to maintain it in engagement with the machined surface 252 for the purpose of sensing the displacement of this surface in either direction from the horizontal position.

The operation of the transducer 253 will be described with the assumption that the rotation of the magazine 70 is in a counterclockwise direction with the motor 170 being operated to effect such rotation, and also, that a particular carrier 85 has been selected for location at the ready station 86. Thus, when the locating fork 181 is actuated to engage the associated web 182 of a selected carrier, the motor 170 will also be deenergized but the momentum of the magazine plate 80, as it moves in its circular path of travel, will normally be sufficient to carry the particular selected carrier past the ready station 86. Since the arm 184 is now coupled to the magazine plate 80 it will move with the magazine and be positioned to the right of the vertical plane which passes through the axis of the shaft 83, as viewed in FIG. 8, so that the selected carrier is positioned to the right side of the ready station 86. Under this condition, the machined surface 252 of the bracket 251 will be displaced upwardly from the horizontal plane which passes through the axis of the shaft 83. This will move the plunger 254 of the transducer 253 from its normal null position upwardly or inwardly relative to the transducer casing to effect the operation of the transducer 253 to produce a signal to indicate such displacement. This signal is utilized to effect the energization of the motor 170 in a manner to cause it to operate in a direction to move the magazine 70 in a clockwise direction for accurately locating the carrier at the ready station 86. As the motor operates to rotate the magazine 70 in a clockwise direction for positioning the selected carrier in the ready station 86, the plunger 254 of the transducer will follow the machined surface 252 of the bracket 251. When the machined surface is again in the horizontal plane which passes through the axis of the stationary shaft 83, the plunger will be returned to its neutral position so that the transducer produces a null signal thereby stopping the operation of the motor 170 and the selected carrier will be located in the ready station 86. On the other hand, had the motor 170 been initially operated to effect rotation of the magazine in a clockwise direction for locating a particular carrier at the tool change station upon deenergization of the motor, the momentum of the magazine would carry the particular selected carrier to the left of the vertical plane which passes through the axis of the stationary shaft 83. In this particular case, the machined surface 252 of the bracket 251 would be located below the horizontal plane which passes through the axis of the stationary shaft 83. The plunger 254 of the transducer, in following the surface 252, would effect the operation of the transducer in a manner to indicate in the electrical control system that such displacement had occurred. Thus, the transducer 253 would produce a signal which would be utilized to energize the motor 170 to effect the positioning movement of the magazine plate 80 in a counterclockwise direction. As the magazine is rotated to locate the particular selected carrier in the ready station 86, the plunger 254, under the influence of the surface 252 of the bracket 251, again will be moved inwardly towards its neutral null producing position. When this has occurred, the transducer 253 will produce a null signal which will interrupt the operation of the motor 170 so that the selected carrier is now located accurately at the ready station.

In order to select a particular tool for location at the ready station 86, the carriers 85 of the magazine are each provided with selectively adjustable coding mechanism 270 which is adjusted by the operator at the time that the tools are loaded into the magazine. In this manner, each tool is individually identified without the necessity of providing special coding structure on each tool that will be used in the machine. In FIGS. 1 and 2, the magazine 70 is shown as being provided with 18 individual carriers 85. Each carrier 85 is identified by a number from 1 to 18 inclusive and is coded in accordance with the binary system to indicate the number of the carrier. It will be appreciated, as previously mentioned, that the 18 carriers with which the magazine is provided, as shown in the drawing, is exemplary only. The number of carriers provided can be greater than the number shown, or less than the number shown, as desired. As is well-known in the art, in the binary numbering system, each digit of a binary number is either "OFF" as indicated by a "0", or "ON" as represented by a "1." Since 18 numbers are required in the illustrated embodiment, five digits of the binary system must be provided. Thus, the number 00001 will identify the carrier No. 1, while the binary number 10010 will identify the carrier No. 18. It is obvious that with the provision of five digits of the binary system, 31 carriers could be identified with the binary number 11111 identifying the carrier No. 31. The coding means 270 for each carrier comprises five axially movable plungers 271 to 275, inclusive, which are manually adjusted by the operator at the time that the carriers are provided with tools. In FIG. 3, the carrier depicted is assumed to be No. 18, and therefore, the five axially movable coding plungers are specifically identified by the reference numerals 271–18 to 275–18 inclusive. These plungers are supported in the magazine plate 80 just above their associated carrier 85–18. Each plunger represents one digit in the binary system, with the plunger 271–18 representing the first or the digit of least value, and the plunger 275–18 representing the fifth or digit of highest value. Each of these plungers may be positioned rightwardly, as indicated by the position of the plungers 272–18 and 275–18, to indicate the numeral "1" for that particular digit of the binary number. A plunger in a leftward position, as exemplified by the position of plungers 271–18, 273–18 and 274–18, indicates "0" for that particular digit of the binary system. Thus, the leftwardly positioned plungers 271–18, 273–18 and 274–18, in FIG. 3, represent respectively that the first, third and fourth digits of the binary number are "0." On the other hand, the rightwardly positioned plungers 272–18 and 275–18 represent that the second and fifth digits, respectively, of the binary number are "1." The binary number that is indicated in FIG. 3 by the setting of the plungers 271–18 to 275–18, inclusive, is 10010 to identify the particular carrier 85 as No. 18.

The group of five plungers associated with a particular carrier will be similar for all carriers so that each individual carrier that is mounted on the plate 80 of the magazine 70 will be associated with its own group of five individual plungers. The plungers of each group are identical in operation, and therefore, the description of one plunger will apply to all plungers provided. As shown in FIG. 3, the plunger 271–18 comprises a body portion which is supported for axial movement in a suitable opening provided in the plate 80. The rightward end of the plunger is provided with an enlarged actuating head, while the leftward end of the plunger 271–18 is provided with a gripping knob 277 to facilitate the actuation of the plunger either to a leftward retracted position, shown in FIG. 3, or to a rightward extending position, as exemplified by the position for the plunger 275–18. In order to retain a plunger, such as the plunger 275–18 in extended rightward position there is provided a detent mechanism 278 which is disposed to register in a circular recess 279 when the plunger 275–18 has been positioned in its fully extended rightward position. The detent mechanism 278 will retract within the body of the plunger when a force is applied to the knob 277 for moving the plunger axially leftwardly. When the plunger is in its leftward position, the detent mechanism 278 will engage the wall of the bore in which the plunger is supported with sufficient force to prevent any accidental displacement of the plunger rightwardly.

The coding associated with each carrier 85 is read by a selector or reading head generally identified by the reference numeral 285. Prior to actuating the motor 170 for rotating the magazine 70, the identification number of the desired carrier is impressed upon the electrical control system, either manually or automatically, in a manner to be described later. As the magazine 70 is rotated, the reading head 285 will read the coding associated with each carrier, and when the number of the coding associated with a particular carrier read by the reading head 285 coincides with the number impressed upon the electrical control system, the electrical control system will operate to deenergize the motor 170 and thereby stop the rotation of the magazine 70. As best shown in FIG. 3, the reading head 285 includes five limit switches 286 to 290 inclusive, which are carried in a bracket 291 that is secured to the lower depending end of the arm 184. Each of the limit switches 286 to 290 inclusive, is provided with an actuating plunger that extends through the bracket 291 and into the path of travel of an associated coded carrier plunger associated with each carrier 85, as the coded carrier plungers move in their circular path of travel with the rotation of the magazine 70. The actuating plunger of each of the switches 286 to 290, inclusive, is normally urged into extended outward position. Each switch in its normal deactuated position indicates the numeral "0," while when a particular switch is actuated by its associated plunger being moved inwardly through engagement with a rightwardly extending code plunger, it will then indicate the numeral "1." In other words, the actuated condition of the switch of the reading head will indicate the numeral "1," while the deactuated condition of the switch will indicate the numeral "0."

As each group of coded carrier plungers pass by the selector head 285, the actuated code plungers which extend rightwardly will actuate an associated switch. Thus, the particular group of code plungers associated with the carrier illustrated have been arranged so that the code plungers 271–18, 273–18 and 274–18 are retracted leftwardly so as to indicate the numeral "0," while the plungers 272–18 and 275–18 are actuated rightwardly to indicate the numeral "1." As these groups of code plungers are moved into axial alignment with the actuating plungers of associated switches 286 to 290 inclusive, by the rotation of the magazine plate 80, the plungers of the reading switches 286, 288 and 289 will not be engaged and the switches 286, 288 and 289 will each remain deactuated thereby indicating "0" in the electrical control circuit for the digits which they represent. On the other hand, the plungers of the switches 287 and 290 will be engaged by the carrier plungers 272–18 and 275–18, respectively. As a result, the reading head switches 287 and 290 will each be actuated to indicate the number "1" in the electrical control system for the digits of the binary number represented by these two switches. Thus, the particular carrier will be indicated by the binary number 10010 and will signal the presence at the ready station 86 of the carrier 85 that is identified as No. 18.

When the number impressed upon the reading head 285 by the coding associated with a particular carrier 85 coincides with the number impressed upon the electrical control system for selecting the desired carrier, the motor 170 will be deenergized to terminate the forward rotation of the magazine 70. However, the momentum of the magazine 70, as previously mentioned, will carry the selected desired carrier 85 slightly beyond the ready station 86. The transducer 253, as previously described, operates to immediately effect energization of the motor 170 for operation in the reverse direction at a slow rate until the selected desired carrier 85 is accurately located at the ready station 86.

The spindle 62, the tool change mechanism 75 and the tool storage magazine 70 function cooperatively for effecting a tool change. For example, assuming that a machining operation has been completed and the elements are in the positions illustrated in FIG. 2 and the succeeding machining cycle requires the replacement of the tool 65A in the spindle with a new tool 65B from the tool storage magazine 70. The first step in the tool change cycle is to retract the spindle 62 rearwardly and then elevate it so that the tool 65A is in alignment with a transfer clasp 306 of the tool change mechanism 75. The clasp 306 then moves forwardly and engages the old tool 65A in the spindle 62.

The clasp 306 is then retracted and the spindle 62 is elevated into alignment with the tool 65B in the tool storage magazine 70. The spindle is then advanced axially into engagement with the tool 65B which is thereupon released by the carrier 85–5 and secured to the spindle. From this location, the spindle is returned to operating position and is actuated in the performance of the next machining operation.

While the machining operation is being performed, the plate 80 is indexed to place the carrier 85–18 in the tool change station and the clasp is elevated to return the tool 65A carried by it to the carrier 85–18. The clasp 306 is then moved laterally out of the path of the tools 65 in the magazine 70 and the plate 80 is indexed to place the next tool to be used by the spindle in the tool change station 86. The clasp 306 is again moved laterally to engage this next tool which is released by its cooperating carrier 85 and secured to the clasp 306. After the new tool is thus attached to the clasp 306, the latter is lowered to await the next tool change operation and the magazine is indexed to return the carrier 85–5 to the tool change station where it can receive its associated tool 65B.

When the machining operation is completed, the spindle is elevated to return the tool 65B to the carrier 85–5 and then is retracted and lowered into alignment with the tool in the transfer clasp 306. The clasp 306 is then moved forwardly towards the spindle to insert the tool into the spindle and the tool is secured in the spindle for the succeeding machining operation. The spindle then returns to the machining area for operating the tool in the next machining operation. It will be noted that the spindle 62 takes alternate tools from the carrier 85 at the tool change station 86 and the other new tools are obtained from the transfer clasp 306. The tool change cycle is arranged in this manner for the purpose of reducing the number of times that the transfer clasp 306 must be elevated and lowered. With the system described above, two distinct tool change operations are completed while the tool clasp 306 has been elevated and lowered only once.

Figure 7:
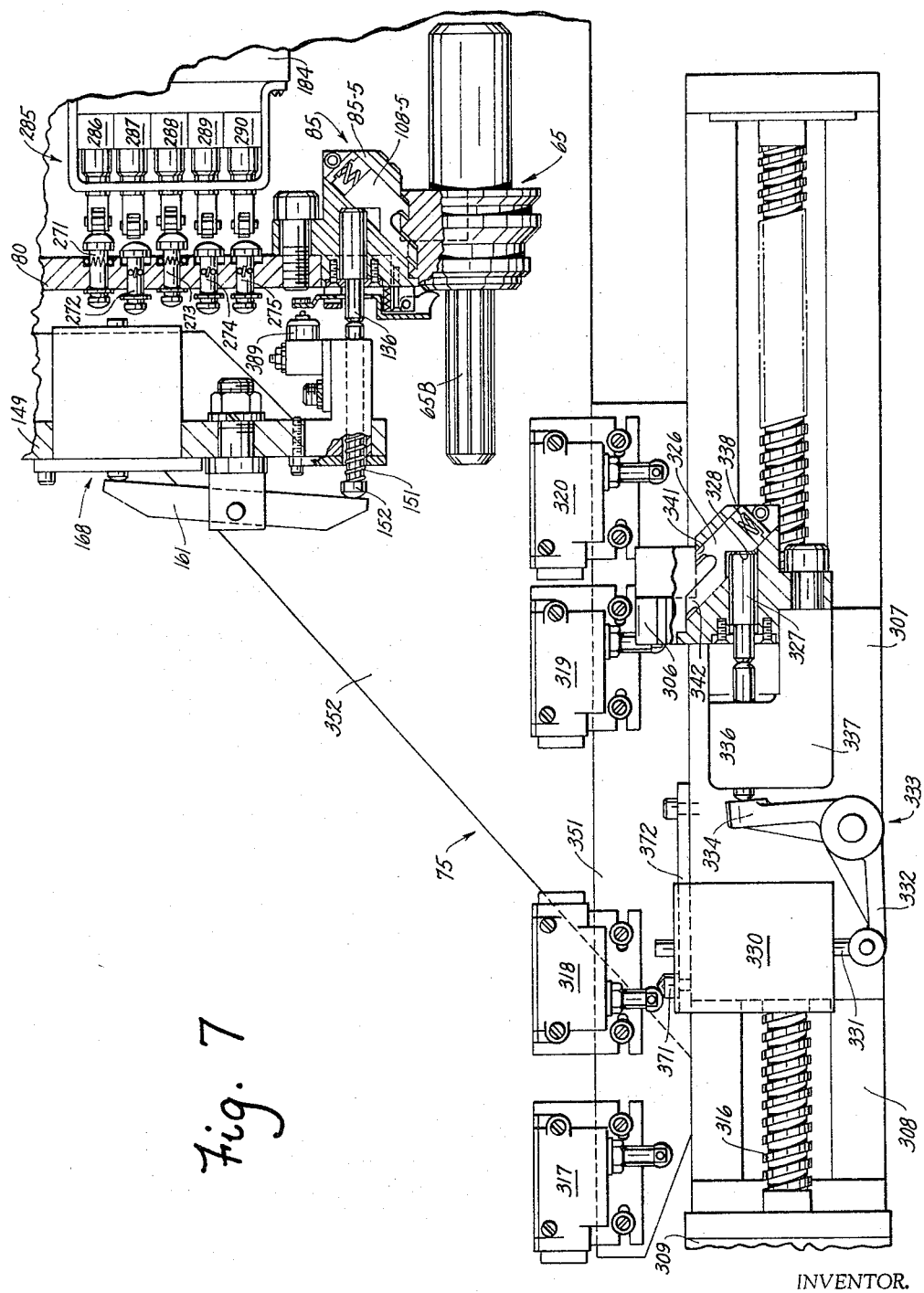
FIG. 7 is an enlarged fragmentary view mostly in right side elevation with portions broken away showing various details of the transfer clasp and a portion of the storage magazine and reading head.

The tool transfer clasp 306, shown in FIGS. 1 and 7, is identical in construction and operation to the carriers 85 provided on the magazine plate 80 and faces upwardly opposite a downwardly facing carrier 85 that is located at the ready station 86. The clasp 306 is mounted on a slide 307 which is supported for sliding movement on a horizontally disposed guideway 308. The slide 307 is moved along the guideway 308 by an electric brake motor 309, of any well-known commercially available type. The brake motor 309 is provided with a brake mechanism (not shown) which is energized and deenergized simultaneously with the energization and deenergization of the motor. When the motor 309 is energized, the associated brake mechanism is also energized to release the motor for operation. On the other hand, when the motor 309 is deenergized, the associated brake mechanism (not shown) is also deenergized and operates to apply a brake to the motor. Power from the motor 309 is transmitted to the slide 307 by a rotatable axially immovable screw 316 that is threadedly engaged in a nut (not shown) carried by the slide 307. As the motor 309 is energized for operation in one direction or the other, it will drive the screw 316 in the same direction which results in axial movement of the nut (not shown) along the screw 316 thereby effecting movement of the slide 307 on the guideway 308. In addition, the guideway 308 is bodily movable vertically so that the clasp 306 will be moved from a "lower level" position, shown in FIGS. 2 and 7, to an "upper level" position, depicted in FIGS. 14 and 15.

In either the "lower level" position or the "upper level" position, the clasp 306 is movable along the guideway 308 to any one of four distinct transverse positions, each of which is established by the operation of separate limit switches 317, 318, 319 or 320. Limit switch 317, when actuated, indicates in the electrical system that the tool clasp 306 is located in an "idle" position. In this position, the clasp 306 with a tool held therein, is disposed so that the tool carried by the clasp will not interfere with the vertical or horizontal movement of the spindle, nor with the rotational movement of the magazine 70. Movement of the clasp 306 to the next adjacent position, identified as "stand-by," is indicated in the electrical control system by the actuation of the limit switch 318. In the "stand-by" position, a tool carried by the clasp 306 will clear the retracted spindle 62 so that the saddle 49 may be moved vertically without interference from the tool carried by the clasp. When the limit switch 319 is actuated, it operates to indicate in the electrical system that the tool clasp 306 is disposed in an "aligned" position in which it is directly under a carrier 85 located at the ready station 86.

Figure 9:
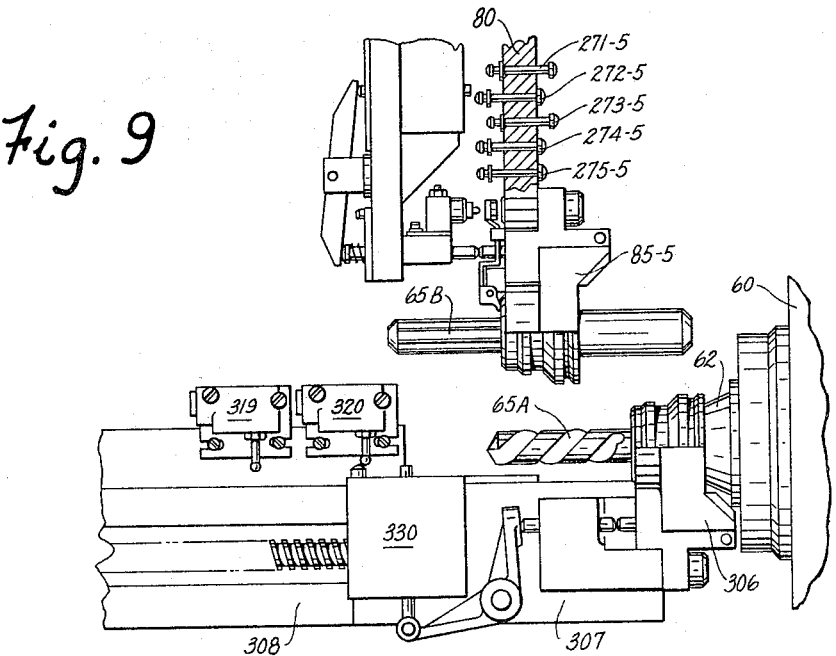
Figure 10:
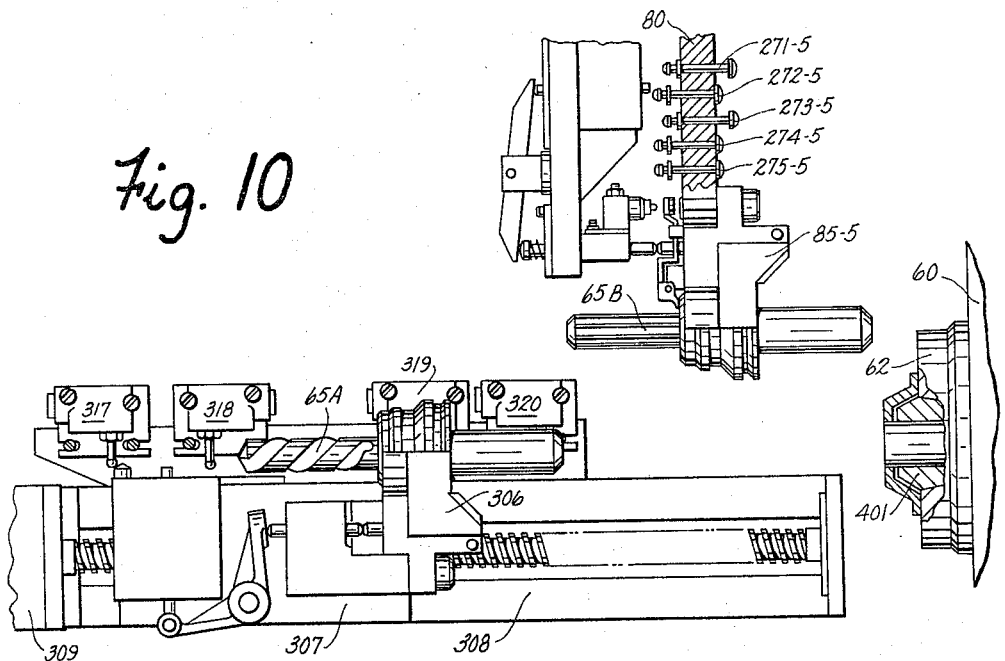

When the carriage 307 is moved to its extreme limit of rightward travel it operates to move the clasp 306 into an "extend" position. This position of the clasp 306 is indicated in the electrical system by the actuation of the limit switch 320. Assuming that the spindle 62 is positioned in alignment with the clasp 306 and that the spindle 62 is carrying a previously used tool 65 such as the drill 65A, then when the clasp 306 is moved into the "extend" position, it will engage the drill 65A, carried by the spindle, the spindle at this time being located at the "lower level" position and in a "retracted" position. This condition is depicted in FIG. 9. However, prior to the clasp 306 being moved into the "extend" position, a claw or grip 326 of the clasp 306, as shown in FIG. 7, is moved to a "retracted" position. As previously mentioned, the clasp 306 is identical in construction and operation to the magazine carriers 85. The retraction of the claw 326 of the clasp 306 for releasing a tool carried by it is effected by the operation of a plunger 327 which is adapted to engage a vertical surface 328 of a notch formed in the claw 326. Axial movement of the plunger 327 in a rightward direction, as viewed in FIG. 7, to effect the retraction of the claw 326, is accomplished by operation of a solenoid 330 which is secured to the side of the slide 307.

The solenoid 330 is provided with a rod 331, which extends outwardly and downwardly from the housing of the solenoid, with the extending end being pivotably connected to the extending end of an arm 332 of a pivotable crank 333. Another arm 334 of the crank is disposed to engage the leftward extending end of a plunger 336 which is supported for horizontal sliding movement in a suitable opening formed in a bracket 337. The plunger 336 is disposed in axial alignment with the plunger 327 and is arranged so that the rightwardly extending end of the plunger 336 is adapted to engage the leftwardly extending end of the plunger 327. With the solenoid 330 energized, the rod 331 will move upwardly, as viewed in FIG. 7, causing the crank 333 to pivot in a clockwise direction. The clockwise pivotal movement of the crank 33 will apply a rightwardly acting force to the plunger 336 which, in turn, acts on the plunger 327 forcing it to move in a rightwardly direction. The rightwardly moving plunger 327 engages the vertical surface 328 of the claw 326 causing the claw to be moved downwardly compressing a spring 338. On the other hand, with the clasp 306 in engagement with a tool to lock the tool in the clasp, the coil of the solenoid 330 will be deenergized. When the solenoid is deenergized, the rod 331 will be moved downward thereby pivoting the crank 333 in a counterclockwise direction. This action removes the rightwardly acting force from the left end of the plunger 336. When this force is removed, the spring 338 operates to move the claw 326 upwardly so that an associated pair of fingers 341 and 342 engage in the annular V-grooves 101 and 102 formed in the tool.

In FIGS. 2 and 7, the tool transfer clasp 306 has been illustrated at one of two operative levels in which it may be located for effecting a tool transfer operation. In FIG. 7, the clasp 306 is depicted as positioned at a horizontal level hereinafter referred to as the "lower level" and is positionable to a horizontal "upper level." Both the "lower level" and the "upper level" are in the same vertical plane which passes through the ready station 86 in which a selected tool carrier 85 is located. The two tool change levels are provided for the reason that the single tool transfer clasp cooperates with movement of the machine spindle 62 for effecting a tool change. In the "lower level" position, the tool transfer clasp 306 may be operated to engage and remove a previously used tool from the spindle 62, the spindle previously having been moved to the "retracted" position and located at the "lower level" position.

In FIG. 2, the various components are depicted in positions they occupy just prior to a tool change. As shown, the saddle 49 is located at a position adjacent the table 66 hereinafter known as the work station. The spindle head 60 has been retracted into the saddle 49 and may be moved vertically to locate the spindle 62 at the "retracted" and "lower level" positions. In FIGS. 2 and 7, the tool transfer clasp 306 is depicted as being located in the "lower level" position, and also in a "stand-by" position. Since the tool transfer clasp 306 is empty it is in a condition to be advanced to the "extend" position, into engagement with the previously used tool 65A presented by the spindle 62 at the "lower level" position. This relationship is depicted in FIG. 9. Also, the magazine 70 has been indexed and a particular carrier 85–5 has been identified, selected, and positioned at the ready station 86 so that the tool 65B, which is stored in the particular carrier 85–5, is available to the spindle 62.

In the "lower level" position, the tool clasp 306 either operates to remove a previously used tool from the spindle 62, or operates to insert a different tool in the spindle 62, as will hereinafter be more fully described. On the other hand, at the "upper level" position, an operable relationship is established between the tool transfer clasp 306 and a particular carrier 85 of the magazine. Likewise, when the spindle 62 is moved to its "upper level" position, it is in position to engage the selected tool in a magazine carrier 85. For example, it will be assumed that at its "lower level" position, the transfer clasp 306 had been operated to remove the previously used tool 65A from the spindle 62 and thereafter moved to the "idle" station, depicted in FIG. 10. Thereafter, the saddle 49 will be moved vertically to position the spindle 62 at the "upper level" position behind the tool 65B supported in the carrier 85–5 and located at the ready station 86, depicted in FIG. 11. Thereafter, the spindle 62 will be advanced into "aligned" position to operatively engage the tool 65B and the claw of the carrier 85–5 will be retracted to release the tool from the carrier. Also, the spindle collet 401, depicted in FIGS. 3 and 23, is actuated to securely clamp the tool 65B in the spindle, as will be subsequently described. The spindle 62 is now retracted from its "aligned" position to withdraw the tool 65B from the carrier and the saddle 49 will be moved downwardly toward the work station. With the tool 65B removed from the carrier 85–5 and the spindle 62 moved to the work station, the magazine 70 is rotated to position the empty carrier 85–18, in which the tool 65A had been previously stored, into the ready station 86. Simultaneously therewith, the transfer clasp 306, with the tool 65A secured therein, is moved to the "alignment" position at the "lower level," depicted in FIG. 13. Thereafter, the entire guideway 308 is moved to the "upper level," and since the transfer clasp 306 is in the "alignment" position, the tool 65A, secured in the clasp 306, is inserted into the carrier 85–18, depicted in FIG. 14. The claw 108–18 of the carrier 85–18 is now released, and by operation of the spring 140–18, is moved into engagement with the tool 65A to lock the tool in the carrier. Simultaneously, the claw 326 of the transfer clasp 306 is withdrawn from engagement with the tool 65A to release it. The transfer clasp 306 is now moved along the slide 308 to the "stand-by" position at the "upper level" location, depicted in FIG. 15.

With the transfer clasp 306 in "upper level" and "stand-by" positions, the magazine is rotated and a different carrier 85–11 is selected and located at the ready station 86 so that the tool 65C stored therein is available for transfer to the spindle. Upon the selective positioning of the carrier 85–11 at the ready station 86, the transfer clasp 306, previously moved to the "upper level" position, is now moved to the "alignment" position, shown in FIG. 16. In this position, the transfer clasp 306 is in engagement with the tool 65C and its claw 326 is advanced to secure the tool to the clasp. Simultaneously, the claw associated with the carrier 85–11 is retracted so that the tool may be withdrawn from the carrier by the transfer clasp. Thereafter, the transfer clasp 306 is moved from the "upper level" and "alignment" positions to "lower level" and "idle" positions, and the magazine 70 rotated to bring the only other empty carrier into the ready station 86, which in this particular instance is the carrier 85–5, shown in FIG. 17. The empty carrier 85–5, which is now located in the ready station 86, is the carrier from which the tool 65B, presently being used in a machining operation, was previously stored. Thus, upon the completion of the work operation, the saddle 49 may be moved to position the spindle and tool 65B at the "upper level" position, and the spindle 62 at the same time may also be advanced to "aligned" position so that the tool 65B is inserted into the awaiting carrier 85–5, depicted in FIG. 18. The claw associated with the carrier 85–5 is actuated to secure the tool 65B in the carrier, while the spindle collet 401 is actuated to release the tool. Thereupon, the spindle 62 is moved to a "retracted" position leaving the tool 65B in the magazine carrier 85–5 in which it was originally stored.

The saddle 49 is then moved downwardly to position the spindle 62 at the "lower level" and "retracted" positions. Simultaneously, with the movement of the saddle, the magazine 70 is rotated so that a selection of another carrier can be made.

In FIG. 19, carrier 85–9, in which tool 65D is stored, is illustrated as being located in the ready station 86. This tool will be available for engagement by the spindle 62 upon a subsequent tool change cycle of operation. However, the tool 65C, which is to be inserted into the spindle 62, is carried by the tool transfer clasp 306 which is located at the "lower level" and "idle" positions, shown in FIG. 19. With the components positioned as shown, the transfer clasp 306 is advanced to insert the tool 65C into operative engagement in the spindle 62, as depicted in FIG. 20. The claw 326 associated with the transfer clasp 306 is then retracted, the spindle collet 401 clamped, and the transfer clasp 306 moved to the "lower level" and "stand-by" positions, depicted in FIG. 7. Simultaneously, the spindle 62 with the tool 65C is moved to the work station to perform a work operation. Thus, the transfer clasp 306 and the magazine 70 are now conditioned and ready for the next tool change cycle of operation.

In FIGS. 2 and 7, the limit switches 317 to 320, inclusive, which define the four transverse operative positions in which the transfer clasp 306 is positioned in the various steps in a complete tool change cycle of operation, are adjustably mounted on an elongated mounting bar 351. The bar 351 is secured to the side of a bracket 352, the latter being supported for vertical movement on a carriage 353. As shown in FIGS. 1 and 2, the carriage 353 is slidably supported on a pair of ways 354 attached to the front of the column 41. The bracket 352 is also provided with a horizontal rightwardly extending arm 350 on which is secured the horizontal transversely disposed guideway 308. The carriage 353 is positioned so that the transfer clasp 306 is in the "lower level" and is movable by power upwardly to locate the clasp 306 in the "upper level" position. The vertical movement of the transfer clasp 306 in either direction is effected by power movement of the carriage 353 which is accomplished by rotating a screw 356, that is in threaded engagement with a nut (not shown) fixed to the underside of the carriage 353. The screw 356 is rotatably supported in brackets 357 and 358 in suitable bearings (not shown) and is driven by a brake motor 360 that is secured to the column 41.

The "lower level" position of the transfer clasp 306 is indicated in the electrical control system by a limit switch 361 that is mounted on a bracket 362 adjustably secured to the machine cap 51. With the carriage 353 in its lowermost position, locating the transfer clasp 306 in the "lower level" position, the limit switch 361 is actuated by a rod 363 that is secured to the side of the carriage for movement with it. On the other hand, when the motor 360 is operated to move the carriage 353 to its uppermost position, wherein the transfer clasp 306 is moved to the "upper level" position, that position is indicated in the electrical control circuit by the operation of another limit switch 366. The switch 366 is also mounted on an adjustable bracket 367 and is likewise secured to the machine cap 51, shown in FIGS. 1 and 2. Thus, when the transfer clasp 306 is moved to the "upper level" position, the rod 363 moving with the carriage 353 will release the limit switch 361 and will move into a position to actuate the limit switch 366 to thereby indicate in the electrical control system that the transfer clasp 306 is in "upper level" position.

The four limit switches 317 to 320 inclusive, which operate when actuated to indicate the various transverse positions of the tool transfer clasp 306, are each actuated by a dog 371 carried on the end of an extension plate 372, shown in FIGS. 2 and 7. The extension plate 372 is secured to the slide 307 and extends inwardly therefrom so that the dog 371 is located in position to engage the actuating plungers of each of the limit switches 317 to 320 inclusive, during transverse movement of the slide 307.

During a complete tool change cycle of operation as herein set forth, the transfer clasp 306 is movable relative to the spindle 62 in a direction parallel to the axis of the spindle, and such movement is effected by the motor 309. The transfer clasp 306 is also positionable to one or the other of two vertical positions, identified herein as a "lower level" position or an "upper level" position, and such movement of the clasp is effected by the motor 360. In either the "upper level" or the "lower level" positions, the clasp 306 may be located at a selected one of the four transverse positions, as defined by the limit switches 317 to 320 inclusive. The different tools required for performing the different machining operations are automatically inserted into the spindle 62 so that the machining operations may be performed successively with a minimum of time required for a tool changing function. Selection of a tool stored in the magazine for location at the ready station 86 is accomplished by identifying the position in which the tool is stored. Position identification is accomplished by operation of the coding mechanism 270 associated with each carrier 85. The coded identification of each carrier 85 is established by adjusting the plungers 271 to 275, inclusive, associated with each carrier 85 in proper combination and such adjustment of the plungers is accomplished at the time that the tools are stocked in the carriers.

As previously mentioned, when a tool such as the tool 65B in FIGS. 2 and 7, which is stored in the carrier 85–5 and depicted as being located in the tool station 86, is removed from its carrier by either the spindle 62 or the transfer clasp 306, the magazine 70 must be automatically indexed so as to locate the only other empty carrier, such as the carrier 85–18, at the tool change station 86. This action is necessary so that the previously used tool, such as the drill 65A in FIG. 15, may be returned to its proper carrier which has previously been coded for identification as the carrier in which the drill 65A is stored.

A separate indexing mechanism is provided for returning the empty carrier to the tool change station 86 in order to avoid the necessity of reprogramming the binary number that represents this particular carrier and operating the control system in response to signals from the reading head 285 as is done when selecting the tools for insertion into the spindle 62. To accomplish this automatic indexing of the magazine 70, each of the carriers 85 is provided with mechanical means for effecting the operation of the control system to accomplish the required indexing operation of the magazine 70 for positioning the desired empty carrier at the ready station 86. Such mechanism is shown in FIGS. 3, 4 and 21 and comprises a lever 381 having a pair of inwardly directed lugs 382, which are disposed on either side of a bracket 383 that is fastened to the outer surface of the carrier 85. A hinge pin 384 carried by the bracket 383 pivotally supports the lever 381. The lever 381 extends upwardly and is provided with an enlarged opening 386 through which the reduced end 145 of the plunger 136 extends. On its upper end, the lever 381 is provided with a pad 387 which is disposed adjacent an actuating plunger 388 of a limit switch 389 that is secured to the top surface of the bracket 148 of the depending arm 149.

Each of the lugs 382 is provided with a cam portion 391 having a cam surface 392 which is normally adapted to engage the outwardly facing end surface 393 of a tool 65, shown in FIG. 4. When a tool 65 in a carrier 85 is located at the tool change station 86, the cam surfaces 392 are disposed to engage the axial end face of the tool collar so that the lever 381 is positioned in a vertical plane. In this position of the lever 381, a spring 396 is compressed and the lever is positioned so that its upper pad 387 does not engage the actuating plunger 388 of the limit switch 389 located at the tool change station 86. However, when the tool 65 is removed from the carrier, the spring 396 operates to effect the pivotal movement of the lever 381 about the hinge pin 384 in a counterclockwise direction. This movement of the lever shifts its upper pad 387 into actuating engagement with the plunger 388 of the limit switch 389 to actuate the limit switch. Upon actuation of the limit switch 389, the electrical control system is conditioned to initiate operation of the motor 170 to rotate the magazine 70. As the magazine rotates and the several tool carrying carriers move past the ready station 86, the tools in the carriers will operate to maintain the lever 381 associated with each carrier in the vertical position. In this position, the individual levers cannot actuate the limit switch 389. As a result, the magazine motor 170 continues to operate, moving the carriers in their circular path of travel past the ready station 86. When the magazine has rotated to bring the only other empty carrier, such as the carrier 85–18, into the ready station 86, a lever 381 associated with the carrier will actuate the limit switch 389 to effect deenergization of the motor 170 thereby stopping the magazine, locating the desired empty carrier 85–18 at the tool ready station 86. It will be appreciated that each carrier has associated therewith a limit switch actuating lever 381 but that there is only one limit switch 389 and it is located at the ready station 86.

The functions of the various machine components in a tool change cycle of operation are set forth in the circular chart shown in FIG. 22. As there shown, seven concentric rings, individually identified by the reference letters A to G, inclusive, represent the various individual machine components which are utilized in a tool change cycle of operation. As shown in the chart, each of the rings A to G inclusive, has a plurality of identified radial markers that indicate the initiation of a function to be accomplished by the particular related component. The radial marks which indicate the initiation of a function are identified by the references M1 to M34, inclusive. The number designation following the letter M of a marker identification character represents the sequence of initiation of the function indicated by a particular radial marker. Thus, the radial marker M1 of ring D indicates that the spindle 62 is to be moved to the "lower level" and to a "retracted" position, and is the first step in the tool change cycle of operation. The arcuate space of a ring between two adjacent radial markers of the same ring represents the interval that the related component is in the condition indicated by the legend within the space. For example, the arcuate space of ring A from the radial marker M21 in a clockwise direction to the marker M13 represents the interval of time that the transfer clasp 306 is in the "lower level" position. The movement of the transfer clasp 306 to the "lower level" position is indicated by the radial marker M31.

Ring B represents the claw 326 of the transfer clasp 306 with the radial markers M3 and M19 thereof indicating that the claw is to be advanced to lock a tool in the clasp. The radial markers M15 and M32 of ring B indicate that the claw 326 is to be retracted so that it operates to release a tool.

The next ring, identified as "C," is related to the horizontal position into which the transfer clasp 306 will be located in a tool change cycle of operation. In this ring, the radial markers M2 and M30 indicate that the transfer clasp 306 is to be moved to the "extended" position at the "lower level" location. The radial markers M5 and M23 indicate that the transfer clasp 306 is to be moved to the "idle" position at the "lower level." Similarly, radial markers M1 and M18 indicate that the transfer clasp is to be moved to an "aligned" position. However, the movement of the transfer clasp 306 to "aligned" position, as indicated by the radial marker M11, will be accomplished while the transfer clasp 306 is at the "lower level" position. This is true because the radial marker M11 is within the section of the chart which is defined by extending the radial markers M21 and M13 of ring A. Thus, any function indicated by a radial marker of any of the rings B to G, inclusive, which is within the section of the chart enclosed by extending the radial markers M21 and M13, will occur while the transfer clasp 306 is in the "lower level" position. On the other hand, the movement of the transfer clasp 306 to the "aligned" position, as indicated by the radial marker M18, will occur while the transfer clasp is at the "upper level" position. This is shown by extending the radial marker M18 inwardly toward the common axis O of the concentric rings. Extension of the radial marker M18 inwardly reveals that it will intersect the arcuate space of ring A which is defined by the radial markers M13 and M21. This arcuate space is representative of the time that the transfer clasp 306 is in the "upper level" position. Ring C of the chart of FIG. 22 has two other radial marks M16 and M33 which indicate that the transfer clasp 306 is to be moved to the "stand-by" position. However, the movement of the transfer clasp 306 to "stand-by" position, as indicated by the radial marker M16, will occur while the transfer clasp is in the "upper level" position. On the other hand, the movement of the transfer clasp 306 to the "stand-by" position, as indicated by the radial marker M33, will occur while the transfer clasp is in the "lower level" position.

The next concentric ring identified by the letter "D" relates to spindle movement. This ring is provided with eight radial markers, with the marker M1 indicating that spindle 62 is to be moved to the "lower level" position and to a "retracted" position. Moving around the ring D in a clockwise direction, the radial marker M6 indicates that the spindle 62 is to be moved to the "upper level" position, while being maintained in the "retracted" position. On the other hand, the next radial marker M7 indicates that the spindle 62 is to be moved to "aligned" position while it is maintained in the "upper level" position. The radial marker M10 of ring D indicates that the spindle 62 is to be moved to the work station. The movement of the spindle 62 to the work station will be initiated directly from the previous position occupied by the spindle as indicated by the arcuate space defined by the radial markers M7 and M10. This arcuate space indicates that the spindle 62 is at the "upper level" and "aligned" positions. Therefore, the initiation of movement of the spindle to the work station will occur from the "upper level" and "aligned" positions. However, prior to the initiation of the function indicated by the radial marker M10 it will be apparent that two other functions must have been accomplished, as suggested by the radial markers M8 and M9 of rings E and F respectively, prior to the position of the radial marker M10 in ring D. Ring D includes radial marker M24 which indicates that the spindle is to be moved to the "upper level" and "aligned" positions and this movement is to be initiated directly from the work station. From the "upper level" and "aligned" positions, the next movement of the spindle will be to the "upper level" and "retracted" positions, as indicated by the radial marker M27. From the position indicated by the arcuate space defined by the radial markers M27 and M29 the spindle will be moved to the "lower level" and "retracted" positions, as indicated by the radial marker M29. The final positioning movement of the spindle 62 in a tool change cycle of operation is a return movement to the work station as indicated by the radial marker M34 of ring D.

As shown in FIG. 3, the spindle 62 is provided with a collet 401 operatively supported within the bore of the spindle 62 and operable in a well-known manner to securely hold a tool in the spindle. The mechanism for effecting the operation of the collet 401 in a tool securing operation, or a tool releasing operation, is shown schematically in the hydraulic diagram of FIG. 23. As there shown, an actuator 402, comprising a cylinder 403 in which a piston 404 is supported for reciprocal movement, is provided for effecting the clamping or releasing movement of the collet 401. The piston 404 is provided with a rod 406 which extends outwardly of the cylinder 403 and is operatively connected with the collet 401 to effect the axial movement of the collet in either direction. Thus, movement of the piston 404 in a leftward direction, as viewed in FIG. 23, will effect leftward movement of the collet 401. Upon being moved in a leftward direction, the collet 401 will expand to an open position to release a tool or to receive a tool therein. On the other hand, rightward movement of the piston 404, as viewed in FIG. 23, will effect rightward axial movement of the collet 401 to effect the contraction of the collet for locking a tool in the spindle.

The concentric ring E of the chart of FIG. 22 relates to the spindle collet 401 and is provided with four radial markers M4, M8, M26 and M31. The radial markers M4 and M26 indicate that the collet 401 is to be operated to a released position. Conversely, the radial markers M8 and M31 indicate that the collet 401 is to be operated to a clamped position. Thus it can be seen that in a complete tool change cycle of operation, the spindle collet 401 is operated twice to a released position, as indicated by the radial markers M4 and M26; and is also operated twice into a clamped position, as indicated by the radial markers M8 and M31.

In the chart of FIG. 22, the concentric ring F, relates to the claw of a particular carrier of the magazine which is located at the ready station 86. The ring F is provided with four radial markers M9, M14, M20 and M25. Markers M9 and M20 indicate that the claw of a particular carrier that is located at the ready station 86 is to be retracted to released position so that a tool may be extrated from or inserted into the carrier. However, the radial markers M14 and M25 indicate that the claw of the carrier located at the ready station is to be advanced into tool locking position.

The outermost ring of the chart of FIG. 22, identified by the letter "G" relates to the magazine 70 and shows the various conditions of the magazine in a tool change cycle of operation. Four radial markers M12, M17, M22 and M28 are shown in ring G, each of which indicates the initiation of a magazine function. Thus, the radial markers M12 and M22 indicate that the magazine 70 is to be indexed to locate the only other empty carrier of the magazine at the ready station 86. With this function of the magazine initiated, the particular carrier from which the tool was removed for the preceding work operation is again positioned to be restocked with the same tool. On the other hand, radial markers M17 and M28 both indicate the initiation of the function in which the magazine is indexed to locate a particular selected magazine carrier at the ready station.

In the chart of FIG. 22, a broken radial line, extending from the common center O, is identified as indicating the start of a first tool change. It will be observed that this broken line passes through the various concentric rings and by following the line from the common center O, the various initial conditions of the various components may be determined prior to starting the first tool change operation. Thus, it will be seen that the transfer clasp 306 is positioned at the "lower level" position, as indicated by the arcuate space of ring A through which the broken radial line passes. Moving radially outwardly along the broken line, it will be observed that the line passes through the arcuate space of ring B which indicates that the claw 326 of the transfer clasp 306 has been retracted. The broken line also passes through the arcuate space of the ring C which indicates that the transfer clasp 306 is in "stand-by" position. Thus, the three rings A, B and C of the chart which relates to the transfer clasp show that at the start of a first tool change, that the transfer clasp is in the "lower level" position and also at "stand-by" position. Moving further outwardly along the broken line which indicates the start of the first tool change operation, it will be observed that the line coincides with the solid radial marker line M1 of the circular ring D. This indicates that the first action required in a tool change operation is the function that is indicated by the marker M1 which is that the spindle 62 is to be moved to the "lower level" and "retracted" positions. If the spindle 62 is assumed to have just completed a work operation under the control of signals from tape, the spindle head 60 would first be retracted, and thereafter, the saddle 49 moved upwardly so as to position the retracted spindle at the "lower level" position.

Moving further outwardly along the broken radial line, which indicates the start of the first tool change, it will be observed that the broken line passes through the arcuate space of ring E, which indicates that the spindle collet 401 is in a clamped condition, as it normally would be with the spindle just having finished a work operation. The broken radial line also passes through the arcuate space of ring F which indicates that the claw of the carrier of the magazine that is located at the ready station 86 with a tool therein is advanced so that the tool in the carrier is locked in the carrier. Finally, the broken line passes through an arcuate space of the outermost ring G which indicates that the magazine has been indexed to select a particular carrier for location at the ready station 86. Thus, the initial conditions of the various machine components at the start of a tool change cycle of operation may be readily determined from the chart. It is also apparent that if a radial line be drawn from the common center O outwardly therefrom so as to intersect all of the concentric rings A to G inclusive, the radial line would indicate the condition of all of the particular machine components at that particular instance. For example, another broken radial line has been inserted from the common center O and passes through the seven concentric rings A to G inclusive, and this line is identified in the chart as indicating the finish of the first tool change. Moving outwardly along this broken line, it will be seen that upon the finish of the first tool change operation, the transfer clasp 306 is still in the "lower level" position but is now moved to the "idle" position at the "lower level" position. From the chart it can also be seen that the spindle 62 is positioned at the "upper level" position and in an "aligned" position in which it is in engagement with the tool presented by a particular carrier located at the ready station 86. Moving further along the broken line which indicates the finish of the first tool change operation, the broken line passes through the arcuate space of the ring E, which indicates that the spindle collet 401 is in a clamped condition, so that it operates to securely couple the tool to the spindle. Further along the broken line passes through the arcuate space of ring F, which indicates that the magazine carrier, that is located at the ready station has had its associated claw retracted so that the claw is no longer operative to secure the tool within the carrier. Finally, the broken line which indicates the finish of the first tool change passes through the arcuate space of the outermost ring G, which indicates that the selected carrier of the magazine that previously had been located at the ready station is still in the ready station. With the components in the position indicated by the arcuate spaces of the various rings A to G inclusive, of the chart through which the broken line representation of the finish of the first tool change passes, the second tool change in a complete tool change cycle of operation will be initiated. However, before the second tool change is initiated, a plurality of other functions must be completed. These functions are indicated by the radial markers M10 through M23 shown in the chart and previously described.

In the chart of FIG. 22 there is shown another broken radial line which extends from the common center O and serves to indicate the start of a second tool change operation. It will be noted that the arcuate space of the ring D that is between the broken radial line which indicates the start of the second tool change, indicates that upon completion of the first tool change operation, the spindle with a new tool is to moved to the work station. It will also be noted that the functions indicated by the arcuate spaces of rings A, B, C, E, F and G, which are between the two above mentioned broken radial lines, are to be effected while the spindle is performing a work operation.

A fourth broken radial line is shown in the chart of FIG. 22 and indicates the finish of the second tool change operation. Upon completion of the second tool change, the spindle again is moved to the work station for performing a work operation. This function is the only function initiated at this time and is indicated by the arcuate space of ring D which extends between the broken radial line which indicates the finish of the second tool change operation and the broken radial line which indicates the start of the first tool change operation.

From the foregoing description, it is apparent that the position and condition of any component at any time in a tool change cycle of operation may be determined by constructing a radial line from the common center O of the rings of the chart of FIG. 22. The arcuate spaces of the rings which this imaginary radial line intersects will indicate the position and condition of the various components.

A hydraulic circuit for operating the tool spindle motor 63, the column motor 45, the head saddle motor 52, and the motor 59, for moving the spindle head 60 is diagrammatically depicted in FIG. 23. The hydraulic circuit illustrated also includes the circuit for actuating the spindle collet 401. Hydraulic fluid under pressure is withdrawn from a sump 417 by a pump 415 driven by a motor 416 to supply fluid pressure to lines 418 and 419. A servo control valve 420 is schematically represented as interconnected between a supply line 421 which branches from the supply line 418, and a supply line 422 which is connected to the hydraulic motor 63. Another hydraulic line 423 is connected between the motor 63 by way of the servo valve 420 to a line 424. The servo control valve 420 is operative in well-known manner under the control of a motor 428 to selectively vary the rate and direction of rotation of the spindle motor 63. The supply line 418 is connected to supply fluid pressure to a connected branch line 429 which, in turn, is connected to supply fluid pressure to the inlet port of a control valve 430 associated with the mechanism for effecting collet clamping or releasing operation. Another port of the control valve 430 is connected to the exhaust line 424 by means of a connected line 431. Upon energization of a solenoid 434 associated with the valve 430, it will operate to effect leftward movement of a valve spool 432 into the position shown in FIG. 23 thereby connecting the pressure supply line 429 to a hydraulic line 436 via a passage 437 formed in the valve spool 432. With the valve spool 432 in its leftward position, the hydraulic line 433 is connected via another passage 438 in the valve spool to the exhaust line 431. Under this condition, fluid pressure supplied to the right end of the cylinder 403 via the line 436 will effect leftward movement of the piston 404 for moving the collet 401 leftwardly a slight distance relative to the spindle 62 to release a tool secured therein. Whenever the collet 401 is to be reclamped for securing a tool in operative engagement within the spindle 62, the solenoid 434 is deenergized and a solenoid 441 is energized to effect movement of the valve spool to its extreme rightward position. With the valve spool 432 in rightward position, fluid from the rightward end of the cylinder 403 is exhausted via the line 436, a passage 442 formed in the valve spool 432 to the exhaust line 431. At the same time, fluid pressure from the supply line 429 flows through another passage 443 formed in the valve spool to the line 433 and thence to the left end of the cylinder 403 effecting the rightward movement of the piston 404 relative to its associated cylinder to effect a clamping engagement of the collet 401 locking the tool within the spindle 62.

The fluid pressure from the pump 415 is supplied to a branch supply line 419, as previously mentioned, for effecting the various positional movements of the column and saddle as required. For effecting positional movement of the saddle 49, the motor 52 is under the control of a servo valve 456 which is supplied with fluid pressure by operation of a solenoid actuated valve 457. With a valve spool 458 of the valve 457 biased to its rightward position, as shown, the servo valve is connected via a line 459 and a passage 461 formed in the valve spool to a branch return line 464 that is connected to the main return line 424. Energization of a solenoid 462 effects leftward movement of the valve spool 458, connecting the fluid pressure line 419 with the line 459 via a passage 463 formed in the valve spool and now positioned to connect the pressure supply line to the line 459. Fluid pressure then flows from the line 459 to the servo valve 456 which is operative from a source of command signals to effect a distribution of fluid pressure to the line 466 for actuating the motor 52 in a direction to move the saddle 49 downwardly. For controlling the rate of rotation of the motor 52, fluid is exhausted therefrom via a line 467 to the servo valve 456 which is now operable to control the rate of flow of exhaust fluid pressure therethrough and to direct exhaust fluid to a return line 468 which is connected to the branch return line 464 via a common connecting line 469. On the other hand, should the desired movement of the saddle 49 be in an upward direction, the operational command signals obtained from the tape reader 376 in response to the information contained on a tape 378 that is being read by the reader will cause the servo valve 456 to operate so as to direct the fluid pressure supplied thereto to the line 467 to effect the operation of the motor 52 in the opposite direction for moving the saddle 49 upwardly. Under this condition, the exhaust from the motor 52 will flow into the line 466 and be returned to the servo valve which operates to meter the exhaust fluid flowing therethrough for controlling the rate of upward movement of the saddle 49 with the discharged fluid flowing into the lines 468 and 469 and returning to the reservoir via the connected return lines 464 and 424.

A similar arrangement is provided for effecting the movement of the column 41 for positioning the spindle 62 along the X axis. The column drive motor 45 is under the control of a servo valve 471 which is supplied with fluid pressure by operation of a solenoid actuated valve 472. With a valve spool 473 biased to its rightward position as shown, the servo valve 471 is connected via a line 474 and a passage 476 formed in the valve spool, to the return line 464. Energization of a solenoid 477 effects leftward movement of the valve spool 473, connecting the fluid supply line 419 with the line 474 via a connected line 478 and another passage 479 formed in the valve spool and which is now positioned to connect the line 478 to the line 474. Fluid pressure then flows from the line 474 to the servo valve 471, which under operational control of command signals from the tape reader 376, directs the fluid pressure to a line 481 to actuate the hydraulic motor 45 for effecting its operation in a direction to move the column 41 rightwardly. The fluid pressure to the motor 45 will flow therefrom into a connected line 482 and thence to the servo valve 471 which is operative at this time to meter the flow of exhaust fluid therethrough and to direct the exhaust fluid into the return line 483 that is connected to the common return line 469 which is in communication with the return line 464. However, should the operational command signals which control the servo valve 471 be such as to call for leftward movement of the column 41, the servo valve would then be operated to direct fluid pressure supplied thereto via the line 474 into the line 482 to effect the operation of the motor 45 in the opposite direction for moving the column 41 leftwardly. Under this condition, the flow of fluid through the motor 45 will flow into the line 481 and return to the servo valve to be metered thereby for controlling the rate of motor operation with the servo valve directing the exhaust fluid into the connected line 483 and thence to flow into the common return line 469 which is connected to the return line 464.

A similar arrangement is provided for moving the spindle head 60 inwardly or outwardly in a direction transversely of the directions in which the column 41 and the saddle 49 are movable. For effecting the required movement of the spindle head 60, the drive motor 59 is under the control of a servo valve 486 which is supplied with fluid pressure by operation of a solenoid actuated valve 487. With a valve spool 488 of the valve 487 biased into its leftward position as shown, the servo valve 486 is connected via a line 489 and a passage 491 formed in the valve spool to a return line 492 which is in communication with the common return line 469. Energization of a solenoid 493 effects rightward movement of the valve spool 488, thereby connecting a line 494, which is receiving fluid pressure from the pressure line 419, to the line 489 via another passage 496 formed in the valve spool 488. Fluid pressure then flows from the line 489 to the servo valve 486 and by its operation under the operational control of command signals originating in the tape reader 376 will direct the fluid pressure to a line 497 to actuate the hydraulic motor 59 in a direction to effect a retracting movement of the spindle head 60 towards the rear of the machine. Fluid flowing through the motor 59 flows into a connected line 498 and returns to the servo valve which operates to control the rate of flow of the exhaust fluid for controlling the rate of operation of the motor 59. The metered exhaust fluid is discharged from the servo valve 486 into a connected return line 499 which, in turn, is connected to the line 492 leading to the common return line 469. Should the command signals, which control the operation of the servo valve 486, be such as to operate the servo valve for directing the fluid pressure into the line 498, the motor 59 will then be operated in the opposite direction for moving the spindle head 60 outwardly, or in an advancing movement. Under this condition, the flow of fluid through the motor 59 will be directed into the line 497 and be returned to the servo valve, where it will be metered to control the rate of operation of the motor 59, and then discharged into the line 499 to return to the main return line 464.

All machine functions and movements are under the control of recorded data, such as, a tape on which a coded program of machine functions to be performed is recorded. Such control is effected through an electronic control system 375 responsive to a tape reader 376 contained within a cabinet 377 shown in FIG. 1. The tape reader 376, depicted in the block diagram of FIG. 24, is operative to transmit output signals from the digitally coded tape 378 to the electronic control system. As therein shown, actuation of a switch 501 connects energized lines 502 and 503, which represent a source of single phase current, to lines 505, 506 and 511 via switch contacts 508, 509 and 510. Energized lines 505 and 506 are connected to energize the tape reader 376, which is operative in well-known manner, to transmit output signals from a digitally coded tape 378, shown in FIG. 1, to a common trunk line 516 that is connected between the tape reader 376 and a plurality of signal comparators 520. Actuation of the tape reader 376 is effected through a control circuit which is completed from the energized line 502 via a connected line 511 that is connected to the operating mechanism within the tape reader 376. Both the line 505 and the line 511 are supplied from the supply line 502. In the line 511, a plurality of contacts 790B, 562A, 697A and 695A are shown, which are associated with various relays, to be subsequently described. An automatic contact 512 in the line 511 is actuated to an open position by a signal from tape upon the completion of a programmed operation. With the automatic contact 512 in an open position, as depicted in FIG. 24, the control circuit to the tape reader 376 is interrupted thereby stopping the operation of the tape reader. A cycle of operation may be initiated by actuating a pushbutton switch 513, which operates to complete a circuit around an open automatic contact 512 to actuate the tape reader 376 and advance the tape 378. A signal from the tape is subsequently obtained to operate the automatic contact 512 into a closed position thereby maintaining the circuit available for tape reader 376 operation. The tape reader 376 is also controlled by the operation of the contacts 790B, 562A, 697A and 695A, which are actuated through their associated relays. The tape reader 376 is adapted to transmit the digital information from the tape 378 to effect the operation of the various operative members as well as supply, where required, the signals for effecting indexable movement of the storage magazine 70 for preselecting a desired carrier at the ready station 86, and also provide a signal for initiating a tool change cycle of operation.

The digitally coded tape is herein assumed to be coded punched tape, and as well known in the art, the tape reader 376 is provided with a plurality of switches operative in binary code fashion by switch plungers engaging appropriately spaced holes in a punched tape, after the tape is mechanically advanced relative to the reader. This information is stored in registers in the form of sine-cosine voltage ratios for predetermined selected point-to-point positioning movements. Also, the tape reader 376 converts information from the tape for effecting the control of the various movable members. In addition to converting and storing information relative to the movement of the machine members, the tape reader 376 is also operative to store information relative to the required speeds of the tool spindle 62 and also for initiating a tool change cycle of operation.

As previously mentioned, the machine operating input signals are transmitted from the tape reader 376 to a common trunk line 516 containing a plurality of branch lines that are connected to different signal comparators. To simplify the description, the branch lines contained within the common trunk line 516 and their signal comparators have been respecitvely designated by the common numerals 518 and 519, each being followed by an appropriate numeral suffix to indicate the particular motor which is being controlled. Branch line 518–59, for example, transmits information from the common trunk line 516 to activate the signal comparator 520–59 for supplying position signal information to the comparator, while branch line 519–59 supplies a feed rate limit signal to the signal comparator 520–59 for effecting the desired movement of the spindle head 60 to the exact position at a preselected feed rate. The signal comparator 520–59 is operative to receive feedback information via lines 521–59, 522–59 and 523–59. The line 521–59 is connected to supply feedback information as to the position of the spindle head 60. On the other hand, the lines 522–59 and 523–59 are connected to supply feedback information as to the velocity of the spindle head 60 as it is being moved relative to the saddle 49. To provide accurate position feedback information, the line 521–59 is connected to a position indicator or sensing head 524 which is operatively associated with the spindle head 60, shown in FIG. 1.

Positioning control devices, such as the device 524, are well-known commercially available units and the exemplary embodiment comprises essentially a linear scale 525 which is secured to the saddle 49 so as to be relatively stationary with respect to its cooperating sensing head 524. The sensing head 524 is disposed in operative association with its cooperating scale 525, and is located on the spindle head 60 so as to move with the head. Thus, the position of the spindle head 60, as indicated by the scale 525, is sensed by the head 524 and compared with the position to which it is desired that the spindle head be positioned and an error signal obtained to effect the control of the motor 59 by regulating the operation of the servo valve 486. In like manner, the velocity of the spindle head 60 is indicated by a tachometer 526 which is connected to be driven by a screw 527. The screw 527 is connected to be driven by the motor 59 and is threadedly engaged in a nut 528 that is fixed to the spindle head 60 in well-known manner. As the screw 527 is rotated by the motor 59, the screw will operate to drive an input shaft of the tachometer 526 which, in turn, provides information as to the velocity of the spindle head 60 as it is moved relative to the saddle 49.

The cooperative coaction between the sensing head 524 and scale 525 provides an accurate feedback signal to indicate the position of the spindle head as it is being moved relative to the supporting saddle 49, while the tachometer 526 provides an accurate feedback signal to indicate the velocity of the spindle head 60 as it is being moved. Both the sensing head 524 and energizable scale 525 are operative to sense the position of a movable member and produce a voltage which is supplied as the feedback position information to the signal comparator 520–59. The tachometer 526, of course, is operative to sense the velocity of a movable member and produce a voltage which is supplied as velocity feedback information to the signal comparator 520–59.

The signal comparator 520–59 operates to produce a voltage proportional to the magnitude of the error, as well as to indicate the direction of positioning error. These voltages are compared to corresponding voltages supplied by the reading head 524 and scale 525 and the tachometer 526 to the comparator 520–59. The signal comparator 520–59 thereupon operates to produce command signals or error signals that are transmitted via a line 531–59 to actuate the servo amplifier 530–59 which is directly connected to actively control the servo valve 486 which is operable to control the velocity and extent of movement of a reversible motor 59. The operation of the motor 59 will stop upon the occurence of zero error between the feedback signals and the input signals from the branch conductors 518–59 and 519–59.

Each of the signal comparators generally represented in FIG. 24 by the common numeral 520, is connected to be energized via branch lines 536, all of which are connected to an energized line 625 which, in turn, is connected to the energized line 502. In a similar manner, the servo amplifiers generally identified by the reference numeral 530 are each connected to be energized from the branch line 536 via a connecting branch line 539. The circuits for the signal comparators 520 and servo amplifiers 530 are completed to common lines generally identified by the reference numerals 541, all of which are, in turn, connected to the energized line 507.

As hereinbefore explained, the various elements designated by common reference numerals in the block diagram of FIG. 24, are operative in similar manner to perform identical functions, although the placement of various of these elements is completely different in the associated machine structure, depending upon the particular structural component that it is associated with.

Thus, the lines 518–52 and 519–52 transmit information obtained from the tape reader 376 via the trunk line 516 to activate the signal comparator 520–52 for supplying positional and velocity control information thereto. The signal comparator 520–52 is operatively connected via the line 521–52 to receive feedback information as to the position of the saddle 49, as it is being moved relative to the column. To provide accurate position feedback information, the line 521–52 is connected to a position indicator or sensing head 542 which is secured to the saddle 49 so as to be movable therewith. The sensing head 542 is positioned relative to a cooperating relatively fixed scale 543 which is secured to the column 51 and located rearwardly of the righthand way surface 48, shown in FIG. 1. The scale 543 is connected to be energized by means of a supply line 535. The cooperative coaction between the sensing head 542 and the scale 543 provides an accurate feedback signal to indicate the position of the saddle as it is moved relative to the column 41. The co-operating sensing head 542 and energizable scale 543 are similar to the sensing head 524 and scale 525 associated with the spindle head.

To provide feedback information as to the velocity of the saddle 49 as it is moved vertically relative to the column 41, the lines 522–52 and 523–52 are connected to receive information from a tachometer 544 which is mechanically connected to be driven by the motor 52 as the motor operates to drive the saddle 49. The signal comparator 520–52 operates to produce voltage proportional to the magnitude of the error, as well as indicating the direction of the position error. The position signal and the feed rate signal supplied to the signal comparator 520–52 via lines 518–52 and 519–52 respectively, are compared to the corresponding voltages from the feedback lines and an error signal is transmitted from the signal comparator to actuate a servo amplifier 530–52 which is directly connected to accurately operate the servo valve 456 for controlling the velocity and extent of movement of the reversible motor 52. The operation of the motor 52 will stop upon the occurrence of zero error between the feedback information and the input information.

As schematically represented in block diagram form in FIG. 24, the motor 52 is connected to drive the saddle 49 through a screw 50 that is operatively engaged in a nut 547 which is secured to the saddle 49 in a well-known manner. The general arrangement for effecting movement of the saddle 49 is similar to that utilized for effecting the required movement of the spindle head 60.

Both the signal comparator 520–52 and the servo amplifier 530–52 are energized via lines 536–52 and 539–52 which are connected to the energized line 625. The energizing circuit is completed via the common line 541–52 to the energized line 507.

In like manner, the lines 518–45 and 519–45 transmit information from the common trunk line 516 to the signal comparator 520–45 for supplying both a positional signal and a feed rate limit signal for moving the column 41 along the base or bed 40. The signal comparator 520–45 is operative to receive feedback information as to the position of the column via the line 521–45 and also to receive feedback information as to the velocity of the column as it is being moved via the lines 522–45 and 523–45. To provide accurate position feedback information, the line 521–45 is connected to a position indicator or sensing head 548, shown schematically in FIG. 24, which may be secured directly to the column 41. The sensing head 548 cooperates with an energizable scale 549 which is secured to the base 40. Cooperative coaction between the sensing head 548 and the scale 549 provides an accurate feedback signal to indicate the position of the column along the base 40 as it is moved to a selected position. The sensing head and scale, 548 and 549 respectively, are similar to the sensing heads and scales associated with the spindle head and saddle and are operative in the manner described to supply position feedback information to the signal comparator 520–45.

To supply feedback information as to the velocity of the column 41, as it is moved along the base 40, the lines 522–45 and 523–45 are connected to receive information from a tachometer 550 which is mechanically connected to be driven by operation of the motor 45, depicted in FIG. 24. The signal comparator 520–45 operates to produce a voltage proportional to the magnitude of the error, as well as indicating the direction of position error. The signal input to the signal comparator 520–45 via the lines 518–45 and 519–45 are compared to the feedback signals supplied to the signal comparator via the sensing head 548 and the tachometer 550 to produce an error signal to effect movement of the movable member with motion being stopped upon the occurrence of coincidence or no error between the feedback supply and the input supply.

From the signal comparator 520–45, the error signal is transmitted via the line 531–45 to actuate a servo amplifier 530–45 that is directly connected to actuate the servo valve 471 for controlling the velocity and extent of movement of a reversible motor 45. The motor 45, in turn, in connected to drive the column by means of a translating screw 44 which, in turn, is connected to be engaged by a nut 551 that is directly secured to the inner surface of the movable column 41.

Both the signal comparator 520–45 and the servo amplifier 530–45 are energized via the lines 536–45 and 539–45 which are energized from the common vertical line 625. The circuit from the signal comparator 520–45 and the servo amplifier 530–45 is completed via a common line 541–45 connected to the energized line 507.

As previously mentioned, the tape circuit shown in FIG. 24 is also operable to effect the operation of the spindle 62 at any desired speed. Since there is no positioning movement of the spindle 62 the signal comparator 520–63 only receives a feed rate signal via the line 519–63 which is connected to the common trunk line 516. A tachometer 552, illustrated in FIG. 24 as being connected to the spindle, is provided and is connected to supply velocity feedback information to the signal comparator 520–63 via a pair of connecting lines 522–63 and 523–63. The signal comparator 520–63 operates to produce voltage proportional to the magnitude of the error and such error is supplied to a servo amplifier 530–63 via a connecting line 531–63. The error signal supplied to the servo amplifier 530–63 is, of course, utilized to control the servo valve 420 which, in turn, controls the operation of the spindle motor 63 for controlling the rate at which the spindle is driven. The motor 63 operates to supply an input to a transmission 551 located within the spindle head 60 which, in turn, is operative to drive the spindle 60 through an input gear 553 meshingly engaged with the spindle drive gear 554.

It is to be noted that the tape input from the tape reader 376 is operative to effect both velocity and point-to-point positioning control of the movable members including the column 41, the spindle head 60 and the saddle 49. Bodily positioning movement of the spindle 62 is effected in response to an appropriate signal from the tape reader 376, this signal being appropriately spaced upon the punched tape in relation to other command information initiating the other various machine component movements or functions.

Whenever the tape reader 376 calls for a tool change cycle of operation it is necessary, as a prerequisite thereto, to locate the spindle 62 into a selected one of two positions along the Y axis, which positions have previously been referred to as "lower level" position or "upper level" position. Also, prior to a tool change cycle of operation, the spindle 62 must be moved to the "retracted" position before the saddle 49 may be moved from the work station for effecting a positioning of the spindle at either the "upper level" position or the "lower level" position. To this end, an alternate positioning control circuit is provided and is initiated prior to initiating a tool change cycle of operation and is effected by closure of an automatic contact 560, depicted in line 37, FIG. 25. Simultaneously, another automatic contact 791, in line 41 of FIG. 25, is actuated to open position by a signal from tape. The movement of the automatic contact 791 to open position prevents inadvertent movement of the machine components. The contact 560 is actuated to closed position by a signal from tape, and when closed, completes a circuit from an energized line 561 along line 39 to the line 37. The circuit continues from line 37 through the now closed contact 560 to a vertical line 565 that is connected to a terminal 567A of an actuating stepping switch 567. The switch 567 is associated with a circuit establishing stepping switch, generally identified by the reference numeral 586.

The control system, illustrated in FIGS. 25 and 25A, utilizes eight stepping switches which are utilized in pairs. Four of the eight switches, 567, 586, 574 and 575, are shown in FIG. 25; while switches 576, 577, 578 and 579 are shown in FIG. 25A. The actuating stepping switches 567, 574, 576 and 578 are similar in operation and function, and are generally the same in construction. The only variation between the actuating stepping switches are the number of terminals or contacts that each of the particular rotary switches may have. For example, switch 567 is illustrated as having eight terminals or contacts, 567A to 567H inclusive. Similarly, switch 574 is provided with eight terminals or contacts 574A to 574H inclusive. In like manner, switch 576 is also provided with eight terminals or contacts 576A to 576H inclusive. However, switch 578 is provided with only six terminals, 578A to 578F inclusive. Similarly, the circuit stepping switches 586, 575 and 577 are each provided with eight terminals or contacts, while the stepping switch 579, that is associated with the actuating stepping switch 578, is provided with only six terminals or contacts.

Since each of the pairs of stepping switches operate in the same manner, a description of the operation of the stepping switches 567 and 586 will apply to all of the pairs of stepping switches illustrated herein. As shown in FIG. 25, the actuating stepping switch 567 is provided with a wiper arm 581 which is secured to a rotary shaft that is suitably supported for rotation in well-known manner. The wiper arm 581 is conductively secured to the shaft so that the wiper arm 581 and shaft 582 comprise electrical conductors. A brush 583 is adapted to contact the peripheral surface of the shaft 582 as the latter rotates. To effect step-by-step movement of the wiper arm 581, there is provided a ratchet wheel 584, having eight equally spaced peripheral teeth thereon, which is keyed to the shaft 582 to effect angular movement of the shaft. Incremental rotational advancement of the ratchet wheel 584 is effected by means of a lever 585 which is supported for pivotal movement on a shaft 587. The circuit stepping switch 586 is similarly constructed and, as shown, is provided with a wiper arm 580 that is mounted on and secured to a rotatably supported shaft 589. A ratchet wheel 588, having eight equally spaced peripheral teeth formed thereon, is keyed to the shaft 589 to effect the rotation of the shaft and thereby the angular movement of the wiper arm 580. A brush 593 is provided, which is adapted to engage the peripheral surface of the shaft 589 as the latter rotates. The wiper arm 580 is electrically connected to the shaft 589 so that the shaft and wiper arm form a conductor as a part of the circuit.

The step-by-step movement of the wiper arms 581 and 580 of the switches 567 and 586, respectively, is effected by operation of the lever 858. The left end of the lever 585, as viewed in FIG. 25, is provided with a spring finger 591 which has its free end adapted to engage a peripheral tooth of the ratchet wheel 584. In a similar manner, the right end of the lever 585 is provided with a spring finger 592, the free end of which is adapted to engage a tooth of the ratchet wheel 588, depicted in FIG. 25. A relay 562 is adapted to have its actuating rod secured to the rightward extending portion of the lever 585 in a manner that when the coil of the relay 562 is energized, the lever 585 is caused to pivot about the shaft 587 in a clockwise direction thereby moving its spring finger 591 upwardly to effect the rotation of the ratchet wheel 584 and thereby the incremental movement of the wiper arm 581. As the lever 585 pivots in a clockwise direction about the shaft 587 it operates to compress a spring 594 which is adapted to engage the underside of the rightward extending portion of the lever 585. Thus, when the coil of the relay 562 is deenergized, the spring 594 operates to effect the pivotal movement of the lever 585 in a counterclockwise direction about the shaft 587, thereby retracting the spring finger 591 from the tooth that it had been engaged with and simultaneously therewith advancing the spring finger 592. As the spring finger 592 advances, it operates to effect the rotation of the ratchet wheel 588 in a clockwise direction, which, in turn, operates to effect the angular incremental movement of the wiper arm 580 associated with the rotary circuit switch 586. When the lever 585 is returned to its normal position, the spring finger 591, associated with the leftward extending end of the lever 585, will be engaged with the next tooth of the ratchet wheel 584, ready for the next operation of the lever 585. It is therefore apparent that the alternate energization and denergization of the coil of the relay 562 will effect first the rotary movement of the wiper arm 581 of the actuator switch 567 and, upon deenergization of the coil of the relay, will effect rotary movement of the wiper arm 580 of the circuit establishing switch 586. It is also apparent, that in both instances of operation of the lever 585, the first operation of the lever will reset the finger 592 into operative association with the ratchet wheel 588, while the second operation, as it returns to its normal position, will reset the finger 591 associated with the ratchet wheel 584. Thus, the stepping switches are self resetting and are always ready for the next operation.

To return now to the description of the circuit established by the closing of the automatic contact 560. The circuit continues through the closed contact 560, in line 37 of FIG. 25, to the vertical line 565, thence through the wiper arm 581 of the switch 567 to the shaft 582. From the shaft 582 the circuit continues through the brush 583 to a connected line 597, thence along line 51 to the coil of the relay 562 with the circuit being completed to the energized line 507.

Energization of the coil of the relay 562 effects actuation of an associated normally closed contact 562A, shown in line 51 of FIG. 24. The contact 562A is of the type that is normally closed and is actuated to an open position upon energization of the coil and, thereafter, upon deenergization of the coil, has a set time interval that it takes for the contact to move to a closed position. With the contact 562A in open position, the operation of the tape reader 376 is stopped and the transmission of output signals from the tape reader 376 to the various associated signal comparators is interrupted. Therefore, the signal comparators 520 do not receive any new input information from the tape reader as to the position and velocity for effecting movement of the associated components. However, the routine positioning movements of the spindle head 60 and the saddle 49, to effect the desired positioning of the spindle 62 into a proper desired location for a tool change operation, is effected by means of automatic routine sources of information generally identified by the reference numerals 601 to 604, inclusive, in FIG. 24. When energized, these automatic routine sources of information are connected to provide input information to an associated signal comparator as to a single particular position to which the associated movable member is to be moved. The signals from the automatic routine sources are in lieu of signals normally transmitted by the tape reader 376 to the various signal comparators for effecting component movement when the machine is operating under tape control. As the motor 59 is operated from the automatic routine source of information furnished by the source 601 to the signal comparator 520–59, a tachometer 606, schematically shown in FIG. 24 as being connected to be driven from the screw 527, is operated and produces a voltage. This voltage is transmitted to an amplifier 607 which is constantly maintained energized through a circuit establisded along line 31 connected between the energized line 625 and 507. The amplified voltage from the tachometer 606 is transmitted through a line 608 and a now closed automatic contact 609, to a coil of a relay 610, shown in line 30 of FIG. 24. The automatic contact 609 is actuated by a signal from tape which is transmitted just prior to the movement of contact 562A to open position. From the coil of the relay 610, current will return to the amplifier via the conductor of line 32 to complete the circuit for effecting energization of the coil of the relay 610. Energization of the coil of the relay 610 operates to move its associated contacts 610A to 610D, inclusive, in lines 43, 46 and 47 respectively of FIG. 25, to open positions to effectively prevent any other component movement until such time as the spindle head 60 has been positioned into a "retracted" position. As the spindle head 60 moves, the signal comparator 520–59 receives feedback information as to the position of the spindle head via the line 521–59, as previously described. When zero error or coincidence is obtained between the feedback information and the information furnished from the automatic routine source 601, the motion of the spindle head 60 will stop as it will have been moved to the proper position so that the spindle 62 is now in a "retracted" position at the work station. As motion of the spindle head 60 stops, the tachometer 606 will also stop and, therefore, will not produce a voltage so that the coil of the relay 610 is deenergized. The relay 610 now operates to move its associated contacts 610A to 610D, inclusive, to their normally closed positions to thereby condition other circuits, to be subsequently described, for subsequent operation of the other machine components.

The other positions which the spindle 62 is required to be positioned for effecting a cycle of tool change operation are "upper level" position, "lower level" position, and also "alignment" position. It is therefore apparent that an automatic routine source of information for these other required positioning movements of the spindle must also be provided. Such sources are represented in FIG. 24 by boxes 602, 603 and 604. The automatic routine source of information represented by the box 602 will effect movement of the spindle head 60 along the Z axis to effect the positioning of the spindle 62 into "alignment" position with a particular carrier of the magazine that is located at the ready station 86. Similarly, the box identified by the reference numeral 603, in FIG. 24, represents the automatic routine source of information which is operably connected to the signal comparator 520–52 to effect the operation of the motor 52 for moving the saddle 49 along the Y axis into the "lower level" position. In like manner, the box 604, in FIG. 24, represents the automatic routine source of information for supplying information to the signal comparator 520–52 for effecting the positioning movement of the saddle 49 to the "upper level" position along the Y axis. Whenever the motor 52 is operated from the automatic routine sources 603 or 604, to effect the movement of the saddle 49, a tachometer 611, schematically shown in FIG. 24 as being connected to be driven from the screw 50, is operated to produce a voltage which is transmitted to the amplifier 607. From the amplifier 607, the voltage flows along line 608 and through the now closed automatic contact 609, to the coil of the relay 610. From the coil of the relay 610, the current returns to the amplifier 607 to complete the circuit for energizing the coil of the relay 610. Energization of the coil of the relay 610, as previously mentioned, effects the operation of the relay to insure that the saddle 49 is correctly positioned prior to the movement of the other components.

The tape reader 376 and its associated control circuit may be disconnected from the associated signal comparators 520 by movement of the switch 501 into a tape-off position. In the tape-off position, the switch 501 operates to effect the opening of the associated contacts 508, 509 and 510, shown in lines 47, 48 and 53 of FIG. 24. Under this condition, the movement of the individual movable members of the machine may be effected through the operation of manual variable position signal input sources, generally identified by the reference numeral 620. In conjunction with the manual position signal input sources, a feed rate limiting source of signals is provided for establishing the feed rate of the various movable members as they are moved manually and such input signals are furnished by means of a manual feed rate limit signal input source, generally identified by the reference numeral 621. Thus, the spindle head 60 may be moved manually along the Z axis by operation of the manual variable position signal input source 620–59, shown in line 38 of FIG. 24, and the velocity of such manual movement is determined by the feed rate limit signal input from the source 621–59, shown in line 45.

For effecting manual selective positioning movement of the spindle head 60 in either direction, a pushbutton switch 622 is actuated. With the switch 622 actuated, a pair of normally closed contacts 623, in lines 42 and 43 of FIG. 24, are moved to open position for disconnecting the input lines 518–59 and 519–59 from the signal comparator 520–59, so that there is no possibility whatsoever of the tape reader having any effect when it is desired to move the spindle head 60 manually. In addition, a normally open contact 624, in line 38, is moved to closed position for completing the circuit from the energized line 625. With the contact 624 in closed position, a circuit is completed from the line 625 along line 38 to energize the manual variable position signal input source 620–59 with the circuit being completed therefrom along line 38 to the energized line 507. At the same time, another normally open contact 628, in line 45 of FIG. 24, is moved to a closed position and operates to complete a circuit from the energized line 625 along line 45 to the manual feed rate limit signal input source 621–59. The circuit is completed from input source 621–59 through the now closed contact 628 and a connected vertical line 632 to line 541–59 which, in turn, is connected to the energized line 507. In addition, the pushbutton switch 622, when actuated, also operates to move two additional normally open contacts 629 and 631, in lines 41 and 44 respectively, to closed positions. With the contact 629 in a closed position, a position input signal from the source 620–59 is supplied to the signal comparator 520–59. In a similar manner, with the contact 631 in a closed position, a feed rate limit signal input is supplied to the signal comparator 520–59. These signals, which are applied as input signals to the comparator, are utilized along with feedback signals from the sensing head 524 and from the tachometer 526 to produce an error voltage or signal which is transmitted to the servo amplifier 530–59 and utilized for controlling the operation of the servo valve 486 for controlling the motor 59 for effecting the positioning movement of the spindle head 60 under manual control. The amount of movement and the direction of movement may be predeterminately set by manipulating a manual knob 632 for adjusting the voltage input from the source 620–59 to the signal comparator 520–59. However, in the case of the feed rate limit signal, the source 621–59 has been illustrated as transmitting a fixed limit signal so that the positioning of the spindle head 60 under manual control is at a fixed feed rate. It will be appreciated that a variable feed rate limit signal source may be provided in lieu of the fixed feed rate limit signal source 621–59. The line 536–59 serves as a common line for supplying current to energize both the signal comparator 520–59 as well as the servo amplifier 530–59 for both manual and tape controlled operation of the motor 59. In like manner, line 541–59 also serves as a common line through which the current is supplied for energizing both the signal comparator 520–59 and the servo amplifier 530–59, as well as the manual feed rate limit signal source 621–59.

It will be apparent that the tape control circuit may remain connected to the energizing lines 502 and 503, and the control circuit momentarily disconnected from the signal comparators 520 by simply depressing the pushbutton 622 in the case of the signal comparator 520–59. This is true, because depressing the pushbutton switch 622 will effect the opening of the pair of normally closed contacts 623, in lines 42 and 43 respectively. Thus, the tape reader can be temporarily disconnected, and upon release of the pushbutton switch 622, it is again immediately reconnected and in command of component movement.

The saddle 49 may also be operated through manual actuation of a pushbutton switch 635. With the switch 635 actuated, a contact 636, in line 19, is moved to a closed position thereby completing a circuit from the energized line 625 along line 19 to a manual variable position signal input source 620–52. The circuit is completed from the source 620–52 along the common line 541–52, to the energized line 507. In a similar manner, a contact 637 is moved to a closed position thereby completing a circuit for energizing a manual feed rate limit signal source 621–52. This circuit is completed from the energized line 625 along line 26 to and through the feed rate limit signal source 621–52. From the signal source 621–52, the current continues through the now closed contact 637 to a vertical line 638 and thence to the common line 541–52. The pushbutton switch 635, when actuated, also operates to move a pair of normally closed contacts 639 to open position thereby effectively interrupting the transmission of input signals from the input lines 518–52 and 519–52 to the signal comparator 520–52. The pushbutton switch 635 also includes a pair of normally open contacts 640 and 641 which are moved to closed position upon actuation of the switch. With the contact 640 moved to closed position, a feed rate limit signal from the manual feed rate limit signal source 620–52 is transmitted to the signal comparator 520–52. In like manner, when the contact 641 is moved to a closed position, a feed rate limit signal is transmitted to the signal comparator 520–52 so that the saddle 49 may be moved manually. The manual variable position signal input source 620–52 is also provided with the adjustable dial 642 which is positionable to effect a desired movement in a selected direction of the saddle 49. However, the manual source of feed rate limit signal input 621–52 is a fixed signal input, and therefore, the saddle 49, under manual control, will be moved at a fixed feed rate.

The manual movement of the column 41 along the base 40 is also provided for and is identical to that provided for the spindle head 60 and the saddle 49. As shown in FIG. 24, a manually actuatable pushbutton 645 is provided which, upon being actuated, operates to disconnect the tape input signal lines from the signal comparator 520–45. The pushbutton switch 645 is also operable to effect energization of the manual variable positional signal input source 620–45, as well as to effect energization of the manual feed rate limit signal input source 621–45. The pushbutton switch 645 is also operable to complete a connection for establishing a transmitting circuit for the position signal input, from the source 620–45 to the signal comparator 520–45, as well as completing the transmission line for the feed rate limit signal from the source 621–45. These input signals from the manual sources 620–45 and 621–45 are supplied to the signal comparator 520–45 and utilized in conjunction with the feedback position signal from the reader 548 and the velocity feedback from the tachometer 550 for effecting the movement of the column 41 to a desired position at a fixed feed rate.

Spindle rotation may be initiated manually by depressing a switch 652 and the speed at which the spindle will be rotated is controlled by the setting of a potentiometer 653. When the switch 652 is actuated, a normally closed contact 654, in line 7, is moved to open position thereby disconnecting the signal comparator 520–63 from the servo amplifier 530–63. Actuation of the pushbutton switch 652 will also operate to move its associated normally open contact 656, line 4, to a closed position so that a circuit is completed from the energized line 625 to the resistor of the potentiometer 653 and thence through its associated wiper arm and the now closed contact 656, through the servo amplifier 530–63 with the circuit being completed back to the line 507.

The line 625 also serves to supply current to the servo amplifier 530–63 for energizing the amplifier when the system is under tape control. The line 541–63 is common and is connected to the energized line 507. When it is desired to stop spindle rotation, the pushbutton switch 652 is released thereby opening its contact 656 to interrupt the circuit from the potentiometer to the servo amplifier 530–63 to stop the operation of the motor 63.

The electrical control system for controlling the operation of the machine is shown in the wiring diagram illustrated in FIGS. 25 and 25A. In these diagrams, a phase one source of current is represented by lines 648 and 649, while a quadrature phase two source of energy is represented by lines 650 and 651. Each of the electrical components is shown in the wiring diagrams as being connected in one of the plurality of lines that are connected across the power lines with each of these lines being identified successively by numerals 1 to 128 inclusive, so that the components may be readily located in the diagrams. The contacts of the various relays are identified by the same reference numerals as their associated relay coils with a letter suffix added for the purpose of distinguishing each individual contact from the others.

The power lines are energized by closing a manually operated master switch 660, in line 2 in FIG. 25. Closing of the switch 660 operates to energize a coil of a master relay 661, which has two normally open contacts 661A and 661B in lines 2 and 5, respectively, that are connected in the lines of the control circuit. Energization of the coil of the relay 661 effects its operation to close its associated contact 661B, in line 5, to energize the lines 561 and 507. With the contact 661B of the relay 661 in closed position, the lines 502 and 503, shown connected to the horizontal lines 6 and 5, respectively, are also energized. The lines 502 and 503 are energized for effecting the operation of the tape control circuit shown and previously described in conjunction with FIG. 24. A circuit through the contact 661A completes a circuit for maintaining the relay 661 energized when the switch 660 is released. Deenergization of the control circuits are effected by actuating a master stop switch 663 which will operate to interrupt the circuit to the master relay 661.

The magazine carrier electrical designation circuits that operate in conjunction with the reading head 285 are depicted in FIG. 25 and are energized by current obtained from the line 561. The initial step in the operation is to indicate in the electrical control system which one of the carriers 85 is to be located at the ready station 86, so that the particular tool associated with the indicated carrier may be utilized by the spindle 62 for performing the succeeding machining operation. It will be recalled that each of the carriers 85 is identified by a number and is coded in accordance with the binary numbering system with five digits of the binary system being provided to make thirty-one numbers available for identifying these carriers 85. However, in the particular illustrated embodiment of the invention, the magazine 70 is provided with eighteen carriers so that it is only necessary to utilize eighteen of the numbers available for identifying the carriers. The number of the desired carrier may be impressed upon the electrical control system automatically in response to signals from recorded data.

For automatic indication of the desired carrier to be selected for location at the ready station 86, a plurality of automatic memory contacts 665 to 674 inclusive, are provided and constitute the first memory for the selection of a particular carrier. These automatic contacts are operated in response to signals from the record, as for example, the electrical signals produced by the tape reader 376 from the tape 378. A second set of automatic contacts 675 to 684 inclusive, are also provided and constitute the second memory for the automatic indication of the desired succeeding carrier. The automatic contacts, which constitute the first and second memories, are selectively connected into the control system by the operation of a memory selecting relay 825, the coil of which appears in line 9 of FIG. 25. The relay 825 is provided with a plurality of normally open contacts and a plurality of normally closed contacts. With the contacts of the relay in their normal positions, as shown in lines 10 to 29 of FIG. 25, the automatic contacts 665 to 674, inclusive, are connected into the control system.

However, when the relay 825 is energized and its associated contacts are actuated, the automatic contacts 675 to 684, inclusive, of the second memory are connected into the control system. Automatic contacts 665 and 666, shown in lines 12 and 13 of FIG. 25, as a unit, represents the least significant digit in the binary number with the contact 665 representing the number "1," while the contact 666 represents "0." Similarly, the contact 667 and 668, as a unit, represent the second or next significant digit in the binary number, with the contact 667 representing the number "1," while the contact 668 represents "0." The contacts 669 and 670, as a unit represent the third digit of the binary number, while the contacts 671 and 672, as a unit, represent the fourth digit of the binary number. The contacts 673 and 674, as a unit, represent the fifth or most significant digit of the binary number. The contacts 665, 667, 669, 671 and 673 when in open positions will each represent the numeral "1," while the contacts 666, 668, 670, 672 and 674 in open positions will each represent "0." A similar arrangement of the contacts associated together and constituting the second memory is provided wherein the contacts 675 and 676, as a unit, represent the first or least significant digit in the binary number. The contacts 677 and 678, as a unit, represent the next or second digit in the binary number. The contacts 679 and 680, as a unit, represent the third digit of the binary number. The contacts 681 and 682, as a unit, represent the fourth digit of the binary number, while the contacts 683 and 684, as a unit, represent the fifth or most significant digit of the binary number. In the second memory, the contacts 675, 677, 679, 681 and 683 when in open positions, represent the number "1," while the contacts 676, 678, 680, 682 and 684 in open positions, represent "0."

For the purpose of this description, it will be assumed that the illustrated machine is being utilized to perform a plurality of different work operations requiring different tools on a group of identical workpieces. It will also be assumed that the required work operation on one of the workpieces has been completed and a new workpiece of the same type and requiring the same work operation is now in the work station. Under this assumed condition, the electrical control system, illustrated in FIGS. 25 and 25A, will be in the condition as shown with the exception of the reading head switches 286 and 290 and the automatic contacts 665 to 674, inclusive, of the first memory. Upon the completion of a work operation on the previous workpiece, signals from the tape 378 actuate the automatic contacts 665 to 674, inclusive, in the combination to indicate the carrier of the magazine to be selected for location at the ready station 86 so that the tool in the particular carrier is available as the first tool to be used in a work operation on the new workpiece. It will be assumed that the particular carrier indicated in the first memory is the carrier 85–5, which is identified by the binary number 00101. Thus, the signals from the tape will have actuated automatic contacts 665 and 666, which as a unit, represent the first digit of the binary number. With the automatic contact 665 moved to open position, the numeral "1" is indicated as the first digit in the binary number. The automatic contacts 669 and 670, which as a unit, represent the third digit of the binary number, will also be actuated. With the contact 669 moved to open position, the normal "1" is indicated at the third digit in the binary number. The pairs of automatic contacts 667 and 668, 671 and 672, and 673 and 674, which as units, represent the second, fourth and fifth digits, respectively, of the binary number, will not be actuated. With the contacts 668, 672 and 674 in their normally open positions, "0" will be indicated as the second, fourth and fifth digits in the binary number. Thus, the binary number 00101 is indicated in the electrical control system and identifies the magazine carrier 85–5.

The last function in the previous tool change cycle was to initiate an indexing movement of the magazine so that the carrier 85–5 will be selected at the ready station 86. Therefore, assuming that the selection has been previously accomplished, the switches 286 and 288 of the reading head 285 will have been actuated so that the contact of the switch 286 is in engagement with a terminal 841 and the contact of the switch 288 is in engagement with the terminal 842. The switches 287, 289 and 290 will not be actuated and remain in the positions they occupy, as illustrated. As previously described, the switch 286 represents the first digit in the binary number, while the switch 290 represents the fifth or last digit in the binary number. Therefore, with the switches 286 and 288 actuated, the numeral "1" is indicated as the first and third digits of the binary number, while "0" is indicated as the second, fourth and fifth digits in the binary number by the deactuated switches 287, 289 and 290. Thus, coincidence between the selector switches of the reading head 285 and the indicating switches of the first memory was obtained to locate the carrier 85–5 at the ready station, and this condition exists upon the initiation of the tool change cycle of operation. Also, the automatic contact 512, in line 53 of FIG. 24, will have been actuated to open position by a signal from the tape which was programmed as the last signal in the operating cycle of the previous work operation. It will also be assumed that prior to the initiation of a tool change cycle of operation, the machine components are in the positions depicted in FIG. 7. Thus, the carrier 85–5 is in the ready station 86 and presents the tool 65B. The transfer clasp 306 is at the "lower level" and "standby" positions, and the saddle 49 is positioned at the work station, depicted in FIG. 2. The spindle head 60 is in a position so that the tool 65A, carried by the spindle 62, will not engage a workpiece (not shown). Under these assumed conditions, a cycle of operation of the machine is initiated by actuating the pushbutton switch 513, in line 52 of FIG. 24. As previously described, this will effect the actuation of the tape reader 376 to advance the tape 378 into reading position. A signal obtained from the tape will actuate the automatic contact 512, line 53, to closed position to complete the circuit for maintaining the tape reader actuated. Also, a signal obtained from tape will actuate the automatic contact 560, in line 37 of FIG. 25, to a closed position. Simultaneously therewith, the automatic contact 791, line 41 of FIG. 25, will be actuated to open position by a signal also obtained from the tape.

With the automatic contact 560 in closed position, a circuit is completed to effect the energization of the coil of the relay 562 in line 51. The circuit is established from the energized line 561 and current flows along line 39, through the now closed automatic contact 560 and through a vertical line 565 to the contact 567A of the stepping switch 567. Current will flow through the wiper arm 581 and the shaft 582 to the brush 583, and thence to a vertical line 597. Current flow continues along line 51 and through the coil of the relay 562, with the circuit being completed along line 51 to the energized line 507. With the coil of the relay 562 energized, the relay operates to move its contact 562A, in line 51 of FIG. 24, to open position, thereby interrupting the operation of the tape reader 376 so that the transmission of signals from the tape reader to the comparators 520 cannot be accomplished. The relay 562 also operates to move an associated normally closed time-to-close contact 562B, in line 50 of FIG. 25, to open position, thereby interrupting the circuit along line 50 to effect the deenergization of the coil of a relay 691. The relay 691 thereupon operates to move its associated contacts 691A to 691D, inclusive, to their normally open positions. This action effectively interrupts circuits that are necessary for effecting movement of other machine components, thereby insuring that various components cannot be inadvertently moved.

It will be recalled that a tool change cycle of operation is initiated by moving the spindle 62 to the "lower level" and "retracted" positions, as indicated by the radial marker M1 of ring "D" in the chart of FIG. 22. This is accomplished through the movement of the saddle 49 and the spindle head 60. To effect the required positioning movements of the saddle 49 and the spindle head 60, the operation of the stepping switches 567 and 586 must be effected. To this end, upon the energization of the coil of relay 562, the relay will operate to effect clockwise pivotal movement of the lever 585. Therewith, the finger 591 operates to effect the incremental movement of the wiper arm 581 of the switch 567. With this action, the wiper arm 581 is moved out of engagement with the contact 567A and into engagement with the contact 567B presetting the actuating stepping switch 567 for the next step in the sequence.

As the wiper arm 581 moves off of the contact 567A, the circuit which is established from the contact through the wiper arm will be interrupted to thereby effect de-energization of the coil of the relay 562. With the coil of the relay 562 deenergized, the spring 594 will operate to effect pivotal movement of the lever 585 in a counterclockwise direction, thereby resetting the spring finger 591 into a position ready for its next operation. Also, as the lever 585 is moved in a counterclockwise direction, the spring finger 592, at the right end of the lever, will operate to move the wiper arm 580 of the rotary switch 586 in a clockwise direction, moving it out of engagement with the contact 586A and into engagement with the contact 586B. This will complete a circuit to the brush 593 of the rotary switch 586 via line 39 and a connected line 693 which has its opposite end connected to the brush 593. The circuit continues from the brush 593 through the shaft 589 and thence to and through the wiper arm 580. From the wiper arm 580 the circuit continues through the contact 586B to line 43. The circuit continues along line 43 and current will flow via a vertical branch line 694 to line 37 and along line 37 to the coil of a relay 695, and thence to the energized line 507, to complete a circuit for energizing the coil of the relay. With the coil of the relay 695 energized, the relay will operate to effect movement of its associated contacts 695A to 695E, shown in lines 51, 30, 32, 34 and 36, respectively, of FIG. 24. With the normally closed contacts 695A of the relay 695 moved to open position, the operation of the tape reader is interrupted, as previously described. Movement of the relay contact 695C to closed position has no effect at this time for the reason that a relay 697, the coil of which appears in line 38 of FIG. 25, is deenergized thereby maintaining its associated contact 697B, in line 28 of FIG. 24, in open position. Thus, with the contact 697B in open position, current from the energized line 537 cannot flow along line 28 of FIG. 24. On the other hand, with the contacts 695B and 695E in lines 30 and 36, respectively, in closed positions, two circuits will be established from the energized vertical line 537. One circuit is completed along line 30, through the normally closed contact 697C, through the now closed contact 695B, and through a normally closed contact 698 to the automatic routine signal source 603. The circuit is completed from the automatic routine signal source 603 along line 30 to a common vertical line 699 and thence to line 36 which is connected to the energized line 507. This circuit will effect the energization of the automatic routine signal source 603, and the source will operate to transmit a signal to the signal comparator 520-52 for effecting the operation of the motor 52, as previously described, to move the saddle 49 to the "lower level" position.

Simultaneously with the completion of a circuit to the automatic routine signal input source 603, a second circuit is completed to the automatic routine signal source 601 for effecting movement of the spindle head 60 for moving the spindle 62 into a "retracted" position. This circuit is completed from the vertical energized line 537 along line 30 and through the normally closed contact 697C to a vertical branch line 701, FIG. 24. The circuit continues along the vertical branch line 701, through the now closed contact 695E of the energized relay 695, thence along line 36 and through a normally closed contact 702 of the manual pushbutton switch 622 to the automatic routine signal source 601. From the automatic signal source 601, the circuit is completed along line 34 to the energized line 507, thereby effecting the energization of the automatic routine signal source 601. With the automatic routine signal source 601 energized, it will operate to transmit an input signal to the signal comparator 520-59 and the motor 59 will be operated to move the spindle head 60 along the Z axis to locate the spindle 62 in the "retracted" position. Thus, the spindle 62 is now located at the "lower level" in a "retracted" position, as indicated by the radial marker M1 of the ring "D," in the chart of FIG. 22.

The next sequential step in a tool change cycle of operation to be accomplished is to move the transfer clasp 306 to the "lower level" and "extended" positions. This action will move the transfer clasp 306 into engagement with a tool carried by the spindle 62, which has been located at the "lower level" position and in a "retracted" position. It will be apparent, in viewing the chart of FIG. 22, that the preceding condition of the transfer clasp, as indicated by the radial marker M34 of ring "O," was that the transfer clasp 306 had been moved to the "lower level" and "stand-by" positions. This position of the transfer clasp 306 is depicted in FIG. 7, and as there shown, the transfer clasp 306 has actuated the limit switch 318 and its associated contact is in open position, as schematically depicted in line 54 of FIG. 25. With the limit switch 318 actuated, it operates to interrupt the circuit along line 54 to the coil of the "stand-by" position relay 705.

It will be recalled that the prior energization of the coil of the relay 562, shown in line 51 of FIG. 25, operated to move its normally closed contact 562B, in line 50, to an open position. This contact was previously described as being of the type that will delay for a preset interval of time before it returns to its closed position upon de-energization of its coil. Thus, when the coil of the relay 562 was deenergized, the contact 562B delayed for a time sufficiently long enough to insure that the coils of the relays 695 and 697 are energized. When the contact 562B returns to its normally closed position, it will re-establish the circuit along line 50 to the coil of the relay 691 to thereby effect its operation for moving its associated contacts 691A to 691D, in lines 47, 46, 44 and 43 of FIG. 25, to their closed positions. It will also be recalled that when the saddle drive motor 52 and the spindle head drive motor 59 had been operated from signals obtained from the automatic routine sources 603 and 601, these motors, in turn, operated to drive the tachometers 611 and 606, respectively. The tachometers 611 and 606, when operated, produce voltages which are transmitted to the amplifier 607, as previously described. The amplified voltage is utilized to effect the energization of the coil of the relay 610. With the coil of the relay 610 energized, the relay operates to effect the opening of its associated contacts 610A to 610D inclusive, in lines 43, 44, 46 and 47, respectively, of FIG. 25. Thus, even though the contacts 691A to 691D of the relay 691 have been moved to closed position, a circuit is still not completed from the stepping switch 586 until such time as the contacts 610A to 610D are again moved to closed positions. This action will insure that the spindle 62 is positively moved to a "lower level" position and a "retracted" position before any other component movements can be accomplished. When such positioning of the spindle 62 has been accomplished, operation of the motors 52 and 59 is stopped thereby stopping the operation of the tachometers 611 and 606. When the tachometers 611 and 606 cease to operate, there is no voltage transmitted to the amplifier 607, and thus, there is no voltage transmitted to the coil of the relay 610 and the coil becomes deenergized. With the coil of the relay 610 deenergized, the relay operates to effect the closing of its associated contacts 610A to 610D shown in FIG. 25. Upon this occurrence, a circuit will be completed from the wiper arm 580 of the stepping switch 586, which arm is now positioned in engagement with the contact 586B. Thus, current will flow from the contact 586B along line 43 and through the now closed contacts 691D and 610A to a vertical line 709, which is shown in FIG. 25 as leading to a junction box 710.

The junction box 710 is utilized in the drawing to simplify the drawing and it is to be understood that lines identified with like numbers are all joined together in this junction box. The junction box 710 is shown in various fragmentary portions throughout the drawings of FIG. 25 and FIG. 25A, but it will be appreciated that these portions, all identified with the common reference numeral 710, are all portions of the same junction box.

The line 709 leaves the junction box 710, as depicted in the lower lefthand corner of FIG. 25, and continues upward and is connected to line 63. A branch line 711 is connected to line 63 and to a contact 574A of the actuating stepping switch 574. Thus, current from the line 709 will flow through the line 63 and thence by means of the branch line 711 to the contact 574A. The current will flow from the contact 574A through the wiper arm 712, the shaft 713 and the brush 714 of the stepping switch 574 to a vertical line 716. The line 716, shown in FIG. 25A at the upper lefthand portion of the drawing, continues and connects with the line 79 in FIG. 25A, and current continues along line 79 to the coil of a relay 720. From the coil of the relay 720, the circuit continues along line 76 to the energized line 507 to complete the circuit for energizing the coil of the relay 720. With the coil of the relay 720 energized, the relay operates to effect clockwise pivotal movement of a lever 721, which is operatively associated with the stepping switches 574 and 575. Clockwise pivotal movement of the lever 721 will effect an incremental angular movement of the wiper arm 712 so that the wiper arm is moved out of engagement with the contact 574A and into engagement with the contact 574B. When the wiper arm 712 is moved out of engagement with the contact 574A, it operates to interrupt the circuit to the coil of the relay 720, thereby effecting deenergization of the coil releasing the lever 721. A spring 722, associated with the lever 721, thereupon operates to effect the counterclockwise pivotal movement of the lever 721, thereby resetting the associated spring finger 723 and moving another associated finger 724 upwardly to effect clockwise movement of the wiper arm 725 of the stepping switch 575. The incremental movement of the wiper arm 725 moves it out of engagement with the contact 575A and into engagement with the contact 575B to complete a circuit from the energized vertical line 561 along line 57 to the brush 726 of the stepping switch 575. From the brush 726, current will flow through the shaft 727 and the wiper arm 725, and by means of the contact 575B, to a vertical branch line 728. From the branch line 728, which is connected to line 61, the current will flow to another vertical branch line 729. The flow of current continues through the now closed contact 708B, in line 62 of FIG. 25, to line 59 and thence through a normally closed contact 731A of deenergized transfer clasp left relay 731. From the contact 731A, in line 59, the current will flow to line 57, and thence to the coil of a transfer clasp right relay 732 with the current continuing to flow along the line 57 to the energized line 507 to complete the circuit for energizing the coil of the relay 732. With the coil of the relay 732 energized, the relay operates to move an associated contact 732A, in line 63 of FIG. 25, to an open position thereby insuring that the transfer clasp 306 cannot be moved leftwardly, as viewed in FIG. 7. The relay 732 also operates to actuate other associated contacts 732B, 732C, 732D and 732E, shown in lines 76, 78, 81 and 83 of FIG. 25A respectively. The contacts 732B, 732D and 732E are normally open contacts and are moved to closed positions, while the contact 732C is a normally closed contact and is moved to open position. With these contacts positioned as described, a circuit is completed from the energized line 561 and current will flow along line 76 of FIG. 25A, to a branch line 734. Current flow continues through the branch line 734, through a normally closed contact 731C of deenergized relay 731, and thence along line 78 to line 77, which is connected to the motor 309. The current will flow through the now closed contact 732B of relay 732, to a common vertical line 736. The current path continues through the line 736 and thence through the now closed contact 732D to a bridging vertical line 737, which is connected to line 79. The circuit will continue to the energized conductor 507 to complete the circuit for energizing the motor 309 for effecting rightward movement of the carrier 337 to move the transfer clasp 306 into "extended" position.

Simultaneously, a circuit is also completed to the brake portion of the motor 309 to effect the release of the brake so that the motor is free to operate. Such circuit is established along the lines 82 and 83 of FIG. 25A, through the now closed contact 732E of the relay 732, to line 84 and thence to the brake portion of the motor 309. The circuit continues from the brake portion of the motor 309 along the line 85 to the energized vertical line 651. Thus, as the motor 309 is energized for operation in a direction to effect rightward movement of the slide 307 for effecting the positioning of the transfer clasp 306 in the "extended" position, the brake associated with the motor is simultaneously energized to release the motor to permit its operation.

Prior to the initiation of movement of the transfer clasp 306 into "extended" position, wherein the clasp will engage with a tool presented by the spindle 62, the transfer clasp claw 326 must be retracted. This is accomplished through a circuit established through the contact 579A of the stepping switch 579, in FIG. 25A. This circuit is completed from the energized line 561 along line 127 to the brush 753 of the switch. The circuit continues through the wiper arm 751 to the contact 579A, and by means of a connected line 752, to line 123 and thence to the coil of the relay 753. The circuit is completed via line 123 to the energized line 507 to energize the coil of the relay 753. With the coil of the relay 753 energized, the relay operates to move its associated contact 753A in line 128 to a closed position. This completes a circuit from the energized line 650 along line 128 through the solenoid 330 to the energized line 651. With the solenoid 330 energized, it operates to effect the pulling of the transfer clasp claw 326, as previously described. Thus, as the transfer clasp 306 is moved into "extended" position, its associated claw 326 is retracted so that the transfer clasp is free to engage the tool 65A presented by the spindle 62, depicted in FIG. 9.

As the slide 307 is moved rightwardly, as viewed in FIG. 7, it will actuate the limit switch 319 momentarily, but this does not have any effect on the control circuit at this particular time. When the slide 307 has been moved to position the transfer clasp 306 in the "extended" position, depicted in FIG. 9, the limit switch 320 will be actuated. When actuated, the limit switch 320 will have its associated contact moved to an open position thereby interrupting the circuit established along the line 56 of FIG. 25 so that the coil of the relay 708 is deenergized. With the coil of the relay 708 deenergized, the relay operates to move its associated contacts 708A and 708B to open position, and simultaneously therewith, to move its contact 708C in line 70 to a closed position. A circuit is established from the energized contact 575B of the stepping switch 575 along the vertical line 728 and line 61 to the common vertical line 729. The circuit continues through the now closed contact 708C to the vertical line 738, which is shown as entering the junction box 710 in FIG. 25. As depicted in the lower lefthand corner of FIG. 25A, the line 738 is shown as emerging from the junction box 710 and is connected to the contact 578A of the stepping switch 578. Thus, a circuit is established and current flows to the wiper arm 739 of the stepping switch 578, and by means of the shaft 741 and brush 742, the current is directed to a line 743 and thence to the coil of a relay 745. The circuit from the coil of the relay 745 continues along the line 116 of FIG. 25A to the energized line 507 to complete the circuit for energizing the coil of the relay 745. With the coil energized, the relay operates to effect the pivotal movement of a lever 746 in a clockwise direction to effect the incremental movement of a wiper arm 739 in a clockwise direction through the operation of the spring finger 747 that is secured to the leftwardly extending end of the lever 746, shown in FIG. 25A. This moves the wiper arm 739 out of engagement with the contact 578A and into engagement with the contact 578B of the stepping switch 578. Thus, the circuit to the coil of the relay 745 is interrupted so that the coil is deenergized. At this time, a spring 748 associated with the lever 746 and which has been compressed by the clockwise pivotal movement of the lever 746, will operate to effect the pivotal movement of the lever 746 in a counterclockwise direction. With this movement, the finger 747 is reset for subsequent operation. Simultaneously with the resetting of the finger 747, another finger 749, attached to the rightward end of the lever 746, operates to effect incremental clockwise rotation of a wiper arm 751 that is associated with the stepping switch 579. When the wiper arm 751 of the rotary stepping switch 579 is moved out of engagement with the contact 579A and into engagement with the contact 579B, the circuit to the coil of the relay 753 is interrupted to effect deenergization of the coil so that the relay operates to move its associated contact 753A to open position. Thus, the circuit which had been established along line 128 is interrupted so that the solenoid 330 is deenergized and the spring 338, depicted in FIG. 7, operates to advance the claw 326 of the transfer clasp 306 to secure the tool 65A to the clasp 306. This condition is indicated by the radial marker M3 of ring "B" in the chart of FIG. 22.

The next sequential step in a cycle of tool change operation, as indicated by the radial marker M4 of the ring "E," is that the spindle collet 401 must be released so that the transfer clasp 306 may be operated to withdraw the tool 65A from the spindle 63. To effect the operation of the collet 401 in a releasing action, it is necessary that the solenoid 441 associated with the valve 430, as shown in FIG. 23, be deenergized, and also that the associated solenoid 434 be energized. To this end, when the wiper arm 751 of the stepping switch 579 has been moved into engagement with the contact 579B, a circuit will be completed from the energized wiper arm 751 along line 121 through the coil of a relay 755, with the circuit being completed to the energized line 507. This circuit will energize the coil of the relay 755 which thereupon operates to effect the movement of its associated contacts 755A and 755B, shown in lines 127 and 126 of FIG. 25A respectively. The contact 755A is moved to open position and the circuit which had been established to the solenoid 441 is interrupted so that the solenoid 441 is deenergized. Simultaneously therewith, the contact 755B is moved to a closed position so that a circuit is established from the energized line 650 along line 128, common vertical conductor 756 and line 126 and through the now closed contact 755B to and through the coil of the solenoid 434, with the circuit being completed to the energized line 651. With the solenoid 434 energized, the valve 430 is positioned to direct fluid pressure to the right end of the cylinder 403, in FIG. 23, to effect the necessary slight leftward movement of the piston 404 and a resulting slight movement of the collet 401, to release the collet. Thus, the required function of releasing the spindle collet, as indicated by the radial marker M4 of the ring "E" is accomplished.

The next required sequential function in a tool change cycle of operation is indicated by the radial marker M5 of ring "C," and as there indicated, requires that the transfer clasp 306 be moved to the "lower level" position and to the "idle" position. Since the transfer clasp 306 is already positioned in the "lower level" position, as indicated by the radial marker M21 of ring "A," the only necessary movement required is to effect the leftward retracting movement of the slide 307 to an extreme leftward position, depicted in FIG. 10. This movement is from the position that the slide 307 occupies in FIG. 9 to the position in FIG. 10. It will be recalled that when the slide 307 had been moved into the position to engage the limit switch 320, the limit switch was actuated so that its contact was moved to open position, thereby interrupting the circuit along the line 56 of FIG. 25 and deenergize the coil of the relay 708. With the coil of the relay 708 deenergized, the relay operated to move its contacts 708A and 708B to open position, and simultaneously therewith, move its contact 708C to closed position. With the contact 708B moved to open position, it operated to interrupt the circuit to the coil of the relay 732 so that the relay operated to move its contact 732A, in line 63 of FIG. 25, to its normally closed position. Thus, when the stepping switch 579 had been operated to position its associated wiper arm 751 in engagement with the contact 579B to establish a circuit along line 121 of FIG. 25A to the coil of the relay 755, a circuit was also completed along the vertical line 757, which is shown at the bottom of the drawing of FIG. 25A, as entering the junction box 710. The line 757 emerges from the junction box 710, as depicted in the lower lefthand corner of the drawing of FIG. 25, and is connected to the contact 574B of the stepping switch 574. Thus, the contact 574B of the stepping switch 574 is energized, and since the wiper arm 712 is now in engagement with the contact 574B, a circuit is completed through the wiper arm and through the shaft 713 and brush 714 to the vertical line 716. The circuit continues along the line 716 and line 79, in FIG. 25A, to the coil of the relay 720. From the coil of the relay 720, the circuit continues along the line 79 to the energized line 507 to complete the circuit for energizing the coil of the relay. With the relay coil energized, the relay 720 operates to effect the incremental clockwise stepping movement of the wiper arm 712 into engagement with the contact 574C of the stepping switch 574. With the wiper arm 712 moved out of engagement with the contact 574B, the circuit to the coil of the relay 720 is interrupted and it operates to release the lever 721 and the spring 722 effects lever operation for moving the wiper arm 725 of the stepping switch 575 in a clockwise direction into engagement with the contact 575C thereof. Thus, a circuit is now established from the energized line 561 along line 59, of FIG. 25, to the wiper arm 725, via the brush 726 and shaft 727. The circuit continues from the wiper arm 725 through the contact 575C and a connected vertical line 758 which is connected to line 64. The circuit continues along the line 64 of FIG. 25, to a vertical line 759, and along the line 63, through the now closed contact 706A of energized relay 706 and through the now closed contact 732A of deenergized relay 732 to to the coil of the relay 731 in line 52. The circuit continues along line 52 to the energized line 507 to complete the circuit for energizing the coil of the relay 731. With the coil of the relay 731 energized, its associated normally closed contact 731A, in line 57, is moved to an open position, thus insuring that a circuit cannot be completed to the coil of the relay 732. Simultaneously therewith, the relay 731 operates to move its contacts 731B, 731D and 731E, shown in lines 76, 80 and 83, respectively, of FIG. 25A, to closed positions and also moves its normally closed contact 731C in line 78 to open position.

A circuit is established from the energized line 561 along line 76 and through the now closed contact 731B to line 75 and thence to the motor 309. From the motor 309, the circuit continues along the line 77 and through the now closed contact 732C to a vertical line 736. The circuit continues from the vertical line 736 to line 81 and thence to line 80 and through the now closed contact 731D. From the contact 731D, the circuit continues along line 80 and the vertical line 737 to line 79 and thence to the energized vertical line 507 completing a circuit to the motor 309 for effecting its operation in a direction to move the slide 307 leftwardly, as viewed in FIG. 9. Simultaneously, a circuit is also established from the vertical line 650 along line 82 to line 83, through the now closed contact 731E to line 84 and thence to the brake that is associated with the motor 309. The circuit continues from the brake associated with the motor 309 to line 85 and thence to the energized line 651. Thus, the quadrature phase winding of the motor 309 and the brake that is associated with the motor are energized to release the brake simultaneously with the energization of the motor so that the motor operates to effect leftward movement of the slide 307. As the slide 307 moves leftwardly by operation of the motor 309, the transfer clasp 306 withdraws the tool 65A from the spindle 62 and moves to the "idle" position at the "lower level" so that the tool cannot interfere with the subsequent operation of either the magazine 70 or the spindle 62. When the slide 307 arrives at the "idle" position, the limit switch 317 is actuated and operates to open its contact in line 53, of FIG. 25, and interrupts the circuit along line 53 to effect the deenergization of the coil of the relay 706. With the coil of the relay 706 deenergized, the relay operates to move its contact 706A in line 63 to open position, thereby interrupting the circuit to the coil of the relay 731. With the coil of the relay 731 deenergized, it operates to move its contact 731B, in line 76 of FIG. 25A, to open position and move its contact 731C, line 78, to closed position. Simultaneously, contacts 731D and 731E of the relay 731 are moved to open position. Thus, the circuit along line 76 is interrupted so that the motor 309 is deenergized and also the circuit along lines 82 is interrupted to effect deenergization of the brake associated with the motor 309, and effect braking action, so that the motor is immediately stopped with the transfer clasp 306 located in the "idle" position.

Referring again to the chart of FIG. 22, it is observed that the next movement to be accomplished, as indicated by the radial marker M6 of ring "D," is that the spindle 62 is to be moved to "upper level" position and retained in the "retracted" position. Such action is effected as an automatic routine operation which is initiated by a signal obtained from the automatic routine source 604 in FIG. 24. To connect the automatic routine source of signal 604 to the signal comparator 520–52 for effecting the operation of the motor 52 for moving the saddle 49 from the "lower level" position to the "upper level" position, a circuit is completed by the return movement of the contact 706C, in line 73 of FIG. 25, to its normally closed position. It will be recalled that the coil of the relay 706 had been deenergized by the positioning movement of the slide 307 into the "idle" position so that it actuated the limit switch 317. Thus, the contact 706C is moved to its normally closed position and operates to complete a circuit from the energized line 64 of FIG. 25, along the vertical line 759 and through the now closed contact 706C to a line 760, which is shown as leading to the junction box 710, in the lower righthand portion of the drawing of FIG. 25. The line 760 emerges from the junction box 710, FIG. 25, and is connected to the terminal 567B of the stepping switch 567 so that a circuit is completed therethrough to the wiper arm 581. The circuit continues through the shaft 582 and brush 583 to the connected line 597, and thence to the coil of the relay 562, with the circuit being completed along line 51 to the energized line 507 to complete the circuit for energizing the coil of the relay 562. With the coil of the relay 562 energized, the relay operates to move its normally closed contact 562A, in line 51 of FIG. 24, to open position, thereby interrupting the control circuit to the tape reader 376 so that it cannot operate to transmit signals to the comparators 520. Also, the normally closed contact 562B, in line 50 of FIG. 25, is moved to open position, thereby interrupting the circuit along line 50 to effect deenergization of the coil of the relay 691. With the coil of the relay 691 deenergized, the relay 691 operates, as previously described, to move its associated contacts 691A to 691D, inclusive, to open position to insure that the circuits, and particularly the circuit which is established along line 43 from the contact 586B of the stepping switch 586, are interrupted. The relay 562 also operates to effect the pivotal movement of the lever 585 in a clockwise direction thereby effecting the incremental advancement of the wiper arm 581 so that it moves out of engagement with the contact 567B and into engagement with the contact 567C. As previously described, when the wiper arm 581 moves out of engagement with the contact 567B, it operates to interrupt the circuit established therethrough so that the coil of the relay 562 is deenergized. Thus, the spring 594 will operate to effect the pivotal counterclockwise movement of the lever 585 thereby resetting the finger 591 and causing the finger 592 to operate to advance the wiper arm 580 of the stepping switch 586 in a clockwise direction out of engagement with the contact 586B and into engagement with the contact 586C.

With the wiper arm 580 of the stepping switch 586 positioned in engagement with the contact 586C of the stepping switch, a circuit is established along the line 44 of FIG. 25 to a vertical line 761. The circuit continues along the connected vertical line 761, through line 38 and thence through the coil of the relay 697, and line 38 to line 37, which is connected to the energized line 507. Thus, the coil of the relay 697 is energized and the relay operates to actuate its associated contacts 697A to 697C, inclusive, in lines 51, 28 and 30 respectively, in FIG. 24. With the contact 697A in open position, the control circuit to the tape reader 376 is maintained interrupted after the relay 562 has been deenergized and its associated contact 562A has returned to its normally closed position. The contact 697C, when moved to open position, operates to effectively interrupt a circuit to the automatic routine source 603, so that this automatic source of signals cannot be energized. However, the contact 697B, in line 28 of FIG. 24, is moved to closed position and operates to complete a circuit from the energized line 537 so that current flows along line 28 to a connected vertical line 762. The current path continues along the line 762 and through the now closed contact 695D of deenergized relay 695 and thence to line 36. The current path continues on through the closed contact 702 of the manual pushbutton switch 622, through the automatic routine signal 601 and thence to the energized line 507, as previously described, for energizing the automatic routine source 601. The automatic routine source signal 601 when energized, operates to transmit a command signal to the signal comparator 520–59, which commands that the spindle head 60 be moved to the "retracted" position. However, at this time, the spindle head 60 is in a "retracted" position, having been previously moved thereto in a prior function. Thus, the feedback signal from the reading head 524 to the signal comparator 520–59, upon being compared to the fixed command signal input from the automatic resource 601, produces a null error signal so that the servo valve is not operated.

Figure 11:
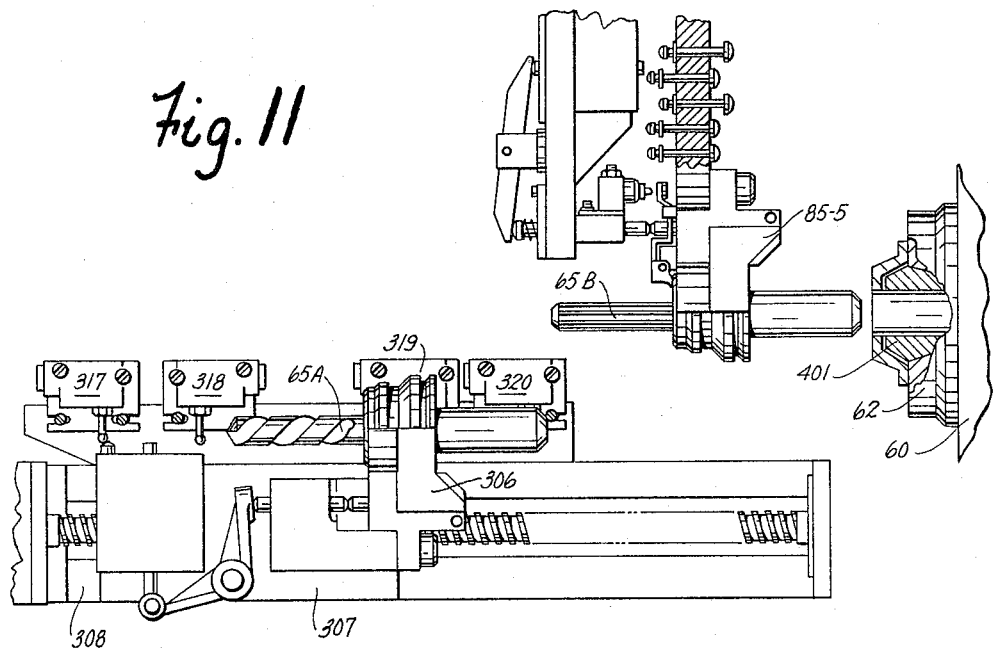

Simultaneously a current path is also completed along line 28, through a normally closed contact 763 of manual switch 635, to the automatic routine signal source of information 604 with a circuit being completed to the energized line 507 via the connected line 699 and the line 36. With the automatic routine signal source 604 energized, it operates to transmit a positioning signal to the signal comparator 520–52 which is compared to the feedback signal produced from the sensing head 542. An error signal is produced and transmitted to the servo amplifier 530–52 which operates to effect the control of the servo valve 456 for operating the motor 52 so that the saddle 49 is moved upwardly from the "lower level" position to the "upper level" position. This step in the tool change cycle of operation is indicated in the chart of FIG. 22 by the radial marker M6 of ring "D." When the positioning of the saddle 49 into the required "upper level" position has been accomplished, the feedback information from the reading head 542 to the signal comparator 520–52 is compared to the input signal from the automatic routine source 604 to produce an error signal null so that the motor 52 is stopped. The positional relationship of a selected carrier 85–5, the spindle 62 and the transfer clasp 306 having the tool 65A in its possession, is shown in FIG. 11 as it exists at this particular time.

Referring to the chart of FIG. 22, and as indicated by the radial marker M7 of the ring "G," the next function to be accomplished in a tool change operation is that the spindle must be moved to "upper level" position and also to "alignment" position. These movements will effect the coupling of the spindle 62 with the tool 65B carried by the carrier 85–5 of the magazine 70.

It will be recalled that when the coil of the relay 562 was energized, the contact 562B was moved to open position. This contact, as previously mentioned, is of the type that closes after a predetermined time interval upon deenergization of the coil of its associated relay. Since the coil of the relay 562 has been previously deenergized, the contact 562B will now be in its normally closed position and operates to reestablish the circuit along line 50 of FIG. 25, to the coil of the relay 691 so that the coil is energized. The relay 691 operates to effect the closing of its normally open contacts 691A to 691D, inclusive. It will also be recalled that when the motor 52 operated to effect the upward movement of the saddle 49 from "lower level" position to "upper level" position, the Y axis tachometer 611 was also operated to produce a voltage for effecting the energization of the coil of the relay 610. The relay 610 operated, as previously described, to open its contacts 610A to 610D in lines 43, 44, 46 and 47, respectively, of FIG. 25. Thus, even though the contacts 691A to 691D of the relay 691 are moved to closed position, circuits cannot be completed along the lines 43, 44, 46 or 47 by virtue of the fact that the contacts 610A to 610D are in open position. This will insure that other machine component movements cannot be initiated until the required positioning movement of the saddle has been accomplished. However, when the saddle 49 has been positioned at the "upper level" position, the motor 52, as well as the tachometer 611, will stop operating so that no voltage is produced and the coil of the relay 610 is deenergized. Thus, the associated contacts 610A to 610D, inclusive, are moved to their normally closed positions, and with the contact 610B returned to its normally closed position, a circuit is completed along line 44 of FIG. 25, to a connected vertical line 766, which is shown as leading to the junction box 710. Simultaneously, with current being supplied to the line 766, current will also flow along line 44 to the coil of the relay 767. This will energize the coil of the relay so that the relay 767 operates to effect the closing of its normally open contact 767A, shown in line 112 of FIG. 25A.

The energized line 766 emerges from the junction box 710, in FIG. 25A, and is connected to the contact 576D of the stepping switch 576 and also to the contact 576H of the stepping switch by means of a branch line 776. These energized contacts are not utilized at this particular time because the wiper arm 768 is positioned in engagement with the contact 576A. Since the stepping switch 576 is not actuated at this time, the circuit selecting stepping switch 577 remains deactuated and its associated wiper arm 770 remains in engagement with the contact 577A. Therefore, a circuit is completed from the energized line 561 along line 114 to and through the brush 771 and shaft 765 and wiper arm 770, to the contact 577A of the stepping switch 577. The current path continues along line 101, a vertical line 772, line 109, and thence to a connected vertical line 773. The current path continues along line 112, through normally closed contacts 774C and 775D, and through the now closed contact 767A of the previously energized relay 767 to a vertical line 777, which is shown as leading to the junction box 710.

The energized line 777 emerges from the junction box 710, in FIG. 25, and is connected to the contact 567C of the stepping switch 567. A circuit is established to the contact 567C and continues through the wiper arm 581, shaft 582, and brush 583, to the coil of the relay 562 to energize the coil of the relay 562 to effect the operation of the relay, as previously described. The lever 585, associated with the stepping switches 567 and 586, is therefore moved in a clockwise direction to effect the incremental clockwise movement of the wiper arm 581 so that it moves out of engagement with the contact 567C and into engagement with the contact 567D. When the circuit established from the contact 567C is interrupted by the movement of the wiper arm 581, the coil of the relay 562 is deenergized and thereupon the lever 585 is moved in a counterclockwise direction, as previously described. This action advances the wiper arm 580 of the stepping switch 586 so that the wiper arm moves out of engagement with the contact 586C and into engagement with the contact 586D. Thereupon a circuit is established from the wiper arm 580 through the contact 586D and thence through connected lines 778, 861 and 862 to line 39 of FIG. 25. The current path continues along line 39, through the coil of a relay 780, to line 37, and thence to the energized line 507. This circuit energizes the coil of the relay 780 so that the relay operates to move its normally open contacts 780A and 780B, in lines 37 and 38 respectively, of FIG. 25, to closed positions. With the contacts 780A and 780B in closed positions, circuits are simultaneously established for energizing the coils of the relays 695 and 697. The operation of the relays 695 and 697 function to interrupt the control circuit to the tape reader 376 to render it inactive so that the signal comparators 520–52 and 520–59 will not receive signals from the reader. With the contact 697B, in line 28 of FIG. 24, of the relay 697 moved to closed position, it operates to complete a circuit from the energized line 537 to the automatic routine source of signals 604 to energize it. However, at this time, a signal from the automatic routine signal source 604 to the comparator 520–52 has no effect because the saddle 49 has been previously moved to the "upper level" position, and therefore, the sensing head 542 transmits a feedback signal to the comparator which nulls the input signal from the automatic routine signal source 604, and therefore, a zero error signal is transmitted to the servo amplifier 530–52. On the other hand, the current from line 28 will simultaneously flow along the connected line 762, through the now closed contact 695C, line 32 of FIG. 24, the closed contact 863, to the automatic routine signal source 602, to energize this source. At this time, the spindle head 60 is positioned in its "retracted" position, and therefore, the positioning signal input from the automatic routine signal source 602 to the signal comparator 520–59 does not correspond to the feedback signal from the sensing head 524 associated with the spindle head 60. Thus, an error signal is produced and transmitted to the servo amplifier 530–59 effecting the operation of the servo valve 486 which, in turn, operates to control the operation of the motor 59 for effecting the advancing movement of the spindle head 60 to position the spindle 62 into "alignment" position. This movement of the spindle 62 into "alignment" position effectively couples the spindle with the tool 65B carried by the carrier 85–5 and which is located in the ready station 86 by a prior indexing movement of the magazine 70. When the feedback signal from the sensing head 524 to the signal comparator 520–59 indicates that the spindle head 60 has been moved to the desired location, a null signal is obtained so that the servo valve will stop the operation of the motor 59.

Figure 12:
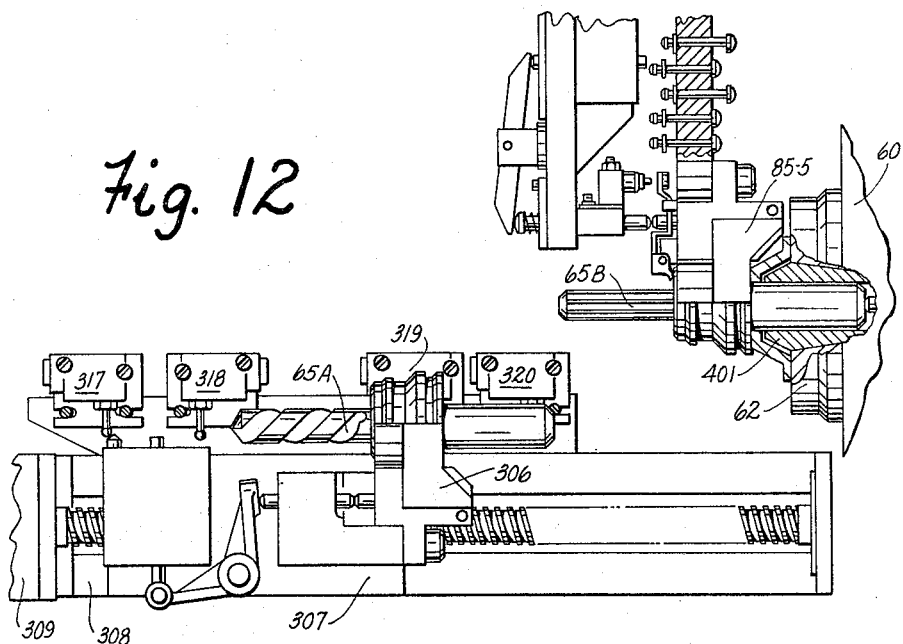

With the spindle moved into engagement with the tool 65B, in FIG. 12, the spindle collet 401 must be clamped to operatively couple the tool to the spindle. This function is indicated by the radial marker M8 of ring "E" in the chart of FIG. 22. It will be recalled that the wiper arm 580 of the stepping switch 586 has been previously moved into engagement with the contact 586D of the stepping switch, therefore, a circuit is established from the contact 586D and current will flow along line 46 through the now closed contacts 691B and 610C to a line 786, which is shown as leading to the junction box 710, in FIG. 25. This energized line 786 is shown emerging from the portion of the junction box 710, which appears in the lower lefthand corner of the drawing of FIG. 25A, and is connected to the contact 578B of the stepping switch 578. Thus, current will flow through the contact 578B, the wiper arm 739, and along line 116, to energize the coil of the relay 745. With the coil of the relay 745 energized, the relay operates to effect the incremental clockwise advancement of the wiper arm 739 and moves the wiper arm into engagement with the contact 578C. This, of course, interrupts the circuit to the coil of the relay 745 to deenergize the relay so that the lever 746 is moved in a counterclockwise direction by operation of the spring 748, thereby advancing the wiper arm 751 of the stepping switch 579 in a clockwise direction to move it into engagement with the contact 579C. As the wiper arm 751 of the stepping switch 579 moves out of engagement with the contact 579B thereof, the circuit along line 121 to the coil of the relay 755 is interrupted and the coil is deenergized. Thereupon, the relay 755 operates to move its contact 755B in line 126 to open position, thereby deenergizing the solenoid 434 associated with the valve 430, shown in FIG. 23. The relay also operates to move its contact 755A in line 127 to closed position, and this completes the circuit for energizing the solenoid 441 of the valve so that the valve is operated to direct fluid pressure to the cylinder 403 for moving the collet 401 into clamped position.

As indicated in the chart of FIG. 22 by the radial marker M9 of ring "F," the next action to be accomplished in a tool change cycle of operation is that the magazine carrier claw must be retracted, i.e., the claw 108–5 associated with the carrier 85–5, in FIG. 7, must be withdrawn out of engagement with the tool 65 so that the tool is released. This is accomplished through a circuit which is established from the energized contact 579C with the current flowing along line 122 of FIG. 25A, through the coil of a relay 787 and thence to the line 507, energizing the relay. With the coil of the relay 787 energized, the relay will operate to effect the movement of its contact 787A, in line 35 of FIG. 25, to a closed position to complete a circuit along line 35 from the energized line 561. The current from the energized line 561 will flow along line 35, through a normally closed contact 775G to the solenoid 168 and thence to the energized line 507. As previously described, when the solenoid 168 is energized, FIG. 7, it operates to effect a counterclockwise pivotal movement of the lever 161, thereby effecting a rightward movement of the rods 146 and 136 to effect the retraction of the carrier claw. Thus, the tool 65B is released from the possession of the carrier 85–5.

Referring again to the chart of FIG. 22, it will be noted that the next function to be accomplished, as indicated by the radial marker M10 of ring "D," is that the spindle 62 is to be moved to the work station. It will also be noted that in the chart, the initiation of this function terminates the first tool change operation, as indicated by the broken radial line in the chart. The next series of sequential steps are functions which occur while the spindle is performing a machining operation and are preparatory for the next tool change operation.

To effect the movement of the spindle 62 to the work station, current flows from the contact 579C of the stepping switch 579, in FIG. 25A, to a line 788, which is shown as leading to the junction box 710. Energized line 788 is shown emerging from a portion of the junction box 710 which appears in FIG. 25, with the energized line being connected to the contact 567D of the stepping switch 567. Thus, current is supplied to the contact 567D, and since the wiper arm 581 has previously been positioned in engagement with the contact 567D, the current will be conducted to the coil of the relay 562 to energize the relay coil, as previously described. The energized relay 562 operates to advance the stepping switch wiper arm 581 out of engagement with the contact 567D and into engagement with the contact 567E. This action, of course, deenergizes the coil of the relay 562 which thereupon operates to release the lever 585 so that the spring 594 moves the lever in a counterclockwise pivotal movement to advance the wiper arm 580 of the stepping switch 586 into engagement with the contact 586E thereof. When the wiper arm 580 of the stepping switch 586 moves out of engagement with the contact 586D, the circuit to the coil of the relay 780, in line 39, is interrupted to deenergize the coil so that the relay operates to move its contacts 780A and 780B to their normally open positions. In this manner, the coil of the relays 695 and 697 are deenergized and they, in turn, operate to move their associated contacts to their normal positions, shown in FIG. 24, and the tape reader 376 is again reactivated. Thus, the movement of the saddle 49, spindle head 60, spindle 62, as well as the column 41, are returned to the control of the tape reader, and the signals from the tape reader, which are transmitted to the various signal comparators 520 via the trunk line 516, will effect the movement of the spindle to the work station for performing a work operation. With the return of the operation of the machine components to tape control, a signal from the tape reader obtained from the tape will effect the operation of the automatic contact 609, in line 30 of FIG. 24, to move the contact 609 to open position thereby effectively disconnecting the coil of the relay 610 so that it is not continuously energized and deenergized during movement of the components during a machining operation.

With the wiper arm 580 of the stepping switch 586 in engagement with the contact 586E, a circuit is established along line 47, through the closed contacts 691A and 610D, through the coil of a relay 790 and thence to the energized line 507 for energizing the coil of the relay 790. With the coil of the relay 790 energized, an associated contact 690A, in line 41 of FIG. 25, will be moved to a closed position after a predetermined time interval. The time interval set for the closing of the contact 790A is sufficient to insure that the spindle 62 has been moved from the ready station 86 to a work station. Thus, when the contact 790A moves to closed position, a circuit is completed from line 47 and current will flow through the contacts 790A, along line 41, to a normally closed automatic contact 791 which is presently in its normally closed position. The automatic contact 791 is actuated to a closed position by a signal from tape after the spindle 62 has been moved to the work station. This insures that accidental collision between moving machine components will not occur. The current path continues through the contact 791 to a line 792, shown as leading to a portion of the junction box 710. This energized line 792 emerges from a portion of the junction box 710, shown in the lower lefthand portion of the drawing of FIG. 25, with the energized line 792 being connected to a contact 574C of the stepping switch 574. Since the wiper arm 712 of the stepping switch has been previously moved into engagement with this contact from a prior operation, current will flow through the line 716, shaft 713, brush 714, to the coil of a relay 720, in line 79 of FIG. 25A, to energize the relay. The energized relay 720 effects the clockwise movement of the wiper arm 712 of the stepping switch 574 so as to advance the wiper arm into engagement with the contact 574D. When the wiper arm is moved out of engagement with the contact 574C, the coil of the relay 720 is deenergized. This will effect the advancement of the wiper arm 725 of the stepping switch 575 so that the wiper arm 725 is moved out of engagement with the contact 575C and into engagement with the contact 575D. A circuit is now established from the energized line 561, along line 59, to the brush 726, shaft 727 and wiper arm 725 of the stepping switch 575 and thence through the contact 575D to energize the line 71 in FIG. 25. The current path continues on through line 71, a connected line 784, line 68, vertical line 793, and thence through the now closed contact 707B of the "alignment" position relay 707. The relay 707 is energized at this time because the transfer clasp 306 is presently in the "idle" position. Therefore, the "alignment" position limit switch 319, in line 55, is deactuated and its associated contact is in closed position thereby completing a circuit along line 55 to the coil of the relay 707 to effect the operation of the relay to close its associated contact 707B. The current path continues through the contact 707B, along line 69, a vertical line 794, and thence through a now closed contact 708A of an energized relay 708. The coil of the relay 708 is energized at this time for the reason that its associated limit switch 320, in line 56, is deactuated, thereby completing a circuit along line 56 to energize the coil of the relay 708. Current flowing through the now closed contact 708A continues on along the vertical line 729, through the now closed contact 708B of the relay 708, along line 59 and through the closed contact 731A of deenergized relay 731 and thence along line 57 to the coil of the relay 732 to energize the relay.

With the coil of the relay 732 energized it operates to move its contact 732B in line 76 to closed position and its associated contact 732C in line 78 is moved to an open position. Thus, a circuit is completed from the energized line 561 and current flows along the line 76, the line 734, through the normally closed contact 731C, through line 77 and thence to the motor 309. The flow of current continues on through the motor 309 and along line 75, through the now closed contact 732B, along line 736, through the now closed contact 732D of the relay 732, through the vertical line 737 and thence through the line 79, to the energized line 507. Thus, a circuit is completed for energizing the motor 309 for effecting its operation in a direction to move the slide 307 in a rightward direction to position the transfer clasp 306 with the tool 65A therein in a position of "alignment" directly under the magazine 70, as depicted in FIG. 13. Simultaneously, with the completion of a circuit to energize the motor 309, another circuit is also established to energize the brake associated with the motor and the other quadrature phase motor winding so that the brake is released simultaneously with the energization of the motor 309. Thus, the brake is released and the motor 309 will operate to effect the positioning movement of the transfer clasp 306 to "alignment" position. Thus, movement of the transfer clasp 306 to "lower level" position and to "alignment" position, as indicated by the radial marker M11 of ring "C" in the chart of FIG. 22 has been accomplished.

The next step in the tool change cycle of operation is indicated by the radial marker M12 of ring "G," wherein it is indicated that the magazine 70 is to be indexed to position the only other empty carrier at the ready station 86. The only other empty carrier available, other than the carrier 85–5 from which the tool 65B has been removed by the operation of the spindle, is carrier 85–18, as shown in FIG. 2. The tool 65A that is now in the possession of the transfer clasp 306 had been previously removed from carrier 85–18, therefore, the only other carrier is the carrier 85–18, and the magazine 70 must be indexed so as to position the carrier 85–18 in the ready station so that the tool 65A, carried by the transfer clasp 306, may be restocked in this particular carrier.

The index movement of the magazine 70, is initiated through a circuit which is completed when the transfer clasp 306 is positioned in the "alignment" position to actuate the limit switch 319 and interrupt the circuit to the coil of the relay 707. With the relay 707 deenergized, its associated contact 707C, in line 70 of FIG. 25, is returned to its normally closed position. A circuit is completed from the energized line 793, through the now closed contact 707C, line 73, to a connected line 795 which enters the junction box 710. The energized line 795 emerges from a portion of the junction box 710 and is connected to the contact 576E of the stepping switch 576, in FIG. 25A. Another line 796 is also connected to the contact 576E, and has its opposite end connected to the contact 576A. With the contact 576E of the stepping switch energized, the contact 576A is simultaneously energized. In the present tool change cycle of operation being described, the stepping switches 576 and 577 have not as yet been actuated. Therefore, with the contact 576A energized, a circuit is established from the contact 576A, to line 97, for energizing the coil of the relay 769. The energized relay 769 operates to effect the clockwise pivotal movement of the lever 797 so that the wiper arm 768 of the stepping switch 576 is advanced into engagement with the contact 576B of the switch. This action interrupts the circuit to the coil of the relay 769 so that the lever 797 is now moved in a counterclockwise direction through the operation of an associated spring 798. As the lever 797 moves in a counterclockwise direction, the associated right spring finger 799 operates to advance the wiper arm 770 of the stepping switch 577 in a clockwise direction into engagement with the contact 577B. A circuit is established from the energized line 561 and current will flow along line 114, through the wiper arm 770, to the contact 577B, and thence along line 104, to a vertical line 805 which is connected to lines 105 and 106. However, at this time, a contact 774A in line 106 is in an opened position so that a circuit along line 106 cannot be completed. The contact 774A was previously opened in response to the energization of the coil of its associated relay 774, in line 115, and which was energized at the time that the coil of the relay 769 was energized because the relay 769 operated to move an associated normally open time-to-open contact 769A, in line 115, to a closed position. Thus, the coil of the relay 774 is maintained energized for a preset time interval after the coil of the relay 769 has been deenergized. This interval of time is sufficiently long to enable a relay 775 to be operated, as will be described. As previously mentioned, the energized line 805 is connected to the line 105, so that current will flow to the coil of a relay 806 to energize and operate the relay whereupon its associated contact 806A, in line 104, is moved to a closed position. With the contact 806A in closed position, current will flow through the contact to line 103 and thence through the coil of a relay 807, with the circuit being completed to the energized line 507. The relay 807 will operate to move its associated contact 807A, in line 7 of FIG. 25, to a closed position thereby completing a circuit along line 7 for energizing the coil of a latching relay 808. The latching relay 808 is of the type that operates upon energization of its coil to move its associated contacts to actuated positions, and the contacts when so moved are maintained in the actuated position even though the coil of the associated relay 808 becomes deenergized. The associated contacts of the relay 808 remain in their actuated positions until an associated unlatching relay 809 is energized, and operates to effect a release of mechanical latching means to effect a release of the contacts associated with the relay 808. Thus, with the coil of the relay 808 energized, the relay operates to move its associated contact 808A in line 13 to open position so that a circuit cannot be completed along line 13. A contact 808B, in line 21, is moved to a closed position, while a contact 808C, in line 30, is released. The contact 808C is of the type that is normally closed, and upon energization of its associated coil, will open after a preset time interval. The normally closed time-to-open contact 808C, in line 30 is provided so that circuit is completed to energize a coil of a relay 810, which appears in line 13, even though the limit switch 389 has been actuated and the relay 808 energized. It will be recalled that when the tool 65B was removed from the carrier 85–5, the lever 381 was actuated to move its cam 387 into position to actuate the limit switch 389, shown in FIG. 4. Thus, the limit switch, shown schematically in line 31 of FIG. 25, is presently actuated and its associated contact is moved to open position, so a circuit along line 31 to the coil of the relay 810 cannot be established. However, as mentioned, the contact 808C, in line 30, remains closed a sufficient length of time so that a circuit from the energized line 561 is completed along line 30, through the contact 808C, now closed contact 808B, in line 21, a branch line 811 to the coil of the relay 810 to energize the coil. With the coil of the relay 810 energized, the relay operates to move its associated contact 810A, in line 124 of FIG. 25A, to closed position. With the contact 810A in closed position, a circuit is completed from the energized line 650, along line 128, a vertical line 756 and thence along line 124 and through the now closed contact 810A to the solenoid 210, with the circuit being completed to the energized vertical line 651. The energized solenoid 210 operates to effect the retracting movement of the locating fork 181, shown in FIG. 3, to release the magazine 70 prior to an indexing movement thereof.

The circuit which was completed to energize the coil of the relay 810, line 13 in FIG. 25, also effects energization of a coil of the relay 775, in line 14, so that the relay operates to move associated contact 775A, in line 15, to open position. With the contact 775A moved to open position, the flow of current along line 15 to the transformer 813 is interrupted and the transformer is deenergized. With the transformer 813 deenergized, it transmits only a voltage from the energized line 507 to the transducer 253 and it, in turn transmits control voltage to the amplifier 814 via the input line 815. The amplifier control circuit is completed from the energized vertical line 812 via a connecting line 818. It is to be noted that the amplifier 814 is maintained energized at all times via lines 33 and 28. The control circuit of the amplifier 814 is receiving the full control voltage which is of a phase that effects the energization of the magazine motor 170 in "forward" rotation. As the motor 170 operates, the magazine 70 rotates and, as soon as the carrier 85–5 moves out of the ready station 86, the limit switch 389 is released and moves to a closed position, shown in line 31 of FIG. 25. This operates to establish a circuit for maintaining the coils of the relays 810 and 775 energized through a circuit established along line 31. Thus, when the contact 808C moves to an open position, it will have no effect on either of the coils of the relays 810 or 775. As the various carriers move past the ready station 86, their associated levers 381 are positioned in a retracted position because each carrier is provided with a tool so that the associated lever 381 of each carrier is pivoted in a clockwise direction thereby moving the associated cam 387 towards the face of the magazine, as previously described. In this position, the cams of the individual levers of each tool carrying carrier cannot actuate the limit switch 389 as each carrier moves past the ready station 86. When the only other empty carrier 85–18 moves into position, or into the ready station 86, its associated lever 381 will be positioned outwardly so that its associated cam 387 will engage the plunger 388 of the limit switch 389, thereby actuating the limit switch to effect its operation to move its associated contact, in line 31 of FIG. 25, to open position thereby interrupting the circuit to the coils of both of the relays 810 and 775. With the coil of the relay 810 deenergized, the relay 810 operates to move its associated contact 810A, in line 124 of FIG. 25A, to an open position. This will interrupt the circuit which had been completed for energizing the solenoid 210 and the solenoid is deenergized. With the solenoid 210 deenergized, the locating fork 181 is moved outwardly by action of the spring 194, as viewed in FIG. 21 and previously described, to engage with the web associated with the particular carrier 85–18. However, as previously mentioned, the momentum of the magazine 70 is such as to carry the carrier 85–18 past the ready station and the transducer 253 responds to effect the repositioning of the magazine for positioning the carrier 85–18 at the ready station. This action occurs because the coil of the relay 775 was deenergized simultaneously with the deenergization of the coil of the relay 810. Thereupon, the relay 775 operated to move its contact 775A to its normally closed position to reestablish a circuit to the transformer 813. With the circuit to the transformer 813 reestablished, the transformer operates to transmit an input voltage to the transducer 253. Since the arm 184, which is coupled to the magazine, or rather to the particular web associated with the carrier 85–18, is not in a true vertical position but is angularly displaced therefrom, the actuating plunger 254, shown in FIG. 8 and schematically in FIG. 25, of the transducer 253, will be displaced from its neutral or center position, as previously described. Thus, the transducer 253 operates to provide a "reverse" phase signal voltage to the phase sensitive amplifier which is 180° phase displaced from the reference voltage which is being transmitted to the transformer 813 via the line 812. The difference between the transducer voltage and the reference voltage is transmitted to the phase sensitive amplifier, and the differential voltage utilized to operate the motor 170 with "reverse" rotation so that the arm 184 is returned to a true vertical position. When the arm 184 is located in its vertical position, the actuating plunger 254 of the transducer 253 will be in its central neutral position and the signal voltage from the transducer 253 is equal to the reference voltage. A null input signal is obtained, and the operation of the motor 170 is stopped, and the only other empty carrier 85–18 is now located at the ready station 86. Thus, function of indexing the magazine to the only other empty carrier, as indicated by the radial marker M12 of the ring "G" in the chart of FIG. 22, is accomplished.

Since the function last completed was to locate the only other empty carrier 85–18 at the ready station, it will be apparent that the tool 65A, carried by the transfer clasp 306, is to be placed in the carrier 85–18. To accomplish this restocking of the tool 65A into the carrier 85–18, all that is necessary is to move the transfer clasp from the "lower level" position to the "upper level" position since the transfer clasp has been previously moved to "alignment" position at the "lower level" position. The movement to the "upper level" position is indicated by the radial marker M13 of ring "C." The movement is initiated by means of a circuit completed from the energized line 805, FIG. 25A, along line 106, through the now closed contact 774A of deenergized relay 774, the now closed contact 775B of deenergized relay 775 to a vertical line 817, which is shown leading to a portion of the junction box 710. The energized line 817 emerges from a portion of the junction box 710 and is connected to a terminal of the limit switch 366, which appears on line 99 of FIG. 25A. At this time, the limit switch 366 is in a deactuated position, since the carriage 353 is presently in its lowermost position, as viewed in FIG. 2. On the other hand, the switch actuating bar 363 is in the lowermost position wherein it operates to actuate the limit switch 361. Therefore, as shown in FIG. 25A, the limit switch 366 is deactuated while the limit switch 361 is actuated. Thus, a circuit is completed from the energized line 817 through the contact of the deactuated limit switch 366 to a coil of a relay 820, in line 98. The circuit continues along line 98, a vertical line 821 that is connected to the line 97, which in turn, is connected to the energized line 507. With the coil of the relay 820 energized, the relay operates to actuate its associated contacts 820A to 820D, inclusive, in lines 88, 91, 93 and 95, respectively, of FIG. 25A. With the contact 820D in line 95 moved to a closed position, a circuit is completed from the energized line 561 and current flows along line 95, through the now closed contact 820D to line 96 and thence to the motor 360. Current continues from the motor 360 along line 94 to line 93 and thence through a normally closed contact 822C of a deenergized relay 822 to a vertical line 823. From the vertical line 823, the current flows along line 90, through the now closed contact 820B, along line 91 to line 92, which is connected to the energized line 507. Thus, the motor 360 is energized for operation in a direction to effect upward movement of the carriage 353 to effect the positioning of the transfer clasp 306 in the "upper level" position. Simultaneously therewith, a quadrature phase circuit is also established to the cooperative quadrature motor winding and to the parallel connected brake portion of the motor to energize the brake to release the motor 360 for operation, as described. This circuit is completed from the energized line 650 along line 89 to line 88 and through the now closed contact 820A to line 87 and thence to the brake portion. From the brake the circuit continues to line 86, which is connected to the energized vertical line 651. As the carriage 353 moves upwardly, the limit switch 361 is released, and when the carriage has reached its uppermost limit of travel, in which the transfer clasp is positioned at "upper level" position so that it has inserted the tool 65A into the carrier 85-18, the limit switch 366 will be actuated. This will effect deenergization of the coil of the relay 820 and it operates to return its associated contacts to their normal position, as shown in FIG. 25A. This immediately interrupts both circuits to the motor 360 including the circuit to the brake portion of the motor. The brake is reapplied and the motor 360 is immediately stopped with the transfer clasp 306 now located in its "upper level" position. Thus, the function, indicated by the radial marker M13 of ring "A" in the chart of FIG. 22, of moving the transfer clasp to its "upper level" position is accomplished.

With the tool 65A restocked in the carrier 85-18, the associated claw of the carrier must be advanced to firmly secure the tool within the carrier, as indicated by the radial marker M14 of ring "F" in the chart of FIG. 22. To accomplish this function, a circuit is established from the energized line 817, which is shown leaving the junction box 710 in FIG. 25A, and which is connected to a terminal of the limit switch 366. Since the limit switch 366 is now actuated, its associated contact is in engagement with a terminal 744 and current will flow to a line 824 which enters the junction box 710, shown in FIG. 25A. The energized line 824 emerges from the the portion of the junction box 710, shown in the lower lefthand portion of the drawings of FIG. 25A, and is connected to the contact 578C of the stepping switch 578. The wiper arm 739 of the stepping switch has been previously advanced into engagement with the contact 578C. Thus, a circuit is established through the wiper arm 739 of the stepping switch to energize the coil of the relay 745, as previously described. With the coil of the relay 745 energized, the relay operates to effect the clockwise pivotal movement of the lever 746 thereby advancing the wiper arm 739 of the stepping switch 538 in a clockwise direction and moving it out of engagement with the contact 578C and into engagement with the contact 578D. This action interrupts a circuit to the coil of the relay 745 and it is deenergized. The spring 748 will now operate to effect the counterclockwise pivotal movement of the lever 746 thereby advancing the wiper arm 751 of the stepping switch 579 so that the wiper arm 751 is moved out of engagement with the contact 579C and into engagement with the contact 579D. As the wiper arm 751 of the stepping switch 579 moves off of the contact 579C, the circuit for energizing the coil of the relay 787 is interrupted and the coil is deenergized. Upon deenergization of the coil of the relay 787, the relay operates to move its contact 787A, in line 35, to an open position thereby interrupting the circuit along line 35 to effect deenergization of the solenoid 168. With the solenoid 168 deenergized, the spring 151, shown in FIGS. 3 and 7, associated with the plunger 152 immediately operates to effect a leftward movement of the plunger so that the spring 140-18, FIG. 3, associated with the claw 108-18 of the carrier 85-18 operates to move the claw into gripping engagement with the tool 65A. This action, of course, satisfies the indicated required function set forth by the radial marker M14 of ring "F" in the chart of FIG. 22.

Another line 824A, shown in the upper lefthand corner of the drawing of FIG. 25, emerges from the junction box 710, is connected to the coil of a memory selecting latching relay 825. Within the junction box 710, the line 824A is connected to the energized line 824, and thus, is also energized. The opposite side of the coil of the relay 825 is connected via line 8 to the energized line 507 thereby completing a circuit for energizing the coil of the latching relay 825. The energized relay 825 operates to effect movement of its associated contacts from their normal positions, shown in FIG. 25. Thus, normally open contacts 825A, 825C, 825E, 825G, 825I, 825K, 825M, 825O, 825Q and 825S are moved to closed positions, while normally closed contacts 825B, 825D, 825F, 825H, 825J, 825L, 825N, 825P, 825R and 825T are moved to open positions. This connects the selector switches 286 to 290, inclusive, to the second bank of memory switches, which will be actuated by a signal from the tape for indicating the next desired carrier to be selected for positioning at the ready station 86, as will be subsequently described.

Referring now to the chart of FIG. 22, the next function in a tool change cycle is indicated by the radial marker M15 of ring "B," and as there indicated, the transfer clasp claw 326 must be retracted. To accomplish this function, current from the energized contact 579D of the stepping switch 579 flows along line 123 and through the coil of the relay 753 and thence to the energized line 507 to complete a circuit for energizing the coil of the relay. The relay 753 operates to move its associated contact 753A, in line 128, to a closed position. This completes a circuit along line 128 for energizing the solenoid 330. With the solenoid 330 energized, and as previously described, it will operate to effect the pulling of the transfer clasp claw 326.

Referring to the chart of FIG. 22, the next step in the tool change cycle of operation, as indicated by the radial marker M16 of ring "C," is to move the transfer clasp 306 to "standby" position at the "upper level" position. Since the transfer clasp 306 is already positioned in the "upper level" position, as indicated by the radial marker M13, it is only necessary that the transfer clasp be moved to the "standby" position. To this end, the motor 309 and the relay 731 must be energized to effect the operation of the motor in a direction to effect leftward movement of the slide 307, as viewed in FIG. 14, so that it will be moved from "alignment" position into the "standby" position, depicted in FIG. 15. This is accomplished through a circuit which is established from the energized contact 579D of the stepping switch 579. Current from the contact 579D flows along a connected line 827 which enters the junction box 710, shown in FIG. 25A. As shown in FIG. 25, in the lower lefthand corner of the drawing thereof, the energized line 827 emerges from the junction box 710 and is connected to the contact 574D of the stepping switch 574. A circuit is completed via the wiping arm 712 of the stepping switch to the coil of the relay 720, in line 79 of FIG. 25A, for energizing the coil. With the coil of the relay 720 energized the relay operates, as previously described, to effect the operation of the lever 721 in a clockwise direction. This action moves the wiper arm 712 of the stepping switch 574 in a clockwise direction and moves it out of engagement with the contact 574D and into engagement with the contact 574E, and the coil of the relay 720 is deenergized. Thereupon, the spring 722 operates to effect pivotal movement in a counterclockwise direction of the lever 721 for effecting the advancement of the wiper arm 725 of the stepping switch 575 so that it moves out of engagement with the contact 575D and into engagement with the contact 575E, and the relay 732 is deenergized. With the relay 732, in line 57 of FIG. 25, deenergized it operates to move its contacts 732A to 732D, inclusive, to their normal deactuated positions, as depicted in line 63 of FIG. 25, and lines 76, 78, 81 and 83 of FIG. 25A.

The positioning of the wiper arm 725 into engagement with the contact 575E of the stepping switch 575 operates to complete a motor energizing circuit along line 72, a vertical line 828, line 66, vertical line 829, and through a now closed contact 705A, in line 65 of FIG. 25. The motor energizing circuit continues from the closed contact 705A, through now closed contact 706B, in line 65, along the vertical line 759, line 63, and through now closed contacts 706A and 732A, to line 58. The current path continues along line 58 to line 53 and through the coil of the relay 731 and thence to the energized line 507, energizing the coil. The energized relay 731 operates to effect the movement of its associated contact 731A in line 59 to open position thereby insuring that the coil of the relay 732 cannot be energized at this time. The energized relay 731 also operates to effect the closing of associated normally open contacts 731B, 731D and 731E, in lines 76, 81 and 83 of FIG. 25A, respectively, and to move a normally closed contact 731C, in line 78, to open position. This will complete circuits for effecting the simultaneous energization of the motor 309 and the associated brake mechanism, so that the motor is released and operates to effect leftward movement of the slide 307. As the slide 307 moves leftwardly, the limit switch 319 is released and it returns to its normally closed position, in line 55 of FIG. 25. Such action has no affect on the various components at this time.

The slide 307 continues to move leftwardly through the operation of the motor 309 until the transfer clasp 306 reaches the "standby" position, and actuates the limit switch 318. With the limit switch 318 actuated to an open position, depicted in line 54 of FIG. 25, the circuit to the coil of the relay 705 is interrupted. Upon this occurrence, the relay is deenergized and operates to move its associated contacts 705A to 705C, in lines 66, 68 and 72, respectively, of FIG. 25, to their normal positions as shown. Thus, the circuit for energizing the coil of the motor left relay 731, in line 52, which was established through the contact 705A is now interrupted so that the coil of the relay 731 becomes deenergized and it operates to return its associated contacts 731B, 731C, 731D and 731E to their normal positions, shown in FIG. 25A. This action effects the deenergization of the motor 309 and also of the associated brake mechanism, so that the motor 309 is immediately stopped and the slide 307 is accurately positioned in the "standby" position. The transfer clasp 306 is now located in the "standby" position and at the "upper level" position and is empty, the tool 65A having been left in possession of the carrier 85–18.

From the chart of FIG. 22 it will be seen that the next step in the cycle of tool change operation, as indicated by the radial marker M17 of ring "G," is that the magazine 70 is to be indexed so that a desired carrier 85 may be selected for location at the ready station 86. The next indicated desired carrier to be selected for positioning at the ready station 86 is indicated in the electrical system by the operation of the second bank of tape memory switches 675 to 684, inclusive, shown in FIG. 25. For the purpose of this description, it will be assumed that the next desired carrier to be located at the ready station 86 is the carrier 85–11. Thus, the particular carrier is identified by the number 11 and is indicated in the binary system as 01011. This binary number is indicated in the control system through the actuation of the switches in the second bank of memory switches shown in FIG. 25. These switches have been previously connected into the control system through the energization of the relay 825, as previously described. Thus, the pairs of switches 675 and 676, which as a unit represent the least significant digit in the binary number, remain deactuated so that the contact 675, which represents the number "1" is in closed position. The switches 677 and 678, which as a unit represent the second digit of the binary number, also remain deactuated, so that the contact 677 remains in closed position, thereby indicating the number "1" as the second digit of the binary number. However, the pair of switches 679 and 680, which as a unit represent the third digit of the binary number, are actuated so that the contact 679 is open, while the contact 680 is moved to closed position, to represent the number "0" in the third digit in the binary number. On the other hand, the contacts 681 and 682, which as a unit represent the fourth digit of the binary number, remain deactuated so that the contact 681 is in closed position and represents the number "1" as the fourth digit of the binary number. Finally, the contacts 683 and 684, which as a unit represent the fifth or most significant digit of the binary number, are actuated so that the contact 683 is open and the contact 684 is in closed position, to represent "0" in the fifth digit of the binary number. These switches are actuated upon a proper signal from the tape which was transmitted at the time that the tape reader 376 was connected into the control system of FIG. 24 to effect the controlled operation of the machine components. The indexing movement of the magazine 70, for selecting the desired carrier for location at the ready station, is accomplished by energizing the motor 170, which is initiated through a circuit that is established from the energized vertical line 829, FIG. 25, and which was energized from the cotnact 575E of the stepping switch 575, as previously described. The motor energizing circuit from the energized line 829 is completed through the now closed contact 705C of the deenergized relay 705 to energize a line 832 which is shown leading to a portion of the junction box 710, shown in the lower righthand corner of the drawing of FIG. 25. The energized line 832 emerges from the junction box 710, shown in FIG. 25A, and is connected to a contact 576F of the stepping switch 576 in FIG. 25A. A line 833 is also connected to the contact 576F of the stepping switch and has its opposite end connected to the contact 576B. Thus, the contact 576B of the stepping switch 576 is energized, and since the wiper arm 768 of the stepping switch has been previously positioned in engagement with the contact 576B, the coil of the relay 769, in line 97, will be energized, as previously described. The relay thereupon operates to effect the incremental advancement in a clockwise direction of the wiper arm 768 of the stepping switch 576 so that it is moved out of engagement with the contact 576B and into engagement with the contact 576C. This action effects deenergization of the relay 769. Thereupon, the spring 798 associated with the lever 797 operates to move the lever in a counterclockwise direction for effecting the movement of the wiper arm 770 of the stepping switch 577 in a clockwise direction so that it moves out of engagement with the contact 577B and into engagement with the contact 577C thereof. With the wiper arm 770 of the stepping switch 577 positioned in engagement with the contact 577C, a circuit is completed from the contact 577C, along line 106, a vertical line 836, line 110, a vertical line 837, line 113, through the coil of a relay 838, and thence to the energized line 507 to energize the coil of the relay 838. The energized relay 838 operates to move its associated contact 838A in line 110 to a closed position, thereby completing a circuit for energizing the coil of the relay 839. With the coil of the relay 839 energized, it will operate to move its associated normally open contact 839A, in line 6 of FIG. 25, to closed position. This will complete an energizing circuit along line 6 to the coil of an unlatching relay 809 which now operates to effect a release of the contacts associated with the now deenergized relay 808 so that these contacts return to their normal positions, shown in FIG. 25. Thus, the contact 808A, in line 13, is moved to its closed position to complete a circuit for energizing the coils of the relays 810 and 775.

It will be recalled that the carrier 85–18 of the magazine 70 is presently located in the ready station 86. Therefore, the coding plungers 271–18 to 275–18, associated with the carrier 85–18, are set, as depicted in FIG. 15, so that the limit switches 287 and 290 of the reading head 285 are presently actuated and their associated contacts are in engagement with terminals 844 and 845, in lines 15 and 27, respectively, of FIG. 25. Thus, a circuit from the energized vertical line 561, shown in FIG. 25, is completed along line 16, through the contact of the now actuated limit switch 287, to line 15. From line 15, the circuit continues to line 14, through the now closed contact 825E of the memory selecting relay 825, which has previously been energized. The circuit continues along line 14, through the normally closed contact 677, which has remained closed, as previously described, to the vertical line 840. The circuit continues from the vertical line 840, to line 13, through the now closed contact 808A, to the coil of the relay 810, and thence along line 13 to the energized line 507 for energizing the coil of the relay 810. With the coil of the relay 810 energized, the relay operates to move its associated contact 810A, in line 24 of FIG. 25A, to a closed position so that the solenoid 210, in line 124, is energized. The energized solenoid 210 operates to effect retraction of the locating fork 181, shown in FIG. 3, as previously described, so that the magazine is released and free to rotate. An energizing circuit is also completed from line 13 to line 14, via a connecting vertical line 811, and thence to the coil of the relay 775, to effect energization of the coil. With the coil of the relay 775 energized, it operates to move its normally closed contact 775A, in line 15 of FIG. 25, to open position thereby interrupting the circuit to the transformer 813. With the transformer 813 deenergized, there is only a voltage from energized line 507 connected to the transducer 253 so that it transmits a signal to the phase sensitive amplifier 814. Thus, the amplifier receives only the input reference voltage from the energized line 812, as previously described. The energized phase sensitive amplifier 814 operates to effect the energization of the magazine motor 170 in "forward" rotation so that the motor operates to effect the indexing movement of the magazine 70.

The rotary movement of the magazine 70 moves the individual carriers 85 past the reading head 285 and the coded plungers associated with each carrier is read by the reading head 285. When the number indicated by the coded plungers and read by the reading head 285 coincides with the number impressed upon the second bank of memory switches, the electrical control system will operate to deactuate the magazine motor 170 and thereby stop the rotation of the magazine 70. Thus, when the coded plungers 271–11 to 275–11, shown in FIG. 16, are read by the reading head 285, the coded plungers associated with the carrier 85–11 will actuate the limit switches 286 to 290, inclusive, of the reading head 285, to indicate the presence of the desired carrier. Therefore, the limit switches 286, 287 and 289 will be actuated to represent the numeral "1" in the first, second and fourth digits of the binary number, while the switches 288 and 290 will not be actuated, to indicate the number "0" in the third and fifth digits of the binary number. The number represented by the preset coded plungers associated with the carriers that is read by the reading head 285 coincides with the number impressed upon the electrical control system and the electrical control system will operate to effect the deenergization of the motor 170. This is true because, as previously described, the memory in which the particular carrier 85–11 is indicated in the control system is the second bank of switches which includes the contacts 675 to 684, inclusive, and of these switches, the pairs of switches 675 and 676 and 679 and 680 remain in their normal positions, shown in FIG. 25, while the pairs of switches 677 and 678, 681 and 682, and 683 and 684 are actuated. With the limit switch 286 of the reading head 285 actuated to represent the numeral "1" as the first digit of the binary number, its contact is moved into engagement with the terminal 841. However, a circuit along line 11 is not completed because the contact 825B has been previously moved to an open position. Likewise, a circuit along line 10 cannot be completed because at this time, the memory contact 675, which represents the numeral "1" as the first digit of the binary number is in open position. The limit switch 287 of the reading head is also actuated, but a circuit along either line 14 or 15 is not completed at this time because the contact 825F, in line 15, is in open position. In line 14, the contact 825E is in closed position; however, the contact 667 of the first bank of memory switches is open, so that a circuit cannot be completed through it. The switch 288, which represents the third digit of the binary number is deactuated, so that its contact is positioned, as shown in line 20. However, a circuit from this switch, via connected lines 20 and 19, is not completed because the automatic memory contact 680 is in open position, as shown. A circuit cannot be completed along line 21 for the reason that the contact 825L is in open position. Similarly, circuits are not established through the actuated switch 289 for the reason that the contact 681, in line 22, is in open position, as is the contact 825N, in line 23, so that circuits cannot be completed along these lines. Finally, circuits along lines 28, 27 and 29, from the deactuated limit switch 290, will not be completed because the automatic memory contact 684 is in open position. In line 29, the contact 825T is in open position and a circuit cannot be completed along this line. Thus, with the selector switches 286 to 290, inclusive, actuated in coincidence with the memory switches 675 to 684, inclusive, there is no circuit that is completed to the vertical line 840. Therefore, the circuit which had been completed along lines 13 and 14 from the vertical line 840 is interrupted and the coils of the relays 810 and 775 are deenergized. With the coil of the relay 810 deenergized, the relay operates to move its contact 810A, in line 124 of FIG. 25A, to an open position thereby interrupting the energizing circuit to the solenoid 210 so that the locating fork 181 is moved into engagement with the web associated with the carrier 85–11. The momentum of the magazine will overtravel the carrier 85–11 past the ready station 86 and the arm 184 will be moved out of the vertical position by reason of its being coupled to the magazine by the operation of the fork 181. However, at this time, the coil of the relay 775 is deenergized so that its associated contact 775A, in line 15, is moved to its normally closed position, thereby completing the circuit to the transformer 813. With the circuit completed to the transformer 813, the transformer operates to energize the transducer 253 which, at this time, has its associated plunger 254 displaced from the central neutral position that it normally occupies. The transducer 253 thereupon operates to provide a "reverse" phase signal to the phase sensitive amplifier 814, which is 180° phase displaced from the reference voltage obtained from the lines 16 and 17 to the transformer 813, as previously mentioned. The phase sensitive amplifier 814 thereupon operates to effect the "reverse" operation of the magazine motor 170 for rotating the magazine 70 in the required direction so as to finally position the selected carrier 85–11 in the ready station 86. When the carrier is located in the ready station, the plunger of the transducer will be returned to its central neutral position so that signal voltage from the transducer will equal the reference signal voltage from the line 24 and a null input voltage to the phase sensitive amplifier 814 is obtained, to stop the operation of the motor 170. The selected carrier 85–11 is now located at the ready station 86 and presents the tool 65C which is the tool required in the next machining operation.

Referring to the chart of FIG. 22, the next step in the cycle of operation in the tool change mechanism is indicated by the radial marker M18 of ring "C," which indicates that the transfer clasp 306, which is presently located at the "upper level" and "standby" positions, is to be moved to "upper level" position and into "alignment" position where it will engage the tool 65C presented by the carrier 85–11. Since the transfer clasp 306 is already in the "upper level" position, it is only necessary to effect the movement of the slide 307 from the "standby" position to the "alignment" position. To initiate this step in the cycle of operation, a circuit is completed from the previously energized line 837, which is connected to line 114, shown in FIG. 25A. Current will flow through the now closed contacts 774D and 775E to energize a line 846, which is shown leading to a portion of the junction box 710. The energized line 846 emerges from a portion of the junction box 710, shown in the lower lefthand portion of the drawing of FIG. 25, and is connected to the contact 574E of the stepping switch 574. Since the wiper arm 712 of the stepping switch 574 has been previously moved into engagement with the contact 574E, a circuit is completed from the contact through the wiper arm to the verical line 716 for effecting the energization of the coil of the relay 720, in line 79 of FIG. 25A. The relay 720 operates to effect the advancement of the wiper arm 712 of the stepping switch 574, as previously described, so that the wiper arm is moved into engagement with the contact 574F of the stepping switch. This action, of course, interrupts the circuit to the coil of the relay 720, which becomes deenergized, and the spring 722 associated with the lever 721 operates to pivot the lever 721 in a counterclockwise direction for effecting the advancement of the wiper arm 725 of the stepping switch 575, as previously described. Thus, the wiper arm 725 is moved out of engagement with the contact 575E and into engagement with the contact 575F. With the wiper arm 725 in engagement with the contact 575F, a circuit is completed from the energized line 561 along line 59, FIG. 25, through the wiper arm 725, the contact 575F and thence through the connected line 73 to line 68, that is connected to the vertical line 793. At this time, the relay 707 is energized so that its contacts 707A, 707B and 707C are moved into the position, shown in FIG. 25. With the contact 707B, in line 69 of FIG. 25, in closed position, current flows from the line 793 along line 69, through the closed contact 707B to the vertical line 794 and thence through the now closed contact 708A to the vertical line 729. The current path continues from the vertical line 729 through the closed contact 708B, in line 62, along line 59, through the now closed contact 731A, to line 57 and through the relay coil of the energized line 507, energizing the motor right relay 732.

With the coil of the relay 732 energized, the relay will operate to move its normally open contacts 732B, 732D and 732E in lines 76, 81 and 83, respectively, in FIG. 25A, to closed position and will also move its normally closed contact 732C in line 78 to open position. This will complete circuits for energizing the motor 309, as well as the brake mechanism associated with the motor, and the motor will operate to effect the movement of the slide 307 in a rightward direction to move the transfer clasp 306 into the "alignment" position. As the slide 307 moves rightwardly, the "standby" limit switch 318 is released and moves to a closed position to complete a circuit along line 54 of FIG. 25, for energizing the solenoid 705 for subsequent operation.

With the transfer clasp 306 in the "alignment" position, shown in FIG. 16, the limit switch 319 is actuated and its associated contact is moved to an open position, thereby interrupting a circuit along line 55 of FIG. 25, so that the coil of the relay 707 is deenergized. Thereupon, the relay 707 operates to move its contacts 707A and 707B to open positions, while its contact 707C is moved to its normally closed position. This action operates to effect the deenergization of the motor right relay 732 and it operates to move its associated contacts, in FIG. 25A, to their normal positions, thereby effecting deenergization of the motor 309 and the associated brake mechanism. Thus, the function of moving the transfer clasp 306 to "alignment" position, as indicated by the radial marker M18 of the chart of FIG. 22, is accomplished.

As indicated by the radial marker M19 of ring "B" in the chart of FIG. 22, the next step in the tool change function is that the transfer clasp claw 326 is to be advanced to couple the tool 65C to the transfer clasp 306. The function of advancing the claw 326 is initiated from a circuit completed from the vertical energized line 793, shown in FIG. 25, and current flows from it through the now closed contact 707C, in line 71, to the line 795, which is shown as leading to the junction box 710. Within the junction box 710, the line 795 is connected to a line 795A which emerges from the portion of the junction box, shown in the lower lefthand corner of the drawing of FIG. 25A and which is connected to the contact 578D of the stepping switch 578.

As previously described, the wiper arm 739 of the stepping switch 578 is now in engagement with a contact 578D so that a circuit is established from the contact through the wiper arm to energize the coil of the solenoid 745 to effect its operation, as previously described. Thereupon, the wiper arm is advanced in a clockwise direction to engage the contact 578E of the stepping switch. This interrupts the circuit to the coil of the relay 745 and it becomes deenergized so that the lever 746 is moved in a counterclockwise direction, thereby moving the wiper arm 751 of the stepping switch 579 in a clockwise direction and into engagement with the contact 579E thereof. When the wiper arm 751 is moved out of engagement with the contact 579D of the stepping switch 579 and into engagement with the contact 579E, the circuit that had been completed from the contact 579D along line 123 is interrupted so that the coil of the relay 753 is deenergized. With the coil of the relay 753 deenergized, it operates to move its contact 753A in line 128 to its normal open position thereby deenergizing the solenoid 330. The deenergized solenoid 330 operates to effect the release of the plunger 327, shown in FIG. 7, so that the spring 338 advances the claw 326 into engagement with the tool 65C.

With the wiper arm 751 of the stepping switch 579 in engagement with the contact 579E, a circuit is completed from the contact 579E along a line 783 that is connected to the contact 579E, to the horizontal line 122, and thence along the line to the coil of the relay 787 to energize the relay. With the relay 787 energized, it operates to move its associated contact 787A, in line 35 of FIG. 25, to a closed position to complete a circuit to energize the solenoid 168. As previously mentioned, the solenoid 168 upon being energized operates to effect a retraction of the carrier claw that is located in the ready station 86, and in this particular instance, will effect the retraction of the claw associated with the carrier 85–11. With the transfer clasp claw advanced and the carrier claw retracted, the tool 65C is secured to the transfer clasp for a subsequent withdrawal from the carrier 85–11. With the magazine carrier claw retracted, the step in the tool change cycle, as indicated by the radial marker M20 of ring "B" in the chart of FIG. 22, has been accomplished.

The next step in the tool change cycle of operation, as indicated by the radial marker M21 of ring "A," is that the transfer clasp 306 must be moved from "upper level" position to "lower level" position while still being maintained in a position of "alignment." The line 122, in addition to being connected to the coil of the relay 787, is also connected to the contact 579C of the stepping switch 579 which, in turn, has connected to it a line 788. The line 788, in FIG. 25A, leads to the junction box 710 and is connected within the junction box to a line 847, shown at the middle of the righthand portion of the drawing of FIG. 25A, as emerging from the junction box 710. The energized line 847 is connected to one terminal of the limit switch 361. At this time, the limit switch 361 is deactuated and its associated contact is in engagement with the terminal 816. Thus, a circuit is completed from the energized line 847 through the contact of the deactuated limit switch 361, along line 98 and through the coil of the relay 822, and thence along the line 95 to the energized line 507. Energization of the coil of the relay 822 effects the operation of the relay and it actuates its associated contacts 822A to 822D, inclusive, to closed positions. The actuated contacts 822A to 822D, inclusive, completes circuits for effecting energization of the brake mechanism associated with the motor 360 to release the brake and also to energize the motor to effect its operation in a direction to move the carriage 353 downwardly to position the clasp 306 in the "lower level" position, as indicated by the radial marker M21 of ring "A" in the chart of FIG. 22. As the transfer clasp 306 moves to the "lower level" position, it will withdraw the tool 65C from the carrier 85–11.

As the carriage 353 moved downwardly to effect the positioning of the transfer clasp in "lower level" position, the limit switch 366 is released and is conditioned for subsequent operation. With the carriage 353 moved to position the transfer clasp 306 in the "lower level" position, the limit switch 361 is actuated to interrupt the circuit from the energized line 847 to the coil of the relay 822. This action deenergizes the coil of the relay 822 and the relay operates to move its associated contacts to the normal position thereby interrupting the circuit to both the motor 360 and the associated brake mechanism so that the operation of the motor is immediately stopped. With the carrier 353 in its lowermost position, the limit switch 361, as previously mentioned, is actuated so that a circuit is completed for energizing a line 848, which is shown as entering the portion of the junction box 710 that appears on line 101, for subsequent utilization.

Referring again to the chart of FIG. 22, the next function to be accomplished in a tool change cycle of operation is indicated by the radial marker M22 of ring "G." As there indicated, the magazine 70 is to be indexed to locate the only other empty tool carrier at the ready station 86. At this time the only other empty magazine carrier is the carrier 85–5, from which the tool 65B, presently in possession of the spindle 62, had been removed. To effect the movement of the magazine 70 for locating the only other empty carrier 85–5 into the ready station 86, a circuit is initiated from the energized line 848 that is connected to the contact 576C of the stepping switch 576. From a previous movement, the wiper arm 768 of the stepping switch has been positioned in engagement with the contact 576C so that a circuit is now completed and current flows from the energized contact 576C through the wiper arm 768 and thence through the coil of the relay 769 in line 97. The energized relay 769 operates to effect the incremental clockwise movement of the wiper arm 768 moving the wiper arm out of engagement with the contact 576C and into engagement with the contact 576D of the stepping switch. This movement of the wiper arm 768 interrupts the circuit to the coil of the relay 769 and the relay coil becomes deenergized. This action effects the clockwise movement of the wiper arm 770 of the stepping switch 577 so that the wiper arm is moved out of engagement with the contact 577C of the stepping switch and into engagement with the contact 577D. With the wiper arm 770 in engagement with the contact 577D, a circuit is completed from the energized line 561 along line 114 to the wiper arm 770. From the wiper arm 770, the current path continues through the contact 577D and a connected line 849 to line 100. The current continues along line 100, a vertical line 851 and line 107, through the coil of a relay 852 and continues along line 107 to the energized line 507 to complete the circuit for energizing the coil of the relay 852. The energized relay 852 operates to move its associated contact 852A in line 100 to a closed position thereby completing a circuit from line 100 to line 103 for energizing the coil of the relay 807. With the coil of the relay 807 energized, its associated contact 807A, in line 7, is moved to a closed position to complete a circuit for energizing the coil of the latching relay 808.

The relay 808 will operate to move its contact 808A, in line 13, to an open position which interrupts the circuit from the memory switches so that the selector switches of the sensing head 285 and the memory switches are rendered inoperative for initiating the operation of the magazine motor 170. Simultaneously therewith, the relay 808 also operates to move its normally open contact 808B, in line 21, to closed position, thereby completing a circuit from the energized line 561, along line 30, through the normally closed time-to-open contact 808C, along the vertical line 853, through the now closed contact 808B, along line 14, to line 13 via the connecting vertical line 811, to energize the coil of the relay 810, in line 13. With the coil of the relay 810 energized, its associated normally open contact 810A, in line 124 of FIG. 25A, is moved to a closed position completing a circuit for energizing the solenoid 210, as previously described. Energization of the solenoid 210 operates to effect the withdrawal of the locating fork 181, shown in FIG. 3, so that the arm 184 is uncoupled from the magazine 70. Also, a circuit is established to energize the coil of the relay 775, in line 14 of FIG. 25. This action energizes the magazine motor 170 and the motor operates to rotate the magazine 70 for effecting the positioning of the only other empty carrier at the ready station 86. As previously described, the magazine 70 will continue to rotate until the carrier 85–5 is at the ready station 86. At this time, the limit switch 389 is actuated to interrupt the circuit to both the coil of the relay 810 and the coil of the relay 775. With the coil of the relay 810 deenergized the solenoid 210 will also be deenergized, so that the locating fork 181 is immediately moved leftwardly, as viewed in FIG. 3, to engage the web that is associated with the carrier 85–5 thereby coupling the arm 184 to the magazine 70. With the arm 184 coupled to the magazine 70, the momentum of the magazine will overtravel and displace the arm from the vertical position, as previously described, which in turn, effects the operation of the transducer 253 so that the motor 170 is operated to return the magazine 70 for locating the only other empty carrier 85–5 to the ready station 86. Referring to the chart of FIG. 22, it will be seen that the function indicated by the radial marker M22 of the ring "G" has been accomplished.

The next step in the tool change cycle of operation is to move the transfer clasp 306 to the "idle" position, as indicated by the radial marker M23 of ring "C." The transfer clasp 306 has been previously moved to the "lower level" position, as indicated by the radial marker M21 of ring "A." Therefore, it is only necessary to effect the movement of the slide 307 to accomplish the positioning of the transfer clasp 306 into the "idle" position. Movement of the transfer clasp 306 to the "idle" position is initiated by means of a circuit that is completed along the line 108 of FIG. 25A, which is connected to the energized line 851 previously described. Current flows along line 108, through the now closed contacts 774B and 775C, to a vertical line 856, shown entering the junction box 710. The energized line 856 emerges from the junction box 710, shown in the lower lefthand corner of the drawing of FIG. 25, and is connected to the contact 574F of the stepping switch 574. Since the wiper arm 712 of the stepping switch 574 has been previously positioned in engagement with the contact 574F, current will be directed to energize the coil of the relay 720. As previously described, the energized relay 220 operates to effect the clockwise movement of the wiper arm 712 so that it is moved out of engagement with the contact 547F and into engagement with the contact 574G. This action will cause the coil of the relay 720 to be deenergized, which results in the incremental clockwise movement of the wiper arm 725 of the stepping switch 575. The wiper arm 725 is therefore moved out of engagement with the contact 575F and into engagement with the contact 575G of the stepping switch. With the wiper arm 725 in engagement with the contact 575G, a circuit is completed and current flows through the wiper arm 725, the contact 575G, and thence along line 64 of FIG. 25, to the vertical line 759. The current continues from the vertical line 759, along line 63, through the now closed contact 706A of the energized relay 706. The coil of the relay 706 is presently energized because the slide 307 is in the "alignment" position, therefore the limit switch 317, shown in FIG. 25, is deactuated and its contact is closed, establishing a circuit along line 53 for energizing the coil of the relay 706. The current continues through the contact 706A, along line 63, through the normally closed contact 732A of deenergized relay 732, along line 58, and thence to the coil of the relay 731, appearing in line 52, with the circuit being completed along line 52 to the energized line 507. With the coil of the relay 731 energized it immediately operates to move its normally closed contact 731A in line 59 to open position, thereby effectively preventing the energization of the coil of the relay 732. The relay 731 also operates to move its associated contacts 731B, 731D and 731E, shown in lines 76, 80 and 83, respectively, in FIG. 25A, to closed position, and simultaneously therewith, moves its associated normally closed contact 731C, in line 78, to open position. This completes circuits to the brake mechanism associated with the motor 309 and to the motor 309. The motor 309 will now operate to move the slide 307 away from the column or leftwardly, as viewed in FIG. 19. As the slide 307 moves away from the column, the limit switch 319 is deactuated so that its associated contact is moved to closed position, in line 55 of FIG. 25. A circuit for energizing the coil of the relay 707 is completed and the energized relay operates to actuate associated contacts for subsequent operation. When the transfer clasp 306 is positioned in the "idle" position, the limit switch 317 will be actuated so that its associated contact is moved to open position to interrupt the circuit along line 53 of FIG. 25, to effect deenergization of the coil of the relay 706. The deenergized relay 706 operates to move its associated contact 706A, in line 63, and its contact 706B, in line 65, to open position, and simultaneously therewith, move its associated contact 706C, in line 73, to a closed position. With the contact 706A in open position, the relay 731 is deenergized and its associated contacts 731B, 731C, 731D and 731E, in FIG. 25A, are moved to their normal positions, shown in FIG. 25. This effects the deenergization of the motor 309 and of the brake mechanism associated therewith so that the motor is immediately stopped and the transfer clasp 306 is located in the "idle" position.

From the chart of FIG. 22, the broken radial line that extends from the common axis "O" outwardly indicates that with the completion of the action, as indicated by the radial marker M23, the steps in the cycle of operation which are accomplished during a work operation have all been completed and that the subsequent steps to be executed are related to a second tool change that is a part of a complete tool change cycle of operation. In the chart of FIG. 22, the radial marker M24 of ring "G," indicates that the spindle 62 is to be moved to "upper level" and "alignment" positions. When this function is accomplished, the carrier 85-5, which is now located at the ready station 86, will be restocked with the tool 65B from the spindle 62.

It will be recalled that the movement of the saddle 49 and spindle head 60, for effecting the desired positioning movement of the spindle 62 into required tool change positions, are all functions of the automatic routine sources represented by the boxes 601 to 604, inclusive, in FIG. 24. It will also be recalled that the spindle 62, with the tool 65B therein, is presently located at a work station and is performing a work operation. Assuming now that the work operation has been completed and it is now desired to effect the second tool change, such action will be initiated by a signal from the tape which will effect the closing of an automatic contact 857, in line 36 of FIG. 25. With the automatic contact 857 in closed position, a circuit is established from the energized line 561 along line 36, through the coil of a relay 858 with the circuit being completed along line 36, through the now closed contact 775F and thence to the energized line 507 to energize the coil of the relay 858. With the coil of the relay 858 energized, the relay operates to move its associated normally open contact 858A, in line 47 of FIG. 25, to a closed position. It will be recalled that the contact 706C, in line 73 of FIG. 25, was previously moved to closed position, so that a circuit from the energized line 759, along line 73 and through the now closed contact 706C is completed to energize a line 760 shown as entering a portion of the junction box 710. Within the junction box 710, the energized line 760 is connected to a line 859, which emerges from a portion of the junction box 710 that appears on line 49 of FIG. 25. Line 859 is therefore energized, and since the contact 858A is in a closed position, the contact 567E of the stepping switch 567 is energized. At this time, the wiper arm 581 of the switch is positioned in engagement with the contact 567E so that a circuit is completed through the wiper arm 581 to energize the coil of the relay 562. With the relay 562 energized it operates, as previously described, to move the wiper arm 581 out of engagement with the contact 567E and into engagement with the contact 567F. This action, of course, effects deenergization of the coil of the relay 562 so that the spring 594 operates the lever 585 to effect the clockwise advancement of the wiper arm 580 associated with the stepping switch 586. The wiper arm 580 is now moved out of engagement with the contact 586E and into engagement with the contact 586F of the stepping switch. A circuit is completed from the contact 586F to a line 861 and thence along a vertical line 862 to line 39. Current flows along line 39, through the coil of the relay 780, to line 37 and thence to the energized line 507. The energized relay 780 operates to move its associated contacts 780A and 780B to closed positions, thereby energizing the coils of the relays 695 and 697, respectively. With the coils of the relays 695 and 697 energized, they operate to effect the movement of their associated contacts 695A and 697A, in line 51 of FIG. 24, to open positions thereby interrupting the operation of the tape reader 376. Also, when the relay 697 operates, its associated contact 697B, in line 28 of FIG. 24, is moved to closed position, thereby completing a circuit from the energized line 537 along line 28 and through the now closed contact 697B and the normally closed contact 673 of the manual switch 635 to the automatic routine source of signals 604. Current from line 28 also flows along the vertical line 762 and line 32, through the now closed contacts 695C and 863 to the automatic Z axis routine source of signals 602 for energizing this source. At this time, both the automatic routine sources 603 and 601 are disconnected from the energizing line 537 so no signal outputs from these sources can be transmitted therefrom. It will be recalled that the spindle head 60 had been moved rearwardly a distance sufficient to retract the tool 65B from engagement with the workpiece and this action was effected by means of signals obtained from tape when the components were under tape control. Therefore, when the automatic routine source of signal 602 is energized, it operates to transmit a signal input to the signal comparator 520–59 for effecting the movement of the spindle head 60 to locate the spindle 62 in the "alignment" position and the tool 65B is positioned directly underneath the carrier 85–5 located in the ready station 86. Simultaneously, a signal from the automatic routine source 604 is transmitted to the signal comparator 520–52 to effect the upward movement of the saddle 49 for positioning the spindle in the "upper level" position. As the motors 52 and 59 are operated to effect the desired positioning of the spindle 62, the tachometers 611 and 606 are also operated to produce a voltage which is utilized to energize the coil of the relay 610. As previously mentioned, the energization of the coil of the relay 610 will cause the relay to operate so as to move its associated contacts 610A to 610D, in FIG. 25, to open position to insure that no other component movement will occur.

When the spindle has been located in the "upper level" and "alignment" positions by the movement of the saddle 49 and the spindle head 60, the feedback information from the sensing head 524 associated with the spindle head 60 to the signal comparator 520–59 will correspond to the signal input from the automatic routine source 602 and a null signal will be obtained to stop the operation of the motor 59. In like manner, the feedback information from the sensing head 542 associated with the saddle 49 is transmitted to the signal comparator 520–52 and will correspond to the signal input from the automatic routine source 604 to produce a null signal to stop the operation of the motor 52. When the motor 52 and the motor 59 stop operating, the tachometers 611 and 606 will cease to be driven and therefore will not produce a voltage so that the coil of the relay 610 becomes deenergized. As this occurs, the contacts 610A to 610D, in FIG. 25, return to their normal positions. At this time, the wiper arm 580 of the stepping switch 586 is positioned in engagement with the contact 586F of the stepping switch, and the line 861 is energized, as previously described. The energized line 861 is connected with the vertical line 778 which, in turn, is connected to the contact 586D of the stepping switch 586. As shown in FIG. 25, the line 46 is also connected to the contact 586D. Therefore, with the contact 610C in line 46 in its normally closed position, a circuit is completed from the contact 586F along line 861 and the vertical line 778 to the contact 586D. The circuit path continues from the contact 586D along line 46, through the now closed contacts 691B and 610C to the line 786 which leads to the junction box 710. Within the junction box the energized line 786 is electrically connected to a line 864 which emerges from a portion of the junction box 710, shown in the lower lefthand corner of the drawings of FIG. 25A, and is connected to the contact 578E of the stepping switch 578. From a previous operation, the wiper arm 739 is in engagement with the contact 578E. Therefore, a circuit is completed from the contact 578E through the wiper arm 739 for energizing the coil of the relay 745. As previously described, the energized relay will operate to effect the advancement of the wiper arm 739 into engagement with the contact 578F, and in doing so, will interrupt the circuit which energizes the coil of the relay 745. Deenergization of the coil of the relay 745 will allow the lever arm 746 to be operated in a counterclockwise direction for advancing the wiper arm 751 into engagement with the contact 579F of the stepping switch 579. This will interrupt the circuit from the contact 579E to line 122 so that the relay 787 is deenergized and operates to move its contact 787A in line 35 of FIG. 25, to an open position which, in turn, effects the deenergization of the solenoid 168. As previously described, with the solenoid 168 deenergized, the claw associated with the carrier located in the ready station will be moved into engagement with a tool that has been placed therein. In this particular instance, the claw associated with the carrier 85–5 is moved to engage with the tool 65B which has been returned to the carrier 85–5 by the positioning movement of the spindle to "upper level" and "alignment" positions. This function is indicated by the radial marker M25 of ring "F."

In referring to the chart of FIG. 22, the next function or step in the cycle of tool change is indicated by the radial marker M26 of ring "E," as there indicated, the spindle collet 401 is to be released. The spindle collet 401 is released by operating the valve 430 to supply fluid pressure to the right end of the cylinder 403. Such operation of the valve 430 is effected by deenergizing the solenoid 441 and energizing the solenoid 434 associated with the valve. This is initiated through a circuit which is completed through the wiper arm 751 of the stepping switch 579 and which is presently in engagement with the energized contact 579F. The current flows from the contact 579F along lines 118 and 121 in FIG. 25A, through the coil of the relay 755 to the energized line 507 to complete a circuit for energizing the coil of the relay 755. With the coil of the relay 755 energized, it will operate to move its normally open contact 755B in line 126 to closed position, and simultaneously therewith, move its normally closed contact 755A in line 127 to open position. With the contact 755A moved to open position, it operates to deenergize the solenoid 441. On the other hand, when the contact 755B is moved to closed position it operates to complete a circuit for energizing the solenoid 434 for actuating the valve 430 so that it directs fluid pressure to the right end of the cylinder 403 for effecting the release of the collet 401.

Again referring to the chart of FIG. 22, the next step in the cycle of tool change operation is that the spindle 62 is to remain at the "upper level" position but is to be moved to the "retracted" position, as indicated by the radial marker M27 of ring "D." Such action is initiated by means of a circuit completed from the horizontal energized line 121 in FIG. 25A to energize a vertical line 757 which is shown entering the portion of the junction box 710 which appears at the lower mid portion of the drawing of FIG. 25A. The energized line 757 is connected to another line 866 within the junction box and this line emerges from the portion of the junction box 710 which appears on line 49 of FIG. 25. The energized line 866 is connected to the contact 567F of the stepping switch 567, and since the wiper arm 581 is in engagement with the contact 567F, a circuit is completed to energize the coil of the relay 562. The relay 562 will operate to effect the clockwise advancement of the stepping switch 581 out of engagement with the contact 567F and into engagement with the contact 567G. As this occurs, the circuit for energizing the coil of the relay is interrupted, which results in the incremental advancement of the wiper arm 580 of the stepping switch 86, so that it is advanced out of engagement with the contact 586F and into engagement with the contact 586G. As the wiper arm 580 moves out of engagement with the contact 586F of the stepping switch, the circuit through which the coil of the relay 780 is energized, in line 39, is interrupted and the relay operates to move its associated contacts 780A and 780B to open position thereby interrupting the circuits to the coils of the relays 695 and 697. The relays 695 and 697 now operate to disconnect the automatic routine signal sources 602 and 604 from the energized line 537 and also, the contacts 695A and 697A are returned to their normally closed positions, in line 51 of FIG. 24. However at this time, the normally closed time-to-close contact 562A and the contact 790A are open to maintain the tape reader 376 deactivated.

With the wiper arm 580 of the stepping switch 586 positioned in engagement with the contact 586G thereof, a circuit is completed to the contact and thence to the vertical line 761. Current will flow along the vertical line 761 and horizontal line 38 through the coil of the relay 697 and thence to the energized line 507. With the relay 697 energized, it will operate to move its associated contact 697B in line 28 of FIG. 24 to closed position to complete a circuit from the energized line 537 to a vertical line 762. From the vertical line 762, current will flow along line 34 through the normally closed contact 695D to line 36 and thence to the automatic routine signal source 601 to energize it. The energized automatic routine signal source 601 operates to transmit a signal to the signal comparator 520–59 for effecting the movement of the spindle head 60 to a position wherein the spindle 62 is located in the "retracted" position, as previously described. Thus, with the collet 401 of the spindle 62 released, as the spindle is moved to a "retracted" position, the tool 65B will remain in the possession of the carrier 85–5.

Referring to the chart of FIG. 22, the next step in the cycle of tool change operation is indicated by the radial marker M28 of ring "G," wherein it is indicated that the magazine 70 is to be indexed to select a carrier for location at the ready station 86. In this step of the operation it will be assumed that the next desired carrier to be located at the ready station 86 will be the carrier 85–9 in which the tool 65D is carried. The identification number of the next desired carrier, which is assumed to be the carrier 85–9, is impressed upon the switches of the first memory by a signal from tape. This signal was obtained from the tape 378 at the time that the function of moving the spindle to the work station, as indicated by the radial marker M10 of ring "D," was initiated. Therefore, assuming that the next desired carrier to be located at the ready station is to be the carrier 85–9, the first memory automatic contacts 665 and 666, and the automatic contacts 671 and 672 will have been actuated to indicate the binary number 01001. The indexing of the magazine 70 for selecting and positioning a desired carrier at the ready station 86 is initiated through a circuit completed from the energized wiper arm 580 of stepping switch 586 which is positioned in engagement with the contact 586G of the stepping switch. Therefore, current will flow from the contact 586G to line 41 and thence to the vertical line 761. From the vertical line 761, current will flow along line 44, through the now closed contacts 691C and 610B, to a connected vertical line 766 to energize this line. The current will also flow along line 44 and through the coil of the relay 767 for energizing the coil to effect the operation of the relay so that it will operate and move its contact 767A in line 112 of FIG. 25A to a closed position to condition line 112 for subsequent energization. The now energized line 766, in FIG. 25, is shown leading to the junction box 710 and leaves the junction box 710, as shown in FIG. 25A, to connect with the contact 576D of the stepping switch 576. A previously described operation of the stepping switch 576 has advanced the wiper arm 768 thereof into engagement with the contact 576D. Therefore, a circuit is now completed from the contact 576D to energize the coil of the relay 769. Thereupon, the relay 769 operates to effect the clockwise movement of the wiper arm 768 out of engagement with the contact 576D and into engagement with the contact 576E thereof. This action interrupts the circuit to the coil of the relay 769 to effect its deenergization resulting in the incremental clockwise advancement of the wiper arm 770 of the stepping switch 577 so that the arm is moved into engagement with the contact 577E of the stepping switch. Thus, the circuit that had been established through the contact 577D of the stepping switch 577 is interrupted so that the coil of the relay 852 is now deenergized. The relay 852 now operates to move its associated contact 852A, in line 100, to open position. Upon this occurrence, the relay 807 is deenergized and operates to move its associated contact 807A, in line 7, to open position, thereby interrupting the circuit to the coil of the relay 808. This conditions the relay 808 so that its associated contacts will be returned to their normal positions upon the energization of the latching relay 809.

With the wiper arm 770 of the stepping switch 577 positioned in engagement with the contact 577E, a circuit is completed to the contact 577E. Current from the contact 577E flows along line 109 to the vertical line 773 and thence along line 111 for energizing the coil of the relay 782. The energized relay 782 operates to move its contact 782A, in line 109, to a closed position. With the contact 782A in closed position, a circuit is completed along line 109 to line 110 for energizing the coil of the relay 839 and the relay operates to move its associated contact 839A, in line 6, to a closed position. This completes a circuit to energize the coil of the unlatching relay 809 to effect its operation for releasing the contacts associated with the now deenergized latching relay 808 so that the contacts return to their normal positions, as shown in FIG. 25. With the contacts of the relay 808 returned to their normal positions, the contact 808A, in line 13, is in its normally closed position, thereby reconnecting the selector switches and the memory switches into the control system so that the next desired carrier, as indicated by the switches of the first memory, may be selected and located at the ready station 86.

Upon completion of a work operation, a signal from the tape indicated such completion and also effected movement of the spindle head 60 to withdraw the tool from the workpiece (not shown). At this time, a signal from tape also actuated the automatic contacts 665 to 674, inclusive, FIG. 25, of the first memory, to indicate the next desired carrier to be located at the ready station. The next carrier which is desired to be located at the ready station 86 is assumed to be the carrier 85–9, which is represented in the electrical system by the binary number 01001. Thus, the contacts 665 and 666, which as a unit represent the first or least significant digit of the binary number, are actuated by a signal from tape to indicate that the numeral "1" is the first digit of the binary number. The contacts 667 and 668, which together represent the second digit of the binary number and are not actuated, therefore, will represent that "0" is the second digit of the binary number. Likewise, the contacts 669 and 670, which together as a unit represent the third digit of the binary number, are not actuated to indicate that "0" is the third digit of the binary number. On the other hand, the contacts 671 and 672, which together represent the fourth digit of the binary number, are actuated to indicate that the numeral "1" is the fourth digit of the binary number. Finally, the contacts 673 and 674, which together represent the fifth digit or the most significant digit of the binary number, are not actuated and remain in the position that they occupy, as shown in lines 28 and 29 of FIG. 25, to indicate that "0" is the fifth digit of the binary number.

It will be recalled that when the transfer clasp 306 was moved from the "upper level" position to the "lower level"

position, as indicated by the radical marker M21 of ring "A" in the chart of FIG. 22, a circuit was completed for energizing the coil of an unlatching relay 869, shown in line 8 of FIG. 25. This circuit was completed when the carriage 353 was moved to its lowermost position, in FIG. 2, thereby actuating the limit switch 361. With the limit switch 361 actuated, a circuit is completed from the energized line 847, which is shown as emerging from the junction box 710 that appears on line 101 of FIG. 25A, to energize the line 848 which leads to the junction box 710. Within the junction box 710, the energized line 848 is connected to a branch line 848A, which is shown as emerging from the junction box 710 at line 10 of FIG. 25, and is connected to line 8 to energize the coil of the relay 869. The relay operates to effect a release of the latched contacts 825A to 825T, inclusive, associated with the now deenergized memory selecting relay 825. With the contacts 825A to 825T, inclusive, returned to their normal positions, as shown in FIG. 25, they operate to connect the selector switches 286 to 290, inclusive, to the automatic switches of the first memory, which are being utilized at this time to indicate the desired tool in the electrical control system.

It will be recalled that the magazine 70 had been previously rotated to locate the only other empty carrier 85–5 in the ready station 86. The carrier 85–5 is still in the ready station at the time that the automatic switches 665 to 674, inclusive, are actuated by a signal from tape. Thus, the automatic contacts of the first memory are actuated to indicate the binary number 01001, as described, and the selector switches 286 to 290, inclusive, of the reading head 285 are actuated in the combination to indicate the binary number 00101, which represents the carrier 85–5, and is presently located at the ready station 86. Thus, the switches 286 and 288 will be actuated so that their contacts are in engagement with the terminals 841 and 842, respectively. The limit switches 287, 289 and 290 will be deactuated and their contacts remain in the positions that they occupy, in lines 16, 24 and 28 of FIG. 25. With the selector switch 288 actuated, its associated contact is positioned in engagement with the terminal 842, in line 19. Therefore, as soon as the relay 869 is energized and the contacts 825A to 825T, inclusive, are returned to their normal positions, a circuit is completed from the energized line 561 and current will flow along line 20, through the contact of the switch 288, to line 19. The current continues along line 19 through the now closed contact 825J to line 20 and through the normally closed contact 669 to the vertical line 840. A second circuit is also completed through the contact of the deactuated selector switch 289, along line 25, through the closed contact 825P and the now closed automatic contact 672, to line 840. Since the contact 808A is now in its normally closed position, the current from the vertical line 840 will flow through the contact, along line 13, to the coil of the relay 810, to energize the coil. With the coil of the relay 810 energized, the relay 810 operates to move its associated contact 810A, in line 12 of FIG. 25A, to closed position thereby completing the circuit for energizing the solenoid 210. With the solenoid 210 energized it immediately operates, as previously described, to effect the retraction of the location fork 181, in FIG. 3, to release the magazine 70. Simultaneously, with the energization of the coil of the relay 810, a circuit is also completed from line 13 via the vertical line 811 to line 14 for energizing the coil of the relay 775. The energized relay 775 operates to move its associated contact 775A, in line 15, to open position thereby interrupting the circuit to transformer 813. Thereupon, the phase sensitive amplifier 814 receives only the reference voltage signal from the vertical line 812 and will operate to effect the "forward" operation of the motor 170 for rotating the magazine 70 in a carrier selecting movement. As the various carriers move past the reading head 285, the associated selector switches 286 and 290, inclusive, are actuated for maintaining the coils of the relays 810 and 775 energized. When the coded plungers, associated with the carrier 85–9, are read by the sensing head 285, the switches 286 and 289 will be actuated, while the switches 287, 288 and 290 will remain deactuated. With the switch 286 actuated, it will indicate the numeral "1" as the first digit of the binary number; the deactuated limit switches 287 and 288 will represent "0" as the second and third digits respectively of the binary number; the actuated limit switch 289 will represent the numeral "1" as the fourth digit of the binary number; and, the deactuated limit switch 290 will indicate "0" as the fifth digit of the binary number. Therefore, when the coded plungers of the selected carrier 85–9 are read by the reading head 285, the associated limit switches 286 to 290, inclusive, of the reading head are actuated in coincidence with the automatic contacts of the first memory to thereby interrupt the circuits along lines 20 and 25, so that the coils of the relays 810 and 775 are deenergized. As this occurs, the relay 810 will operate to move its associated contact 810A, in the line 124, to open position, thereby effecting deenergization of the solenoid 210 to effect a release of the locating fork 181. Thereupon, the spring 194, in FIG. 3, will operate to move the locating fork into engagement with a web associated with the carrier 85–9 to lock the arm 194 to the magazine. Also, the deenergized relay 775 operates to move its associated contact 775A to a closed position, thereby reestablishing the circuit to energize the transformer 813. With the transformer 813 energized, it will operate to energize the transducer 253. At this time, the arm 184 will be displaced from the vertical position by the momentum of the magazine causing the plunger 254 of the transducer 253 to be likewise displaced from its neutral position, as previously described. Upon displacement of the actuating plunger 254 of the transducer 253, the transducer will operate to provide a "reverse" phase signal voltage to the phase sensitive amplifier 814 which is 180° phase displaced from the reference voltage input to the transformer 813. The difference between the reference input voltage and the voltage from the transducer 253 will effect the reverse operation of the motor 170 so that it operates to move the magazine 70 for locating the selected carrier 85–9 in the ready station 86. With the carrier 85–9 positioned in the ready station, the arm 194 will also be returned to its vertical position and the actuating plunger 254 of the transducer 253 will likewise be returned to its central neutral position, whereupon the transducer signal voltage will equal the reference voltage input from the vertical line 812 to null the amplifier input, stopping the operation of the magazine motor 170. It is apparent, therefore, that the step in the tool change cycle, as indicated by the radial marker M28 of ring "G" in the chart of FIG. 22, of indexing the magazine for locating a selected carrier at the ready station is accomplished.

The next step in the cycle of the operation is to move the spindle 62 to "lower level" and "retracted" positions. This step is indicated by the radial marker M29 of ring "D" in the chart of FIG. 22. Since the spindle head 60 has been previously moved rearwardly along the Z axis to effect a retraction of the spindle 62, as indicated by the radial marker M27 of ring "D," it is only necessary that the saddle 49 be moved downwardly along the column 41 so as to position the spindle 62 at the "lower level" position. This movement of the saddle 49 is an automatic routine function and is initiated by a signal obtained from the Y axis automatic routine signal source 603, in FIG. 24. Energization of the Y axis automatic routine signal source 603 is accomplished through a circuit that is established from previously energized vertical line 777, which is shown leading to the portion of the junction box 710 that appears between lines 114 and 115 in FIG. 25A. Within the junction box 710, the energized line 777 is connected to another line 872 which emerges from a portion of the junction box 710 which appears on line 49 of FIG. 25 and is shown as being connected to the contact 567G of the stepping switch 567. Since the wiper arm 581 of the stepping switch 567 is now positioned in engagement with the contact 567G through a previously described operation, a circuit is completed to energize the coil of the relay 562. With the coil of the relay 562 energized, both the stepping switch 567 and the stepping switch 586 associated therewith are actuated to effect advancement of their respective wiper arms. Therefore, the wiper arm 581 associated with the stepping switch 567 is advanced into engagement with the contact 567H, while the wiper arm 580 associated with the stepping switch 586 is advanced into engagement with the contact 586H. With the wiper arm 580 of the stepping switch 586 in engagement with the contact 586H, a circuit is completed and current flows from the contact 586H through line 40 to the vertical line 694 and thence through the coil of the relay 695 to energize the coil. With the relay 695 energized, it will operate, as previously described, to deactivate the tape reader 376. Simultaneously therewith, the energized relay 695 also operates to complete a circuit for energizing the Y axis automatic routine signal source 603, on line 32 of FIG. 24, and it will operate to transmit a signal to the signal comparator 520–52 for effecting the operation of the motor 52 for moving the saddle 49 to the "lower level" position.

As the motor 52 operates, the tachometer 611 will be operated and will produce a voltage which is utilized for energizing the coil of the relay 610 to effect the operation of the relay for moving its contacts 610A to 610D to open position, so that a circuit from the stepping switch 586 cannot be established to operate the other machine components until such time as the saddle 49 is situated in the desired "lower level" position. When the saddle 49 is located in the "lower level" position, the tachometer 611 will stop operating and the coil of the relay 610 will be deenergized so that the associated relay contacts 610A to 610D are returned to their closed positions, in FIG. 25. The spindle 62 is now located at the "lower level" position and in a "retracted" position, and therefore, the function indicated by the radial marker M29 of ring "D" in the chart of FIG. 22 is accomplished.

The next step in the tool change cycle of operation, as indicated by the radial marker M30 of ring "C," is that the transfer clasp 306 already at the "lower level" position is to be moved to the "extended" position. It will be recalled that a previous operation had positioned the transfer clasp 306 into the "lower level" position. Therefore, to satisfy the next step, as indicated by the radial marker M30 of ring "C," the transfer clasp 306 need only be moved from the "idle" position, where it is presently located, to the "extended" position. This function is accomplished through a circuit which is completed by the movement of the contact 610A to its normal closed position, in line 43 of FIG. 25. With the contact 610A in its normal closed position, a circuit is established from the energized vertical line 694, along line 43 and through the now closed contacts 691D and 610A to energize the vertical line 709. The energized vertical line 709 is shown leading to a portion of the junction box 710. Within the junction box, the energized line 709 is connected to another line 874 to energize it. The line 874 emerges from a portion of the junction box, which appears at the lower lefthand corner of the drawing of FIG. 25, and is connected to the contact 574G of the stepping switch 574. A circuit is therefore completed from the contact 574G to the wiper arm 712, which has previously been positioned in engagement with the contact 574G through a prior operation of the stepping switch. Therefore, current flows from the wiper arm 712 through the vertical line 716 to the coil of the relay 720, in line 76 of FIG. 25A, to energize the relay. With the relay 720 energized, the wiper arm 712 of the stepping switch 574 will be advanced in a clockwise direction into engagement with the contact 574H thereof. This will effect deenergization of the coil of the relay 720 and the wiper arm 725 of the stepping switch 575 will advance in a clockwise direction into engagement with the contact 575H. With the wiper arm 725 of the stepping switch 575 in engagement with the contact 575H, a circuit is completed from the energized line 561 through the wiper arm 725 and the current flows through the contact 575H, along line 61, to the vertical line 729. The current continues along the vertical line 729 through the now closed contact 708B and thence via line 59, through the normally closed contact 731A to line 57 and through the coil of the relay 732 to energize the relay. The energized relay 732 will operate to actuate its associaed contacts 732B to 732E in lines 76, 78, 81 and 83, respectively, of FIG. 25A. This will complete a circuit for energizing the motor 309 and its associated brake mechanism, as previously described, and the motor will operate in a direction to move the slide 307 rightwardly towards the column 41. As the slide 307 moves toward the column from the "idle" position, it will release the limit switch 317 so that its associated contact moves to closed position, in line 53 of FIG. 25. This completes a circuit to the coil of the relay 706 to effect the operation of the relay for a subsequent operation. When the slide has moved rightwardly, its full limit of travel to position the transfer clasp 306 in the "extended" position, the limit switch 320 will be actuated and its associated contact will be moved to open position. This will interrupt the circuit along line 56 to effect deenergization of the coil of the relay 708. Thereupon, the relay 708 operates to move its associated contacts 708A and 708B to open position and to move its contact 708C to closed position. With the contact 708B moved to open position, it operates to interrupt the circuit to the coil of the relay 732 to effect deenergization of the coil so that the relay operates to move its associated contacts to their normal positions as shown. This action immediately causes the motor 309 and the brake mechanism associated therewith to be deenergized so that the motor 309 is immediately stopped. The transfer clasp 306 is now positioned in the "lower level" and "extended" positions, which positions are indicated by the radial marker M30 of ring "C" in the chart of FIG. 22. With the transfer clasp 306 moved to the "lower level" position and "extended" position, the tool 65C, carried by the clasp, will be inserted into the spindle 62. The positional relationship of the various components is depicted in FIG. 20.

Referring once again to the chart of FIG. 22, the next step in the tool change cycle of operation is indicated by the radial marker M31 of ring "E" wherein it is indicated that the collet 401 of the spindle 62 must be actuated into a clamped position to lock the tool 65C in the spindle. This action is initiated through a circuit completed from the energized vertical line 729, in FIG. 25. Current flows through the now closed contact 708C, in line 70, to energize the vertical line 738. The energized line 738 is shown as entering a portion of the junction box 710 that appears at the lower righthand of the drawing of FIG. 25. Within the junction box 710, the energized line 738 is connected to energize another line 876, which emerges from a portion of the junction box 710, which appears in the lower lefthand corner of the drawing of FIG. 25A. The energized line 876 is connected to the contact 578F of the stepping switch 578. From a prior operation, the wiper arm 739 of the stepping switch 578 is now positioned in engagement with the contact 578F so that a circuit is completed through the wiper arm for energizing the coil of the relay 745. The relay 745 thereupon operates, as previously described, to effect the advancing movement of the wiper arm 739 into engagement with the contact 578A. This, of course, effects the deenergization of the coil of the relay 745 which, in turn, results in the advancement in a clockwise direction of the wiper arm 751 of the stepping switch 579 so that the wiper arm is moved into engagement with the contact 579A, in FIG. 25A. Upon the movement of the wiper arm 751 out of engagement with the contact 579F of the stepping switch 579, the coil of the relay 755 is deenergized and operates to move its associated contacts 755B and 755A, to their normal positions in lines 126 and 127, respectively, of FIG. 25A. This will effect the operation of the valve 430, so that the valve is actuated to direct fluid pressure to the left end of the cylinder 403 for effecting the clamping operation of the collet 401.

The next sequence in a tool change cycle of operation is indicated by the radial marker M32 of ring "B," which indicates that the transfer clasp claw 326 must be retracted so that the transfer clasp may be moved away from the spindle leaving the tool 65C in possession of the spindle 62. This step in the cycle of operation is initiated through a circuit that is completed from the wiper arm 751 of the stepping switch 579 to the contact 579A. From the contact 579A current will flow along line 119, the vertical line 752, and thence to line 123. The flow of current continues along line 123, through the coil of the relay 753 and thence to the energized line 507 to energize the coil. The relay 753 will operate to move its associated contact 753A, in line 128, to closed position, thereby completing a circuit for energizing the solenoid 330. The energized solenoid 330 operates to effect the retraction of the transfer claw 326. When the claw 326 has been retracted, the condition, as indicated by the radial marker M32 in the chart of FIG. 22, has been accomplished.

The next step in the tool change cycle is to move the transfer clasp 306 to the "lower level" and "standby" positions, as indicated by the radial marker M33. This step in the tool change cycle is initiated through a circuit which is completed from the now energized line 123. In FIG. 25A, line 123 is connected to the contact 579D which also has connected to it a vertical line 827 which leads to the junction box 710. Therefore, with the horizontal line 123 energized, the contact 579D will also be energized so that the line 827 is likewise energized. The now energized line 827 is connected within the junction box 710 to energize another line 877 which emerges from a portion of the junction box 710 which appears at the lower lefthand corner of the drawing of FIG. 25, and is connected to the contact 574H of the stepping switch 574. Since the wiper arm 712 of the stepping switch 574 was previously moved into engagement with the contact 574H, a circuit is completed through the wiper arm to energize the coil of the relay 720. The relay 720 will now operate to effect the advancement of the wiper arm 712 out of engagement with the contact 574H and into engagement with the contact 574A, the position which it occupied at the start of a tool change cycle of operation. This movement operates to interrupt the circuit to the coil of the relay 720 so that the lever 721 is operated to effect the advancement of the wiper arm 725, associated with the stepping switch 575, to advance the wiper arm 725 into engagement with the contact 575A, the position which it occupied at the start of a tool change cycle. With the wiper arm 725 positioned in engagement with the contact 575A of the stepping switch 575, a circuit is completed from the contact and current flows along line 65 through the vertical line 828 and horizontal line 66 to the vertical line 829. Te flow of current continues through the now closed contacts 705A and 706B, the vertical line 759 and thence to line 63. The current continues along line 63 through the closed contacts 706A and 732A, to line 52, via line 58, to energize the coil of the relay 731. With the relay 731 energized, it operates to move its associated contacts 731B, 731D and 731E, in FIG. 25A, to closed positions and also moves a contact 731C to open position. This action, as previously described, will complete the circuit for energizing both the motor 309 and the associated brake mechanism so that the motor 309 operates to effect the leftward movement of the slide 307 for positioning the transfer clasp 306 at the "standby" position. As the slide 307 moves leftwardly, as viewed in FIG. 19, away from the column 41, the limit switch 320 is released and thereby operates to complete the circuit along line 56 of FIG. 25 for energizing the coil of the relay 708 so that the relay is now conditioned for a subsequent tool change cycle of operation. When the slide 307 has been moved leftwardly away from the column 41 to position the clamp 306 in "standby" position, the limit switch 318 will be actuated to open its contact, in line 54 of FIG. 25, to interrupt the circuit to the coil of the relay 705 to effect its deenergization. The relay 705 now operates to move its associated contacts 705A to 705B to open positions and to move its contact 705C to closed position, thereby conditioning the electrical system for the next tool change cycle of operation.

Referring now to the chart in FIG. 22, it will be seen that the function of moving the transfer clasp 306 to the "lower level" position and to "standby" position, as indicated by the radial marker M33, has been completed. It will also be noted that a broken radial line, which extends from the common axis "O" outwardly and which passes through the arcuate space defined by the radial markers M33 and M2 of ring "C," indicates that the second tool change is finished.

The last function in a tool change cycle of operation is to move the spindle 62 to the work station for performing a work operation with the tool that it has received from the transfer clasp 306. This function is indicated by the radial marker M34 of ring "D" in the chart of FIG. 22. Since the moving of the spindle to a work station is considered to be a movement in a working cycle, the movement of the spindle to the work station is accomplished under tape control, as has been previously described. The return of machine component movement to the tape control system is initiated by a circuit which is completed by the movement of the contact 705C, in line 72 of FIG. 25, to closed position, and accomplished by the deenergization of the relay 705. This circuit energizes the line 832, which is shown as leading to a portion of the junction box 710, that appears in the lower right corner of the drawing of FIG. 25. Within the junction box, the energized line 832 is connected to energize another line 879, which emerges from the portion of the junction box that appears on line 49 of FIG. 25, and is connected to the contact 567H of the stepping switch 567. From a prior operation of the stepping switch 567, the wiper 581 thereof is in engagement with the contact 567H so that a circuit is completed through the wiper arm 581 for energizing the coil of the relay 562. The energized relay 562 operates to effect the clockwise movement of the wiper arm 581 out of engagement with the contact 567H and into engagement with the contact 567A, in FIG. 25, the position which it originally occupied at the initiation of a tool change cycle of operation. With the wiper arm 581 now moved out of engagement with the contact 567H, the coil of the relay 562 is deenergized so that the lever 585 operates to effect the advancement of the wiper arm 580 associated with the stepping switch 586 into engagement with the contact 586A of the stepping switch. When the wiper arm 580 moves off of the contact 586H of the stepping switch 586, the circuit previously established for energizing the coil of the relay 695, in line 37, is interrupted. The relay 695 will now operate to move its associated contacts 695A to 695E, inclusive, to their normal positions, as depicted in FIG. 24. With the contacts 695B to 695E, inclusive, returned to their normal positions, the automatic routine sources of signals 601 to 604, inclusive, are deenergized.

Upon the movement of the wiper arm 580 of the stepping switch 586 into engagement with the contact 586A, a circuit is completed to energize the coil of the relay 790, in line 47 of FIG. 25. The relay 790 now operates to move its contact 790B, in line 53 of FIG. 24, to a closed position. Thus, all the contacts in the tape reader control circuit are now closed with the exception of the time-to-close contact 562A. At this time, the coil of the relay 562 is deenergized and the associated contact 562A will close after a time interval. When the contact 562A closes, the tape reader 376 will be reactivated. The tape reader will now operate to transmit control signals to the comparators 520 for effecting the required machine component movements for positioning the spindle 62 at the work station and in performing a work operation. Upon completion of the work operation, signals from tape will effect the withdrawal of the tool from the workpiece (not shown) and also operate the automatic contacts of the second memory to store the identification of the next desired magazine carrier. If the work operation that has just been completed is only one of several work operations to be performed on the same workpiece, signals from the tape will effect the movement of the automatic contact 857, line 36 of FIG. 25, to an open position. The automatic contact 560, line 37, will be moved to closed position and the automatic contact 791, line 41, will be moved to an open position. However, the automatic contact 512, in line 53 of FIG. 24, will be maintained in a closed position. Thus, another tool change cycle of operation would be initiated automatically. On the other hand, had the completed work operation been the final operation on the workpiece (not shown) so that a new workpiece is to be loaded into the work station, the signals obtained from the tape would be such as to effect movement of all the automatic contacts 512, 590, 791 and 857 to open positions. Thus, the next tool change cycle of operation would be initiated by actuating the pushbutton switch 513, as previously described.

It will be noted that upon the completion of a tool change cycle of operation, the wiper arms 768 and 770 of the stepping switches 576 and 577, respectively, have not been returned to the original positions they occupied when the tool change cycle was initiated, as depicted in FIG. 25A. At the completion of the tool change cycle of operation, the wiper arm 768 is positioned in engagement with the contact 576E, while the wiper arm 770 is positioned in engagement with the contact 577E. To compensate for the incomplete 360° positioning of movement of the wiper arm 768, the contacts 576E to 576H, inclusive, of the stepping switch 576 have been respectively connected to the contacts 576A to 576D, inclusive. In like manner, the contacts 577E to 577H, inclusive, of the stepping switch 577, have been respectively connected to the contacts 577A to 577D, inclusive. Thus, the interconnected pairs of contacts of the stepping switches are in effect single contacts. The related contacts of the stepping switch 577 have been connected together in a similar manner. From the foregoing description, it will be readily apparent that in a tool change cycle of operation, the wiper arms 768 and 770 of the stepping switches 576 and 577, respectively, are moved only four incremental steps. Therefore, assuming that the tool change cycle of operation described above is considered as a first cycle of operation, then in the next cycle of operation, the wiper arm 768 will be moved from the contact 576E back into engagement with the contact 576A. In like manner, the wiper arm 770 will be moved from its associated contact 577D back into engagement with the contact 577A.

From the foregoing detailed description, of the illustrative embodiment set forth herein to exemplify the present invention, it will be apparent that there has been provided an improved machine tool incorporating a mechanical tool changer having a tool storage magazine. The operative movements of the tool changer, in cooperation with the normal operative movements of the machine tool, are utilized to effect a tool changing operation. The improved tool change mechanism operates to replace a tool in the spindle or to withdraw a previously used tool from the spindle in alternate cycles of operation, so that a tool change is accomplished in a minimum period of time. It is also apparent, that with the present arrangement of the storage magazine, there is no need to employ special tools embodying coding structures thereon for identifying the tools to be selected for location at a tool change station, but that the carriers themselves, in which tools may be located, can be coded at the time tools are placed therein when setting up the machine for the performance of a particular programmed work operation. It is also apparent that retrofitting of existing machines with the tool change mechanism of the present invention is relatively simple and practical since it utilizes machine motions for effecting a portion of the tool change cycle of operation. A unique electrical control system has also been provided for effectively controlling the operation of the embodied invention.

Although the illustrated embodiment of the invention has been described in considerable detail for the purpose of disclosing a practical operative structure whereby the invention may be practiced advantageously, it is to be understood that the particular apparatus described is intended to be illustrative only, and that the novel characteristics of the invention may be incorporated in the other structural forms without departing from the spirit and scope of the invention as defined in the subjoined claims.

The principals of this invention having now been fully explained in connection with the foregoing description, I hereby claim as my invention:

1. In a machine tool having a tool operator adapted to operably support a tool in a work zone for performing machining operations;
   tool storage means carrying a plurality of tools for utilization by said tool operator;
   means for moving said tool operator from the work zone to said storage means so that the movement of said tool operator inserts the previously used too in said means; and
   tool transfer means operable to extract a new tool from said storage means and insert the new tool into said tool operator for the performance of a succeeding machining operation.

2. In a machine tool having a tool change station and provided with a movable tool operator adapted to operably support a tool in a work zone for performing machining operations;
   tool storage means carrying a plurality of tools for utilization by said tool operator;
   means for moving said tool operator to the tool change station to have the previously used tool removed therefrom and thereafter to move said tool operator to said storage means for securing a new tool for utilization in the next machining operation; and,
   tool transfer means operable in one rectilinear path of travel to grip and remove the previously used tool from the tool operator located at the tool change station, said tool transfer means being further operable in a second rectilinear path of travel to insert the previously used tool into said storage means for storage.

3. In a machine tool having a work station and an intermediate station and provided with a tool operator adapted to operably support a tool in a work station for performing work operations;
   tool storage means carrying a plurality of tools for utilization by said tool operator;
   means for moving said tool operator from the work station to said storage means so that the movement of said tool operator inserts the previously used tool in said storage means, said means being also operable to move said tool operator to the intermediate station for receiving a new tool; and,
   tool transfer means operable in two mutually transverse rectilinear paths of travel to withdraw a new tool from said storage means and to insert the new tool said tool operator for the performance of a succeeding work operation.

4. In a machine tool having a tool receiving station and a machining station and provided with a spindle adapted to operate automatically in a programmed sequence of machining operations using different tools at the machining station;
- a tool storage magazine having a plurality of different tools removably stored therein for utilization in the machining operations;
- means operable at the end of a machining operation to move the spindle from the machining station to said magazine so that the movement of said spindle inserts the previously used tool in said magazine for storage, said means being further operable to move the empty spindle to the tool receiving station;
- a tool transfer member positioned at the tool receiving station and having a new tool previously removed from said magazine, said tool transfer member being responsive to the arrival of the spindle at the tool receiving station to transfer the new tool to said spindle; and,
- means responsive to the completion of the transfer of the new tool into the spindle to move said tool transfer member to a non-interferring position and to move said spindle with the new tool to the machining station for performing a work operation.

5. In a machine tool;
- a frame;
- a tool operator movably supported by the frame and adapted to receive different tools for performing various work operations;
- a tool storage member movably supported by the frame;
- a plurality of tool carriers mounted on said storage member and provided with tools to be used in said tool operator;
- tool transfer means supported by said frame for movement in two distinct rectilinear paths of travel;
- power means connected to move said tool operator, said tool storage member and said tool transfer member in their movements; and,
- control means operably connected to control said power means to regulate the movement of said tool storage member, said tool operator and said tool transfer means to effect a sequence of movements which causes said transfer means to remove a tool from said tool operator and thereafter cause the tool operator to couple to and remove a tool from the storage member and to reposition the tool storage member to present a particular storage position in which the removed tool in custody of said transfer means is inserted by the operation of said transfer means for storage.

6. In a machine tool having a frame;
- a source of power;
- a spindle adapted to operatively carry a cutting tool for performing work operations at a work station, said spindle being connected to be operated by said source of power for performing a work operation and also to be moved between the work station, a tool change station and a tool ready station for tool changing;
- a tool storage member movably supported by the frame and removably carrying a plurality of tools for movement with the storage member to locate the tools individually at the tool ready station, said tool storage member being connected to be operated by said source of power;
- a tool transfer member carried by the frame and connected to be operated by said source of power for removing a previously used tool from the spindle located at the tool change station and thereafter returning the previously used tool to the storage member at the ready station;
- control means responsive to a data program for controlling said source of power to effect a positioning movement of said storage member for locating a particular tool carried by the storage member at the ready station, said control means being also responsive to the data program to control the operation of said source of power for moving said spindle to said tool change station and thereafter effecting the movement of said tool transfer member for removing the tool presented by the spindle at the tool change station, said control means being further operable in response to the removal of a tool from the spindle at the tool change station to regulate said source of power to effect the movement of said spindle from the tool change station into coupled engagement with a tool located in the ready station.

7. In a machine tool having a work station, a tool change station and a ready station;
- a frame;
- a spindle adapted to operatively support a tool for performing work operations mounted on said frame for movement between the work station, the tool change station and the ready station;
- a tool storage means adapted to removably carry a plurality of tools for use in said spindle, said storage means being supported by said frame for moving the tools to the ready station selectively;
- power means connected to operate said storage means for locating a desired tool at the ready station;
- control means operably connected to regulate the operation of said power means so that a desired tool is located at the ready station while the spindle is operating with a different tool at the work station;
- means for moving said spindle to the tool change station, the ready station and the work station sequentially;
- tool transfer means operable to remove the previously used tool from said spindle when said spindle is located at the tool change station; and,
- means for moving said spindle from said tool change station into operative engagement with a tool located at the ready station, said means being also operable to move said spindle with the new tool from said ready station to said work station so that the spindle may perform a work operation with the new tool.

8. In a machine tool having a frame;
- a source of power;
- tool storage means movably carried by the frame and having a tool ready station, said tool storage means removably carrying a plurality of tools with the tools being movable with the tool storage means to locate them individually at the tool ready station;
- selection means connected to regulate the operation of said tool storage means for selectively locating any one of the tools at the tool ready station;
- a working spindle carried by the frame and connected to be operated by said source of power for movement between a work station, a tool change station and said tool ready station;
- a tool transfer member carried by the frame and connected to be operated by said source of power for removing a tool from said spindle located at the tool change station; and,
- control means connected to regulate the operation of said tool spindle for moving it from the work station to the tool change station where the previously used tool is withdrawn from said spindle by the operation of said tool transfer member and thereafter said spindle is moved to the tool ready station into engagement with a new tool stored in said magazine, said control means being further operable to effect the movement of said spindle with the new tool to the work station for performing a work operation.

9. In a machine tool having a ready station, a tool change station and a work station and provided with a tool receiving member;
- a tool storage magazine rotatably mounted in spaced relationship to the tool change station;
- a plurality of carriers in said magazine each having a removable tool, said carriers being disposed to be moved successively to the ready station by the rotation of said magazine;

a plurality of plungers associated with each carrier and adapted to be selectively adjusted in code fashion to identify the individual carriers;

selector means having a plurality of switches disposed to be actuated by the adjusted plungers of said carriers to indicate the presence of a preselected carrier having a desired tool therein at the ready station;

control means connected to control the rotation of said magazine and to be actuated by said selector means to terminate the rotation of said magazine to locate the preselected carrier with its desired tool at the ready station; and, tool transfer means operable to transfer the desired tool from the carrier located at the ready station to the tool receiving member located at the tool change station.

10. In a combination with a machine tool having a rotatable tool carrying spindle;

a storage member provided with a plurality of carriers and having a ready station, said carriers being adapted to individually receive and releasably retain a tool;

a plurality of manually actuatable code indicating plungers associated with each carrier, said code indicating plungers being adjustable in a selected combination to identify the particular associated carrier;

a code responsive selector positioned to be actuated by the selectively preset code indicating plungers of each carrier, said selector being responsive to the code plungers of a desired carrier for effecting the positioning of the desired carrier at the ready station; and, a transfer member operably carried by the machine tool for movement in two distinct paths of rectilinear travel to transfer a tool from a carrier located at the ready station into operative position in the spindle, or to transfer a tool from the spindle to a carrier located at the ready station selectively.

11. In a selection mechanism for selecting a desired tool carrier of a storage magazine having a plurality of carriers;

a selector having a plurality of switches;

means for moving said carriers past said selector; and, a plurality of axially movable plungers associated with each carrier, said plungers associated with each carrier being individually adjustable into an operative position wherein they are operable to actuate associated ones of the switches of said selector, whereby the plungers associated with each carrier may be adjusted in binary code fashion to identify the particular carrier and said selector will read the extended plungers as the carriers are moved past the selector to identify and select a desired tool carrier.

12. In a machine tool having a movable tool operator adapted to receive diverse tools for performing machining operations in a work zone;

tool storage means carrying a plurality of tools for utilization by said tool operator;

a tool transfer member for transferring tools for effecting an interchange of tools between said tool storage means and said tool operator;

control means connected to regulate the operation of the machine;

regulation means connected in said control means to regulate the movements of said tool operator during the tool change cycles so that during every alternate tool change cycle said tool operator is moved from the work zone to insert the previously used tool into said tool storage means and is then moved to a tool ready station to receive a new tool from said tool transfer member, and during the other tool change cycle said regulating means causes movement of said tool operator from the work zone to said tool ready station so that said tool transfer member can remove the previously used tool, said tool operator being then moved to grasp a new tool from said storage means before returning to the work zone for the succeeding machining operation; and, second regulating means connected in said control means to regulate the movements of said tool transfer member during the tool change cycles so that during said alternate tool change cycles said transfer member is caused to move to extract a tool from said tool storage member and when said tool operator arrives at the tool ready station it moves to insert the extracted tool into said tool operator, and during said other tool change cycles said regulating means causes said tool transfer member to remove the previously used tool from the tool operator when the latter arrives at the tool ready station and transfer the removed tool to said tool storage means.

13. In a machine tool;

a frame;

a source of power;

a tool storage magazine rotatably mounted on said frame and having a tool ready station;

a plurality of tool carriers mounted on said magazine to rotate with said magazine for successive movement to the ready station, said carriers being constructed and arranged in a manner that a tool carried by a carrier located at the ready station is removable from the carrier in a direction normal to the axis of the carrier;

securing means associated with each carrier normally acting to exert a force on a tool in an associated carrier to urge the tool axially into abutting engagement with an abutment provided on the axial end of said carriers in a manner that said securing means and the abutment cooperate to effect the securing of a tool in a carrier;

actuating means connected to be operated by said source of power to effect withdrawal of said securing means from engagement with the tool and thereby release the axial force on said tool to release the tool;

a tool transfer grip complementary to the carriers of said magazine, said transfer grip being supported for movement in a manner to be movable axially into or out of engagement with a tool presented by a carrier located at the ready station, said transfer grip being also movable to remove or insert a tool from the carrier located at the ready station along a path of travel normal to the axis of the carrier; and, power means connected to be operated by said source of power to move said transfer grip in its path of movements selectively.

14. In a machine tool;

a power driven tool receiving sprindle adapted to use diverse tools;

tool storage means;

a plurality of spaced carriers mounted on said storage means for carrying tools in storage, each carrier being constructed and arranged to present an elongated semi-circular tool receiving recess having an abutment at one end thereof;

a movable plunger carried by each carrier in operative relationship with an associated recess to engage a tool located within the recess and urge it axially into abutting engagement with the abutment provided in the recess, said plunger and abutment cooperating to hold a tool in stored position within the carrier recess;

means releasably biasing said plunger into tool engaging position;

a tool transfer member provided with a tool grip for releasably holding a tool therein, said grip being complementary to the carriers of said storage means and disposed in opposing relationship to a carrier from which a tool is to be transferred, said transfer means being movable bodily in two distinct rectilinear paths of travel in which the first rectilinear path of travel serves to move the grip axially into or out of engagement with a tool presented by a carrier, and movement in the second rectilinear path of travel serves to move the transfer grip bodily laterally to or away from a carrier for inserting a tool in a carrier or for withdrawing a tool from a carrier for insertion into said spindle; and, means to selectively move said transfer member for changing a tool between said storage means and said spindle, and to actuate said carrier plunger to release a tool therein so that said transfer member may bodily move its associated grip having the tool held therein to withdraw the tool from the carrier of said storage means and transfer the tool to said spindle.

15. In a machine tool having a ready station and having a tool operating sprindle for performing machining operations;

a movable tool storage magazine having a plurality of individually identified tool storage positions in which tools are stored for utilization by said spindle;

power drive means connected to drive said magazine in its path of travel to locate a particular tool storage position with the next tool to be utilized by said spindle in the ready station;

a first sensing means operable to sense and identify each storage position of said magazine as said magazine is moved in its path of travel, said first sensing means being operable upon identifying a particular preselected tool storage position to stop the operation of said power drive means with the preselected tool storage position located in the ready station; and, a second sensing means operable in response to the removal of a tool from the tool storage position located at the ready station to effect the operation of said power drive means for moving said magazine in its path of travel, said second sensing means subsequently by also being responsive to the movement of a different empty storage position into the ready station to stop the operation of said power drive means to stop magazine movement with the different empty storage position located in the ready station.

No references cited.

RICHARD H. EANES, JR., *Primary Examiner.*

UNITED STATES PATENT OFFICE
CERTIFICATE OF CORRECTION

Patent No. 3,277,568                                October 11, 1966

Theodore A. Wetzel

It is hereby certified that error appears in the above numbered patent requiring correction and that the said Letters Patent should read as corrected below.

Column 1, line 69, for "when" read -- whence --; column 4, line 47, for "carries" read -- carriers --; column 14, line 7, for "33" read -- 333 --; column 27, line 67, for "in" read -- is --; column 29, line 41, for "858" read -- 585 --; column 35, line 65, for "normal" read -- numeral --; column 38, line 29, for "O" read --"C"--; column 63, line 28, for "547F" read -- 574F --; column 70, line 1, before "for" insert -- in various combinations which complete one or more circuits --; column 74, line 8, for "clamp" read -- clasp --; column 76, lines 34 and 35, for "too in said means" read -- tool in said storage means --; line 72, before "said" insert -- into --; column 82, line 16, strike out "by".

Signed and sealed this 7th day of November 1967.

(SEAL)
Attest:

EDWARD M. FLETCHER, JR.                    EDWARD J. BRENNER
Attesting Officer                            Commissioner of Patents